(12) United States Patent
Uzum Vella et al.

(10) Patent No.: US 12,022,359 B2
(45) Date of Patent: Jun. 25, 2024

(54) USER INTERFACES FOR VIEWING AND REFINING THE CURRENT LOCATION OF AN ELECTRONIC DEVICE

(71) Applicant: Apple Inc., Cupertino, CA (US)

(72) Inventors: Isil Uzum Vella, Milan (IT); Ryan W. Apuy, San Francisco, CA (US); Usama M. Hajj, London (GB); Erik G. Sodervall, Stockholm (SE); Hollie R. Figueroa, Cupertino, CA (US); Linghao Li, Cupertino, CA (US); Eric D. Schlakman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/323,944

(22) Filed: May 18, 2021

(65) Prior Publication Data

US 2021/0360372 A1 Nov. 18, 2021

Related U.S. Application Data

(60) Provisional application No. 63/041,984, filed on Jun. 21, 2020, provisional application No. 63/026,275, filed on May 18, 2020.

(51) Int. Cl.
*H04W 4/029* (2018.01)
*G06F 3/04847* (2022.01)
(Continued)

(52) U.S. Cl.
CPC ............... *H04W 4/029* (2018.02); *G06T 3/40* (2013.01); *G06F 3/04847* (2013.01); *G06F 3/0487* (2013.01); *G06T 2200/24* (2013.01)

(58) Field of Classification Search
CPC ...... H04W 4/029; G06T 3/40; G06T 2200/24; G06F 3/04847; G06F 3/0487
See application file for complete search history.

(56) References Cited

U.S. PATENT DOCUMENTS 4,899,138 A 2/1990 Araki et al.
4,935,728 A 6/1990 Kley
(Continued)

FOREIGN PATENT DOCUMENTS

CN 1683905 A 10/2005
CN 1754084 A 3/2006
(Continued)

OTHER PUBLICATIONS

Advisory Action received for U.S. Appl. No. 13/662,370, dated Mar. 19, 2018, 2 pages.
(Continued)

*Primary Examiner* — Andrew T Chiusano
(74) *Attorney, Agent, or Firm* — Kubota & Basol LLP

(57) ABSTRACT

In some embodiments, an electronic device displays a map user interface including a representation of a map at a respective zoom level and a location indicator that indicates a determined location of the electronic device on the representation of the map. In some embodiments, the location indicator includes a first location element and does not include a second location element. In some embodiments, the location indicator includes the second location element and does not include the first location element. In some embodiments, an electronic device displays a map user interface including a representation of a map and a location indicator that indicates a determined location of the electronic device on the representation of the map. In some embodiments, while displaying the map user interface, the electronic device displays a selectable option that is selectable to initiate a process for improving an accuracy of the determined location of the electronic device.

36 Claims, 29 Drawing Sheets

(51) Int. Cl.
*G06F 3/0487* (2013.01)
*G06T 3/40* (2006.01)

(56) References Cited

U.S. PATENT DOCUMENTS

| | | | |
|---|---|---|---|
| 5,416,890 A | 5/1995 | Beretta |
| 5,473,324 A | 12/1995 | Ueno |
| 5,559,707 A | 9/1996 | Delorme et al. |
| 5,594,469 A | 1/1997 | Freeman et al. |
| 5,594,810 A | 1/1997 | Gourdol |
| 5,608,635 A | 3/1997 | Tamai |
| 5,638,523 A | 6/1997 | Mullet et al. |
| 5,714,698 A | 2/1998 | Tokioka et al. |
| 5,760,767 A | 6/1998 | Shore et al. |
| 5,760,773 A | 6/1998 | Berman et al. |
| 5,802,492 A | 9/1998 | Delorme et al. |
| 5,825,352 A | 10/1998 | Bisset et al. |
| 5,825,357 A | 10/1998 | Malamud et al. |
| 5,864,635 A | 1/1999 | Zetts et al. |
| 5,867,150 A | 2/1999 | Bricklin et al. |
| 5,877,751 A | 3/1999 | Kanemitsu et al. |
| 6,002,808 A | 12/1999 | Freeman |
| 6,009,462 A | 12/1999 | Birrell et al. |
| 6,028,271 A | 2/2000 | Gillespie et al. |
| 6,038,508 A | 3/2000 | Maekawa et al. |
| 6,038,522 A | 3/2000 | Manson et al. |
| 6,040,824 A | 3/2000 | Maekawa et al. |
| 6,072,494 A | 6/2000 | Nguyen |
| 6,115,025 A | 9/2000 | Buxton et al. |
| 6,115,053 A | 9/2000 | Perlin |
| 6,169,878 B1 | 1/2001 | Tawil et al. |
| 6,199,015 B1 | 3/2001 | Curtwright et al. |
| 6,201,544 B1 | 3/2001 | Ezaki |
| 6,208,834 B1 | 3/2001 | Tawil et al. |
| 6,229,525 B1 | 5/2001 | Alexander |
| 6,321,158 B1 | 11/2001 | Delorme et al. |
| 6,323,846 B1 | 11/2001 | Westerman et al. |
| 6,336,072 B1 | 1/2002 | Takayama et al. |
| 6,380,931 B1 | 4/2002 | Gillespie et al. |
| 6,405,129 B1 | 6/2002 | Yokota |
| 6,434,484 B1 | 8/2002 | Lee |
| 6,496,695 B1 | 12/2002 | Kouji et al. |
| 6,512,529 B1 | 1/2003 | Janssen et al. |
| 6,570,557 B1 | 5/2003 | Westerman et al. |
| 6,600,502 B1 | 7/2003 | Brewster, Jr. |
| 6,667,751 B1 | 12/2003 | Wynn et al. |
| 6,677,932 B1 | 1/2004 | Westerman |
| 6,687,613 B2 | 2/2004 | Yokota |
| 6,697,734 B1 | 2/2004 | Suomela |
| 6,732,047 B1 | 5/2004 | De Silva |
| 6,791,536 B2 | 9/2004 | Keely et al. |
| 6,795,017 B1 | 9/2004 | Puranik et al. |
| 6,806,830 B2 | 10/2004 | Panasik et al. |
| 6,892,050 B1 | 5/2005 | Tawil et al. |
| 6,894,678 B2 | 5/2005 | Rosenberg et al. |
| 6,917,878 B2 | 7/2005 | Pechatnikov et al. |
| 6,956,590 B1 | 10/2005 | Barton et al. |
| 6,983,203 B1 | 1/2006 | Wako |
| 7,030,861 B1 | 4/2006 | Westerman et al. |
| 7,032,187 B2 | 4/2006 | Keely et al. |
| 7,046,230 B2 | 5/2006 | Zadesky et al. |
| 7,047,113 B1 | 5/2006 | Burch et al. |
| 7,142,978 B2 | 11/2006 | Nix et al. |
| 7,239,301 B2 | 7/2007 | Liberty et al. |
| 7,256,770 B2 | 8/2007 | Hinckley et al. |
| 7,289,763 B2 | 10/2007 | Dennison et al. |
| 7,308,229 B2 | 12/2007 | Hane et al. |
| 7,310,534 B2 | 12/2007 | Northcutt |
| 7,319,878 B2 | 1/2008 | Sheynblat et al. |
| 7,359,798 B2 | 4/2008 | Nagamasa |
| 7,366,609 B2 | 4/2008 | Lee |
| 7,373,244 B2 | 5/2008 | Kreft |
| 7,373,246 B2 | 5/2008 | Oclair |
| 7,376,640 B1 | 5/2008 | Anderson et al. |
| 7,379,811 B2 | 5/2008 | Rasmussen et al. |
| 7,388,519 B1 | 6/2008 | Kreft |
| 7,433,694 B2 | 10/2008 | Morgan et al. |
| 7,439,969 B2 | 10/2008 | Chithambaram et al. |
| 7,457,704 B2 | 11/2008 | Yasuda et al. |
| 7,472,354 B2 | 12/2008 | Jetha et al. |
| 7,479,949 B2 | 1/2009 | Jobs et al. |
| 7,480,567 B2 | 1/2009 | Suomela et al. |
| 7,484,180 B2 | 1/2009 | Mccormack et al. |
| 7,487,114 B2 | 2/2009 | Florance et al. |
| 7,495,659 B2 | 2/2009 | Marriott et al. |
| 7,499,040 B2 | 3/2009 | Zadesky et al. |
| 7,580,363 B2 | 8/2009 | Sorvari et al. |
| 7,587,276 B2 | 9/2009 | Gold et al. |
| 7,595,725 B1 | 9/2009 | Joseph et al. |
| 7,603,230 B2 | 10/2009 | Suzuki et al. |
| 7,614,008 B2 | 11/2009 | Ording |
| 7,620,496 B2 | 11/2009 | Rasmussen |
| 7,633,076 B2 | 12/2009 | Huppi et al. |
| 7,640,100 B2 | 12/2009 | Spinelli |
| 7,653,883 B2 | 1/2010 | Hotelling et al. |
| 7,656,393 B2 | 2/2010 | King et al. |
| 7,657,849 B2 | 2/2010 | Chaudhri et al. |
| 7,663,607 B2 | 2/2010 | Hotelling et al. |
| 7,676,767 B2 | 3/2010 | Hofmeister et al. |
| 7,728,821 B2 | 6/2010 | Hillis et al. |
| 7,768,395 B2 | 8/2010 | Gold |
| 7,777,648 B2 | 8/2010 | Smith et al. |
| 7,797,642 B1 | 9/2010 | Karam et al. |
| 7,800,592 B2 | 9/2010 | Kerr et al. |
| 7,808,479 B1 | 10/2010 | Hotelling et al. |
| 7,812,826 B2 | 10/2010 | Ording et al. |
| 7,812,860 B2 | 10/2010 | King et al. |
| 7,831,917 B1 | 11/2010 | Karam |
| 7,840,350 B2 | 11/2010 | Spinelli |
| 7,844,914 B2 | 11/2010 | Andre et al. |
| 7,890,886 B2 | 2/2011 | Matthews et al. |
| 7,891,103 B2 | 2/2011 | Mayor et al. |
| 7,907,124 B2 | 3/2011 | Hillis et al. |
| 7,912,634 B2 | 3/2011 | Reed et al. |
| 7,917,866 B1 | 3/2011 | Karam |
| 7,933,895 B2 | 4/2011 | Amjadi |
| 7,945,546 B2 | 5/2011 | Bliss et al. |
| 7,957,762 B2 | 6/2011 | Herz et al. |
| 8,006,002 B2 | 8/2011 | Kalayjian et al. |
| 8,010,407 B1 | 8/2011 | Santoro et al. |
| 8,019,531 B2 | 9/2011 | Pinkus et al. |
| 8,019,532 B2 | 9/2011 | Sheha et al. |
| 8,060,389 B2 | 11/2011 | Johnson |
| 8,060,499 B2 | 11/2011 | Mansikkaniemi |
| 8,064,704 B2 | 11/2011 | Kim et al. |
| 8,086,398 B2 | 12/2011 | Sanchez et al. |
| 8,090,533 B2 | 1/2012 | Koike et al. |
| 8,095,303 B1 | 1/2012 | Nesbitt et al. |
| 8,108,137 B2 | 1/2012 | Kim |
| 8,122,384 B2 | 2/2012 | Partridge et al. |
| 8,164,599 B1 | 4/2012 | Kadous et al. |
| 8,171,432 B2 | 5/2012 | Matas et al. |
| 8,184,102 B2 | 5/2012 | Park et al. |
| 8,205,157 B2 | 6/2012 | Van et al. |
| 8,239,784 B2 | 8/2012 | Hotelling et al. |
| 8,250,493 B2 | 8/2012 | Yang et al. |
| 8,279,180 B2 | 10/2012 | Hotelling et al. |
| 8,285,481 B2 | 10/2012 | De Silva et al. |
| 8,302,033 B2 | 10/2012 | Matas et al. |
| 8,332,144 B2 | 12/2012 | Diaz et al. |
| 8,381,135 B2 | 2/2013 | Hotelling et al. |
| 8,397,171 B2 | 3/2013 | Klassen et al. |
| 8,397,177 B2 | 3/2013 | Barros |
| 8,456,297 B2 | 6/2013 | Van Os |
| 8,464,182 B2 | 6/2013 | Blumenberg et al. |
| 8,468,469 B1 | 6/2013 | Mendis et al. |
| 8,473,193 B2 | 6/2013 | Neef et al. |
| 8,479,122 B2 | 7/2013 | Hotelling et al. |
| 8,489,641 B1 | 7/2013 | Seefeld et al. |
| 8,532,678 B2 | 9/2013 | Geelen |
| 8,537,119 B1 | 9/2013 | Sartore et al. |
| 8,571,580 B2 | 10/2013 | Altman et al. |
| 8,573,479 B1 | 11/2013 | Jenkins et al. |
| 8,607,167 B2 | 12/2013 | Matas et al. |

(56) References Cited

U.S. PATENT DOCUMENTS

| | | | |
|---|---|---|---|
| 8,761,797 B1 * | 6/2014 | Norton | H04W 64/00 455/456.2 |
| 8,793,575 B1 | 7/2014 | Lattyak et al. | |
| 8,798,921 B2 | 8/2014 | Zink et al. | |
| 8,825,370 B2 | 9/2014 | Hu et al. | |
| 8,862,576 B2 | 10/2014 | Van Os | |
| 8,907,886 B2 | 12/2014 | Robbins et al. | |
| 8,938,263 B2 | 1/2015 | Niemenmaa et al. | |
| 8,988,358 B2 | 3/2015 | Medler et al. | |
| 8,996,045 B2 | 3/2015 | Bowman | |
| 9,113,293 B1 * | 8/2015 | Rayburn | H04W 64/00 |
| 9,317,945 B2 | 4/2016 | Fraser | |
| 9,329,051 B1 | 5/2016 | Ichinokawa et al. | |
| 9,348,458 B2 | 5/2016 | Hotelling et al. | |
| 9,880,699 B2 | 1/2018 | Bliss et al. | |
| 9,933,937 B2 | 4/2018 | Lemay et al. | |
| 10,003,964 B1 | 6/2018 | Blintsov et al. | |
| 11,176,534 B1 | 11/2021 | Pandey et al. | |
| 2001/0020211 A1 | 9/2001 | Takayama et al. | |
| 2001/0035880 A1 | 11/2001 | Musatov et al. | |
| 2001/0045949 A1 | 11/2001 | Chithambaram et al. | |
| 2002/0015024 A1 | 2/2002 | Westerman et al. | |
| 2002/0015064 A1 | 2/2002 | Robotham et al. | |
| 2002/0042819 A1 | 4/2002 | Reichert et al. | |
| 2002/0057263 A1 | 5/2002 | Keely et al. | |
| 2002/0087262 A1 | 7/2002 | Bullock et al. | |
| 2002/0160708 A1 | 10/2002 | Hane et al. | |
| 2002/0163547 A1 | 11/2002 | Abramson et al. | |
| 2002/0183924 A1 | 12/2002 | Yokota | |
| 2003/0018427 A1 | 1/2003 | Yokota et al. | |
| 2003/0023370 A1 | 1/2003 | Spencer et al. | |
| 2003/0054830 A1 | 3/2003 | Williams et al. | |
| 2003/0095112 A1 | 5/2003 | Kawano et al. | |
| 2003/0120423 A1 | 6/2003 | Cochlovius et al. | |
| 2003/0122711 A1 | 7/2003 | Panasik et al. | |
| 2003/0177265 A1 | 9/2003 | Page et al. | |
| 2003/0201914 A1 | 10/2003 | Fujiwara et al. | |
| 2003/0229441 A1 | 12/2003 | Pechatnikov et al. | |
| 2003/0231190 A1 | 12/2003 | Jawerth et al. | |
| 2004/0027395 A1 | 2/2004 | Lection et al. | |
| 2004/0030493 A1 | 2/2004 | Pechatnikov et al. | |
| 2004/0107043 A1 | 6/2004 | De Silva | |
| 2004/0107046 A1 | 6/2004 | Zink et al. | |
| 2004/0162669 A1 | 8/2004 | Nagamasa | |
| 2004/0243306 A1 | 12/2004 | Han | |
| 2004/0243307 A1 | 12/2004 | Geelen | |
| 2004/0257340 A1 | 12/2004 | Jawerth | |
| 2004/0260465 A1 | 12/2004 | Tu | |
| 2005/0032527 A1 | 2/2005 | Sheha et al. | |
| 2005/0041044 A1 | 2/2005 | Gannon | |
| 2005/0052462 A1 | 3/2005 | Sakamoto et al. | |
| 2005/0055662 A1 | 3/2005 | Strausbaugh et al. | |
| 2005/0075114 A1 | 4/2005 | Dennison et al. | |
| 2005/0114021 A1 | 5/2005 | Krull et al. | |
| 2005/0125144 A1 | 6/2005 | Nakagawa | |
| 2005/0130680 A1 | 6/2005 | Northcutt | |
| 2005/0147442 A1 | 7/2005 | Walker et al. | |
| 2005/0190059 A1 | 9/2005 | Wehrenberg | |
| 2005/0197843 A1 | 9/2005 | Faisman et al. | |
| 2005/0203768 A1 | 9/2005 | Florance et al. | |
| 2005/0239478 A1 | 10/2005 | Spirito | |
| 2005/0251331 A1 | 11/2005 | Kreft | |
| 2005/0253806 A1 | 11/2005 | Liberty et al. | |
| 2005/0270311 A1 | 12/2005 | Rasmussen et al. | |
| 2006/0004304 A1 | 1/2006 | Parks | |
| 2006/0009235 A1 | 1/2006 | Sheynblat et al. | |
| 2006/0017692 A1 | 1/2006 | Wehrenberg et al. | |
| 2006/0022048 A1 | 2/2006 | Johnson | |
| 2006/0026521 A1 | 2/2006 | Hotelling et al. | |
| 2006/0026535 A1 | 2/2006 | Hotelling et al. | |
| 2006/0026536 A1 | 2/2006 | Hotelling et al. | |
| 2006/0033724 A1 | 2/2006 | Chaudhri et al. | |
| 2006/0035632 A1 | 2/2006 | Sorvari et al. | |
| 2006/0047416 A1 | 3/2006 | Goldberg et al. | |
| 2006/0047423 A1 | 3/2006 | Min | |
| 2006/0058949 A1 | 3/2006 | Fogel et al. | |
| 2006/0068808 A1 | 3/2006 | Karavias | |
| 2006/0069503 A1 | 3/2006 | Suomela et al. | |
| 2006/0085767 A1 | 4/2006 | Hinckley et al. | |
| 2006/0106850 A1 | 5/2006 | Morgan et al. | |
| 2006/0109145 A1 | 5/2006 | Chen | |
| 2006/0112350 A1 | 5/2006 | Kato | |
| 2006/0132455 A1 | 6/2006 | Rimas-ribikauskas et al. | |
| 2006/0143574 A1 | 6/2006 | Ito et al. | |
| 2006/0181517 A1 | 8/2006 | Zadesky et al. | |
| 2006/0192078 A1 | 8/2006 | Yang et al. | |
| 2006/0197753 A1 | 9/2006 | Hotelling | |
| 2006/0200305 A1 | 9/2006 | Sheha et al. | |
| 2006/0200490 A1 | 9/2006 | Abbiss | |
| 2006/0224311 A1 | 10/2006 | Watanabe et al. | |
| 2006/0229802 A1 | 10/2006 | Vertelney et al. | |
| 2006/0239248 A1 | 10/2006 | Hawk et al. | |
| 2006/0242607 A1 | 10/2006 | Hudson | |
| 2006/0247855 A1 | 11/2006 | De et al. | |
| 2006/0267958 A1 | 11/2006 | Kolmykov-zotov et al. | |
| 2006/0271277 A1 | 11/2006 | Hu et al. | |
| 2006/0271280 A1 | 11/2006 | Oclair | |
| 2006/0271287 A1 | 11/2006 | Gold et al. | |
| 2006/0284825 A1 | 12/2006 | Teranishi | |
| 2006/0284852 A1 | 12/2006 | Hofmeister et al. | |
| 2006/0284858 A1 | 12/2006 | Rekimoto | |
| 2007/0011150 A1 | 1/2007 | Frank | |
| 2007/0033089 A1 | 2/2007 | Dharmarajan et al. | |
| 2007/0037558 A1 | 2/2007 | Yu et al. | |
| 2007/0046643 A1 | 3/2007 | Hillis et al. | |
| 2007/0050129 A1 | 3/2007 | Salmre | |
| 2007/0061126 A1 | 3/2007 | Russo et al. | |
| 2007/0064018 A1 | 3/2007 | Shoemaker et al. | |
| 2007/0080958 A1 | 4/2007 | Chithambaram et al. | |
| 2007/0083324 A1 | 4/2007 | Suzuki et al. | |
| 2007/0083329 A1 | 4/2007 | Im | |
| 2007/0083819 A1 | 4/2007 | Shoemaker | |
| 2007/0088897 A1 | 4/2007 | Fernandez et al. | |
| 2007/0112729 A1 | 5/2007 | Wiseman et al. | |
| 2007/0118520 A1 | 5/2007 | Bliss et al. | |
| 2007/0124062 A1 | 5/2007 | Janky et al. | |
| 2007/0130153 A1 | 6/2007 | Nachman et al. | |
| 2007/0143264 A1 | 6/2007 | Szeto | |
| 2007/0152984 A1 | 7/2007 | Ording et al. | |
| 2007/0168888 A1 | 7/2007 | Jawerth | |
| 2007/0176796 A1 | 8/2007 | Bliss et al. | |
| 2007/0189737 A1 | 8/2007 | Chaudhri et al. | |
| 2007/0211151 A1 | 9/2007 | Baiping et al. | |
| 2007/0225904 A1 | 9/2007 | Pantalone et al. | |
| 2007/0233695 A1 | 10/2007 | Boudreau et al. | |
| 2007/0236477 A1 | 10/2007 | Ryu et al. | |
| 2007/0252821 A1 | 11/2007 | Hollemans et al. | |
| 2007/0256026 A1 | 11/2007 | Klassen et al. | |
| 2007/0257891 A1 | 11/2007 | Esenther et al. | |
| 2007/0262860 A1 | 11/2007 | Salinas et al. | |
| 2007/0271255 A1 | 11/2007 | Pappo | |
| 2007/0273664 A1 | 11/2007 | Kim et al. | |
| 2007/0281689 A1 | 12/2007 | Altman et al. | |
| 2007/0281690 A1 | 12/2007 | Altman et al. | |
| 2007/0282621 A1 | 12/2007 | Altman et al. | |
| 2007/0288480 A1 | 12/2007 | Caplan et al. | |
| 2008/0030460 A1 | 2/2008 | Hildreth et al. | |
| 2008/0036743 A1 | 2/2008 | Westerman et al. | |
| 2008/0040315 A1 | 2/2008 | Auerbach et al. | |
| 2008/0040678 A1 | 2/2008 | Crump | |
| 2008/0052638 A1 | 2/2008 | Frank et al. | |
| 2008/0055257 A1 | 3/2008 | Peng | |
| 2008/0055263 A1 | 3/2008 | Lemay et al. | |
| 2008/0055269 A1 | 3/2008 | Lemay et al. | |
| 2008/0059452 A1 | 3/2008 | Frank | |
| 2008/0072139 A1 | 3/2008 | Salinas et al. | |
| 2008/0082262 A1 | 4/2008 | Silva et al. | |
| 2008/0086356 A1 | 4/2008 | Glassman et al. | |
| 2008/0088602 A1 | 4/2008 | Hotelling | |
| 2008/0089587 A1 | 4/2008 | Kim et al. | |
| 2008/0091689 A1 | 4/2008 | Mansikkaniemi | |
| 2008/0122796 A1 | 5/2008 | Jobs et al. | |
| 2008/0132243 A1 | 6/2008 | Spalink et al. | |
| 2008/0147311 A1 | 6/2008 | Zoller et al. | |

(56) References Cited

U.S. PATENT DOCUMENTS

| | | |
|---|---|---|
| 2008/0147730 A1 | 6/2008 | Lee et al. |
| 2008/0148177 A1 | 6/2008 | Lang et al. |
| 2008/0148321 A1 | 6/2008 | Hane et al. |
| 2008/0154774 A1 | 6/2008 | Dennison et al. |
| 2008/0158249 A1 | 7/2008 | Jarczyk |
| 2008/0163130 A1 | 7/2008 | Westerman |
| 2008/0165144 A1 | 7/2008 | Forstall et al. |
| 2008/0165153 A1 | 7/2008 | Platzer et al. |
| 2008/0167809 A1 | 7/2008 | Geelen |
| 2008/0168396 A1 | 7/2008 | Matas et al. |
| 2008/0168398 A1 | 7/2008 | Geelen et al. |
| 2008/0172357 A1 | 7/2008 | Rechis et al. |
| 2008/0182598 A1 | 7/2008 | Bowman |
| 2008/0208447 A1 | 8/2008 | Geelen et al. |
| 2008/0208456 A1 | 8/2008 | Jouline et al. |
| 2008/0209332 A1 | 8/2008 | Chevsky et al. |
| 2008/0228386 A1 | 9/2008 | Geelen et al. |
| 2008/0228393 A1 | 9/2008 | Geelen et al. |
| 2008/0268876 A1 | 10/2008 | Gelfand et al. |
| 2008/0307661 A1 | 12/2008 | Hembree |
| 2008/0320391 A1 | 12/2008 | Lemay et al. |
| 2008/0320419 A1 | 12/2008 | Matas et al. |
| 2009/0006543 A1 | 1/2009 | Smit |
| 2009/0012866 A1 | 1/2009 | Celik et al. |
| 2009/0024590 A1 | 1/2009 | Sturge et al. |
| 2009/0037101 A1 | 2/2009 | Koike et al. |
| 2009/0058820 A1 | 3/2009 | Hinckley |
| 2009/0064055 A1 | 3/2009 | Chaudhri et al. |
| 2009/0090567 A1 | 4/2009 | Tonouchi |
| 2009/0112457 A1 | 4/2009 | Sanchez et al. |
| 2009/0132395 A1 | 5/2009 | Lam et al. |
| 2009/0172599 A1 | 7/2009 | Nezu |
| 2009/0177385 A1* | 7/2009 | Matas ............... H04M 1/72427 345/589 |
| 2009/0178007 A1 | 7/2009 | Matas et al. |
| 2009/0244023 A1 | 10/2009 | Kim et al. |
| 2009/0271745 A1 | 10/2009 | Sakamoto et al. |
| 2009/0281724 A1 | 11/2009 | Blumenberg et al. |
| 2009/0289815 A1 | 11/2009 | Reed et al. |
| 2009/0295753 A1 | 12/2009 | King et al. |
| 2009/0299620 A1 | 12/2009 | Shin et al. |
| 2010/0002016 A1 | 1/2010 | Kim |
| 2010/0005061 A1 | 1/2010 | Basco et al. |
| 2010/0023255 A1 | 1/2010 | Nambata |
| 2010/0031186 A1 | 2/2010 | Tseng et al. |
| 2010/0057712 A1 | 3/2010 | Ranganathan |
| 2010/0094548 A1 | 4/2010 | Tadman et al. |
| 2010/0107099 A1 | 4/2010 | Frazier et al. |
| 2010/0114916 A1 | 5/2010 | Cooke |
| 2010/0121917 A1 | 5/2010 | Chevsky et al. |
| 2010/0225607 A1 | 9/2010 | Kim |
| 2010/0293186 A1 | 11/2010 | Nambata et al. |
| 2010/0309149 A1 | 12/2010 | Blumenberg et al. |
| 2010/0312462 A1 | 12/2010 | Gueziec et al. |
| 2011/0041084 A1 | 2/2011 | Karam |
| 2011/0045868 A1 | 2/2011 | Sheha et al. |
| 2011/0112754 A1 | 5/2011 | Reed et al. |
| 2011/0112755 A1 | 5/2011 | Reed et al. |
| 2011/0137813 A1 | 6/2011 | Stewart |
| 2011/0163874 A1* | 7/2011 | van Os ............... G01C 21/367 345/173 |
| 2011/0164058 A1 | 7/2011 | Lemay |
| 2011/0184638 A1 | 7/2011 | Jouline et al. |
| 2011/0276591 A1 | 11/2011 | Bliss et al. |
| 2011/0289104 A1 | 11/2011 | Watt |
| 2012/0011137 A1 | 1/2012 | Sheha et al. |
| 2012/0011449 A1 | 1/2012 | Sasson et al. |
| 2012/0030308 A1 | 2/2012 | Jeffe et al. |
| 2012/0109509 A1 | 5/2012 | Nesbitt et al. |
| 2012/0136568 A1* | 5/2012 | Garrigan ............... G01C 21/20 701/428 |
| 2012/0197975 A1 | 8/2012 | Samson et al. |
| 2012/0221978 A1 | 8/2012 | Matas et al. |
| 2012/0262482 A1 | 10/2012 | Miwa |
| 2012/0287218 A1 | 11/2012 | Ok |
| 2012/0311478 A1 | 12/2012 | Van Os et al. |
| 2013/0055163 A1 | 2/2013 | Matas et al. |
| 2013/0080923 A1 | 3/2013 | Anzures et al. |
| 2013/0097173 A1 | 4/2013 | Stovicek et al. |
| 2013/0113739 A1 | 5/2013 | Lee |
| 2013/0131973 A1* | 5/2013 | Friedler ............... G01S 5/0252 701/408 |
| 2013/0321402 A1 | 12/2013 | Moore et al. |
| 2013/0325319 A1 | 12/2013 | Moore et al. |
| 2013/0326380 A1 | 12/2013 | Lai et al. |
| 2013/0326384 A1 | 12/2013 | Moore et al. |
| 2013/0326407 A1 | 12/2013 | Van Os et al. |
| 2013/0326425 A1 | 12/2013 | Forstall et al. |
| 2014/0095073 A1 | 4/2014 | Matas et al. |
| 2014/0155096 A1 | 6/2014 | Niemenmaa et al. |
| 2014/0164921 A1 | 6/2014 | Salinas |
| 2014/0278067 A1 | 9/2014 | Gordon et al. |
| 2014/0365901 A1 | 12/2014 | Moha et al. |
| 2014/0365935 A1* | 12/2014 | Moha ............... G01C 21/367 715/769 |
| 2015/0032735 A1 | 1/2015 | Van Os |
| 2015/0081215 A1 | 3/2015 | Di Bernardo et al. |
| 2015/0156073 A1* | 6/2015 | Bailiang ............... H04W 4/33 715/736 |
| 2015/0301795 A1 | 10/2015 | Lebrun |
| 2016/0234635 A1* | 8/2016 | Chen ............... H04W 4/33 |
| 2016/0290818 A1 | 10/2016 | Kim et al. |
| 2017/0059340 A1 | 3/2017 | Kim et al. |
| 2019/0072390 A1 | 3/2019 | Wang et al. |
| 2020/0314234 A1 | 10/2020 | Matas et al. |

FOREIGN PATENT DOCUMENTS

| | | |
|---|---|---|
| CN | 101033981 A | 9/2007 |
| CN | 101097152 A | 1/2008 |
| CN | 101270998 A | 9/2008 |
| CN | 101430697 A | 5/2009 |
| DE | 10 2005 047 648 A1 | 4/2007 |
| DE | 10 2008 008 948 A1 | 8/2009 |
| EP | 0908835 A2 | 4/1999 |
| EP | 1653376 A2 | 5/2006 |
| EP | 1840511 A1 | 10/2007 |
| EP | 2077436 A1 | 7/2009 |
| JP | 6-341849 A | 12/1994 |
| JP | H09113295 A * | 5/1997 |
| JP | 2018-511038 A | 4/2018 |
| TW | 200942784 A | 10/2009 |
| WO | 1997/007467 A1 | 2/1997 |
| WO | 1998/007112 A2 | 2/1998 |
| WO | 2003/017120 A1 | 2/2003 |
| WO | 2004/076977 A1 | 9/2004 |
| WO | 2005/104039 A2 | 11/2005 |
| WO | 2007/131225 A2 | 11/2007 |
| WO | 2008/081521 A1 | 7/2008 |
| WO | 2009/002942 A2 | 12/2008 |
| WO | 2013/169849 A2 | 11/2013 |
| WO | 2014/105276 A1 | 7/2014 |

OTHER PUBLICATIONS

Advisory Action received for U.S. Appl. No. 14/513,050, dated Jul. 9, 2018, 4 pages.

Advisory Action received for U.S. Appl. No. 14/513,050, dated Nov. 3, 2016, 3 pages.

European Search Report received for European Patent Application No. 12187505.8, dated Jan. 14, 2013, 3 pages.

Final Office Action received for U.S. Appl. No. 11/969,211, dated Aug. 17, 2011, 24 pages.

Final Office Action received for U.S. Appl. No. 12/143,752, dated Dec. 23, 2011, 18 pages.

Final Office Action received for U.S. Appl. No. 12/788,281, dated May 10, 2013, 12 pages.

Final Office Action received for U.S. Appl. No. 13/662,370, dated Apr. 14, 2016, 29 pages.

Final Office Action received for U.S. Appl. No. 13/662,370, dated Jul. 18, 2019, 27 pages.

(56) References Cited

OTHER PUBLICATIONS

Final Office Action received for U.S. Appl. No. 13/662,370, dated Nov. 17, 2017, 32 pages.
Final Office Action received U.S. Appl. No. 14/101,205, dated Sep. 8, 2017, 19 pages.
Final Office Action received for U.S. Appl. No. 14/513,050, dated Apr. 5, 2016, 10 pages.
Final Office Action received for U.S. Appl. No. 14/513,050, dated Apr. 5, 2018, 16 pages.
Final Office Action received for U.S. Appl. No. 16/901,269, dated May 26, 2021, 21 pages.
International Search Report received for PCT Patent Application No. PCT/US2008/050295, dated Jan. 14, 2009, 7 pages.
International Search Report received for PCT Patent Application No. PCT/US2008/067925, dated Dec. 17, 2008, 5 Pages.
International Search Report received for PCT Patent Application No. PCT/US2010/020229, dated Apr. 12, 2012, Corresponds to U.S. Appl. No. 12/788,281, 6 pages.
iPhone iOS3.1 User Guide, Nov. 9, 2009, 172 pages (Official). See attached Communication 37 CFR §1.98(a) (3).
Non-Final Office Action received for U.S. Appl. No. 14/101,205, dated Jan. 5, 2017, 17 pages.
Non-Final Office Action received for U.S. Appl. No. 11/969,211, dated Feb. 25, 2011, 21 pages.
Non-Final Office Action received for U.S. Appl. No. 11/969,211, dated Sep. 20, 2012, 30 pages.
Non-Final Office Action received for U.S. Appl. No. 12/143,741, dated Jan. 25, 2011, 18 pages.
Non-Final Office Action received for U.S. Appl. No. 12/143,752, dated May 17, 2011, 37 pages.
Non-Final Office Action received for U.S. Appl. No. 12/566,668, dated Jun. 18, 2012, 35 pages.
Non-Final Office Action received for U.S. Appl. No. 12/788,281, dated Feb. 17, 2012, 14 pages.
Non-Final Office Action received for U.S. Appl. No. 12/788,281, dated Oct. 15, 2013, 13 pages.
Non-Final Office Action received for U.S. Appl. No. 12/788,281, dated Sep. 26, 2012, 14 pages.
Non-Final Office Action received for U.S. Appl. No. 13/662,370, dated Dec. 10, 2014, 32 pages.
Non-Final Office Action received for U.S. Appl. No. 13/662,370, dated Jan. 25, 2019, 26 pages.
Non-Final Office Action received for U.S. Appl. No. 13/662,370, dated Mar. 13, 2017, 33 pages.
Non-Final Office Action received for U.S. Appl. No. 13/662,370, dated Mar. 25, 2014, 35 pages.
Non-Final Office Action received for U.S. Appl. No. 13/662,370, dated Sep. 2, 2015, 37 pages.
Non-Final Office Action received for U.S. Appl. No. 14/101,205, dated Jan. 8, 2019, 45 pages.
Non-Final Office Action received for U.S. Appl. No. 14/513,050, dated Aug. 26, 2015, 12 pages.
Non-Final Office Action received for U.S. Appl. No. 14/513,050, dated Oct. 13, 2017, 11 pages.
Non-Final Office Action received for U.S. Appl. No. 16/901,269, dated Dec. 11, 2020, 22 pages.
Notice of Allowance received for U.S. Appl. No. 11/969,211, dated May 15, 2013, 25 pages.
Notice of Allowance received for U.S. Appl. No. 12/143,741, dated Dec. 30, 2011, 5 pages.
Notice of Allowance received for U.S. Appl. No. 12/143,741, dated Jul. 12, 2011, 5 pages.
Notice of Allowance received for U.S. Appl. No. 12/143,752, dated Sep. 17, 2012, 11 pages.
Notice of Allowance received for U.S. Appl. No. 12/566,668, dated Feb. 7, 2013, 9 pages.
Notice of Allowance received for U.S. Appl. No. 12/566,668, dated Oct. 23, 2012, 10 pages.
Notice of Allowance received for U.S. Appl. No. 12/788,281, dated Jun. 4, 2014, 9 pages.
Notice of Allowance received for U.S. Appl. No. 12/789,440, dated Apr. 23, 2013, 2 pages.
Notice of Allowance received for U.S. Appl. No. 12/789,440, dated Jan. 14, 2013, 7 pages.
Notice of Allowance received for U.S. Appl. No. 12/789,440, dated Jun. 26, 2012, 14 pages.
Notice of Allowance received for U.S. Appl. No. 13/662,370, dated Feb. 14, 2020, 20 pages.
Notice of Allowance received for U.S. Appl. No. 13/666,944, dated Aug. 18, 2015, 5 pages.
Notice of Allowance received for U.S. Appl. No. 13/666,944, dated Jul. 31, 2015, 2 pages.
Notice of Allowance received for U.S. Appl. No. 13/666,944, dated Sep. 17, 2015, 2 pages.
Notice of Allowance received for U.S. Appl. No. 14/513,050, dated Sep. 5, 2018, 10 pages.
"Windows Mobile 6 Professional Video Tour", Available online at: <http://gizmodo.com/gadges/cellphones/windowsmobile-6-professional-video-tour-237039.php>, Mar. 11, 2007, 4 pages.
apple.com, "Maps with GPS", Apple.com, Available online at: <https://www.apple.com/iphone/features/maps.html>, May 2009, 2 pages.
AV Bros, "AV Bros. Page Curl 2.0 for Windows and MAC OS X", AV Bros. Curl 2.0 User Guide, Available online at: <http://c0002649.cdn2.cloudfiles.racksoacecloud.com/avoaaecurl20.pdf>, 2004, 26 pages.
Carew S., "Phones that Tell You Where to Drive, Meet, Eat", May 26, 2007, 2 pages.
Daimlercrysler, "Usecases Overview Map", 1 page.
Dalrymple J., "Google Maps Adds Locator, but not for iPhone", Available online at: <http://news.yahoo.com/s/macworld/20071130/tc_macworld/googlemaps200711300&printer=1; ylt+Auvt3s6LQKp)aitb954T DQni6gB>, 2007, 1 page.
Designing Interfaces, "Animated Transition", Available online at: <http://designinginterfaces.com/Animated_Transition>, Accessed on Sep. 4, 2014, 2 pages.
Dornfest, "Google Hacks", Third Edition, O'Reilly Media, Inc, Aug. 3, 2006, 5 pages.
Flipping Book, "Premium Page Flipping", Flipping Book.com, Available online at: <http://web.archive.orn/web/20041207072330/http://www.oa!!e-:flio.com>, Nov. 12, 2009, 1 page.
Google, "Google Maps in Search History", Available online at: <http://googlesystem.blogsot.com/2006/11/google-maps-in-search-history.html>, Apr. 2005, 1 page.
Google, "Google Maps Shows Real-Time Traffic Data", Google Operating System, Available online at:<http://googlesystem.blogsot.com/2007/02/google-maps-shows-real-time-traffic>, Feb. 28, 2007, 1 page.
Google, "Review Guide-Google Maps for Mobile (Beta)", 2006, 7 pages.
Gralla, "Google Search and Tools in a Snap", Sams, Apr. 4, 2006, 15 pages.
Holthe et al., "Video Browsing Techniques for Web Interfaces", Available online at: <http://ieeexplore.ieee.org/Xplore/login.jsp?url=http%3A%2F%2Fieeexplore.ieee.org%2Fstamp.jso%3Farnumber%3D01593233&authDecision=-203>, 2005, 5 pages.
Iphone Hacks, "iPhone Software/Hardware Hack: LocoGPS—GPS Add-on for the iPhone", Available online at: <http://www.iphonehacks.com/iphoneapplications/index.html>, Dec. 25, 2007, 41 pages.
Kim, "Video-In Magnetometers Could Introduce Interesting iPhone App Possibilities", Mac Rumours, Available online at: <http://www.macrumours.com/2009/04/08/video-in-and-magnetometers-could-introduce-interesting-iphone-app-possibilities/>, Apr. 8, 2009, 5 pages.
Microsoft, "Windows Mobile Fact Sheet", Available online at: <http://www.WindowsMobile.com>, 2007, 2 pages.
Mio, "27 Countries in Your Pocket", Mio Technology, Available online at: <http://www.miotech.be/en/printview/press-releases-2005-09-29.htm>, Sep. 2005, 1 page.
Mio, "Mio 269+ User's Manual", Mio Technology, Available online at: >http://www.miotech.be/Manuals/269+/Device-Manual/268-olus-269-olus-Device-Manual>, Aug. 2005, 44 pages.
Mio, "User's Manual MioMap 2.0", Mio Technology, Available online at: <http://web.archive.orgLweb/200612I40000736/http://

(56) References Cited

OTHER PUBLICATIONS www.miotech.be/Manuals/269+/MioMan V2-Manual/268+ 269+ miomap Manual>, Aug. 2005, 60 pages.
Miomap V 3.2 User Manual, "Navigation Software for Mio DigiWalker C310", US English Version, Available online at: <http://www.gpspassion.com/upload/MioMap_englishUS.pdf>, Aug. 2006, 84 pages.
Mol H., "Plan Your Trip with Google Maps", Visual Steps, Available on Internet at: <http://www.visualsteps.com/downloads/Free guide google maps. pdf>, Dec. 2009, 36 pages.
Navizon, "FAQ, Peer-to Peer Wireless Positioning", Available online at: <http://www.navizon.com/F AQ.htm>, Nov. 30, 2007, 8 pages.
Navizon, "How it Works", Available online at: <http://www.navizon.com/FullFeatures.htm>, Nov. 30, 2007, 7 pages.
Navizon, "The First Positioning System that Combines GPS, WiFi and Phone Positioning", Available online at: <http://www.navizon.com>, Nov. 30, 2007, 2 pages.
Pixelwit, "PageFlip", Available online at: <http://web.archive.org/web/20070419035158/http://www.oixelwit.com/blog/page-flip/>, Apr. 11, 2007, 1 page.
The Boy Genius, "Magnetometer in next iPhone Confirmed?", The Boy Genius Report, Available online at: <http://www.boygeniusreport.com/2009/05/07/magnetometer-in-next-iphone-confirmed/>, May 7, 2009, 15 pages.
Tidwell J., "Designing interfaces", O'Relly media Inc., 2006, 348 pages.
Tidwell Jenifer, "Animated Transition", Designing Interfaces, Patterns for Effective Interaction Design, First Edition, O'Reilly Media, Inc., Nov. 2005, 2 Pages.
Waypoints Maplist View, "Featured Projects", Available online at: <http://eric.wahlforss.com/folio>, Jun. 14, 2007, 3 pages.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Windows Mobile 6, "Fact Sheet", Available online at: <www.WindowsMobile.com>, 2007, 2 pages.
Windows Moblile Map Contact List, "Windows Live Search for Mobile Goes Final, Still Great", Available online at: <http://gizmodo.com/gadgets/software/windows-live-search-for-mobile-goes-final-still-great-236002.php>, Mar. 11, 2007, 3 pages.
Xiao et al., "Wireless Community Support for Community Network", Available Online at: <http://citeseerx.ist.psu.edu/viewdoc/download?doi=10.1.1.85.6793&rep=rep1&type=pdf#page=21>, 3rd International Workshop on Smart Appliances and Wearable Computing Proceedings, May 29, 2003, pp. 21-26.
Youtube, "G-Map for iPhone Demo: 3-Way Map Mode", At 1:03/1:34 Heading-up Mode, 1:34 Video Uploaded to YouTube by navi0808, Available online at: <http://www.youtube.com/watch?v=QQUsXdlXarl&feature=related>, Feb. 13, 2009, 2 pages.
Youtube, "G-Map for iPhone: About Menus and Basic Functions", At 1:37/5:49 Heading Up Map View Mode, 5:49 video uploaded to YouTube by navi0808, Available online at: <http://www.youtube.com/watch?v=tN8uW_rMOQ>, Feb. 24, 2009, 1 page.
Youtube, "G-Map for iPhone: About Menus and Book Functions", At 1:45/5:49 North-up Map View Mode, 5:49 video uploaded to YouTube by navi0808, Available online at: <http://www.youtube.com/watch?v=tN8uW_rMOQ>, 1 page.
Youtube, "G-Map U.S. iPhone Review", 6:29 video uploaded to YouTube by TapCritic, Available online at: <http://www.youtube.com/watch?v=xrWUKwXQwlQ&feature=related>, Mar. 10, 2009, 1 page.
Find & Improve your Location's Accuracy, Android—Google Maps Help, Available online at: <https://support.google.com/maps/answer/2839911?hl=en&co=GENIE.Platform%3DAndroid>, [Retrieved Nov. 14, 2022], Jan. 21, 2020, pp. 1-2.
GPSMAP 64 SERIES/GPSMAP 64X SERIES, Garmin, Owner's Manual, Available online at: <https://www8.garmin.com/manuals/webhelp/gpsmap64/EN-US/GPSMAP_64_OM_EN-US.pdf>, 2013, 20 pages.
International Search Report received for PCT Patent Application No. PCT/US2021/033022, dated Oct. 27, 2021, 6 pages.
Praxistest Garmin GPSMAP 66st, Der Schweizer Geocaching-Podcast, Available online at: <https://podcast.paravan.ch/2018/10/praxistest-garmin-gpsmap-66st/>, [Retrieved Nov. 14, 2022], Oct. 27, 2018, 16 pages.
AARP Online Learning Videos, "Getting Directions with Google Maps Android", Youtube, Available online at: <https://www.youtube.com/watch?v=wsWwnq97ywQ>, [Retrieved Nov. 14, 2022], May 18, 2016, pp. 1-3.
Airtel India, "How to Use Google Maps on your Android Smartphone? (English)", Youtube, Available online at: <https://www.youtube.com/watch?v=zcEjWrfrMOE>, [Retrieved Nov. 14, 2022], Aug. 22, 2014, 3 pages.
Buczkowski, Aleks, "Google Maps Get Redesign of the Blue Dot Showing your Position", Geoawesomeness, Available online at: <https://geoawesomeness.com/google-maps-get-redesign-of-the-blue-dot-showing-your-position/>, [Retrieved Nov. 14, 2022], Sep. 23, 2016, 6 pages.
GPSCITY, "Garmin GPSMAP 64 Series: Customizing Data Fields with GPS City", Youtube, Available online at: <https://www.youtube.com/watch?v=1cLuz05lxZ0&t=114s>, [Retrieved Nov. 14, 2022], Mar. 25, 2014, pp. 1-3.
Ohse, Sandra, "Google Maps-App: Erste Schritte und simple Kniffe", PC-Welt, Available online at: <https://www.pcwelt.de/article/1163314/google-maps-app-erste-schritte-und-simple-kniffe.html>, [Retrieved Nov. 14, 2022], May 6, 2017, 20 pages.
Non-Final Office Action received for U.S. Appl. No. 16/901,269, dated Mar. 24, 2022, 14 Pages.
Garmin, "GARMIN DRIVEASSIST 51 Owner's Manual", Available online at: <https://www8.garmin.com/manuals/webhelp/driveassist51/EN-US/DriveAssist_51_OM_WebHelp_EN-US.pdf>, [retrieved from Internet on May 6, 2022], 2017, 34 Pages.
Final Office Action received for U.S. Appl. No. 16/901,269, dated Nov. 25, 2022, 17 pages.
Corrected Notice of Allowability received for U.S. Appl. No. 16/901,269, mailed on Oct. 30, 2023, 2 pages.
Notice of Allowance received for U.S. Appl. No. 16/901,269, mailed on Jul. 18, 2023, 9 pages.
[You Can't Ask Me This Now] How to Use Google Maps, the Basics! Introduces Everything from How to Operate to Useful Functions! [App Description], Available online at: https://www.youtube.com/watch?v=qRkMW2f-Q78>, [retrieved on Jan. 19, 20249], Feb. 26, 2020, 5 pages (Official Copy Only). See attached Communication 37 CFR § 1.98(a)(3).

* cited by examiner

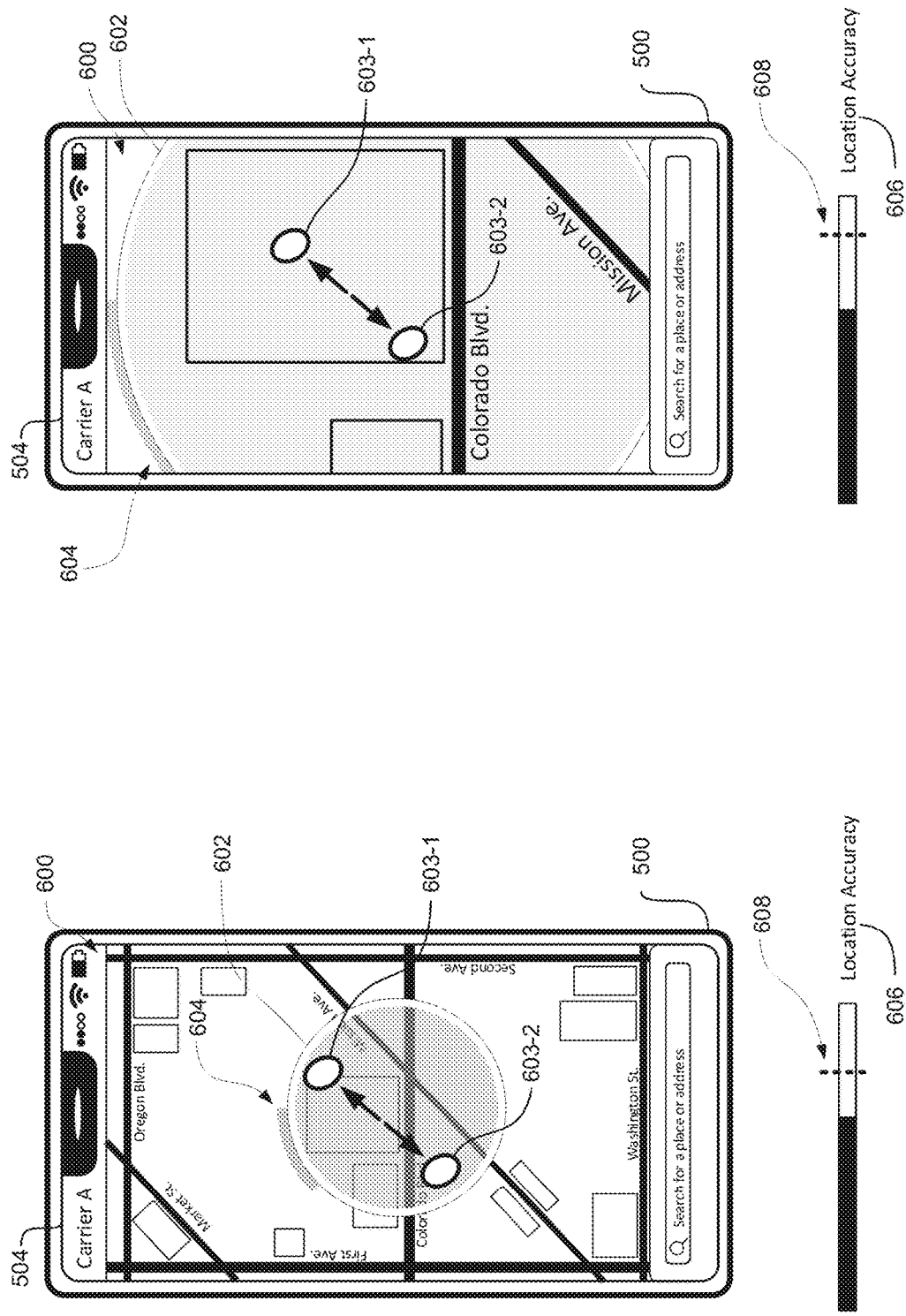

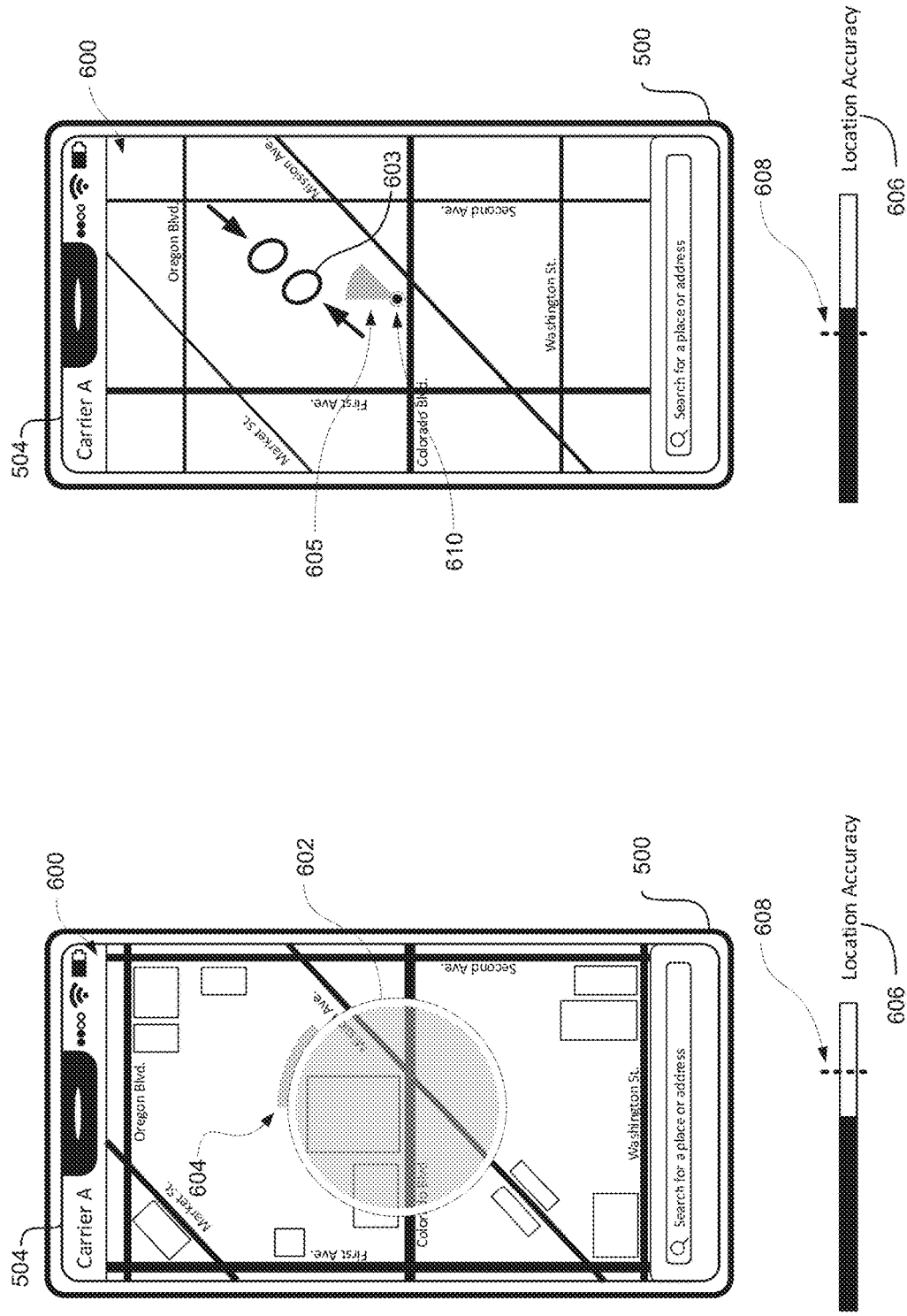

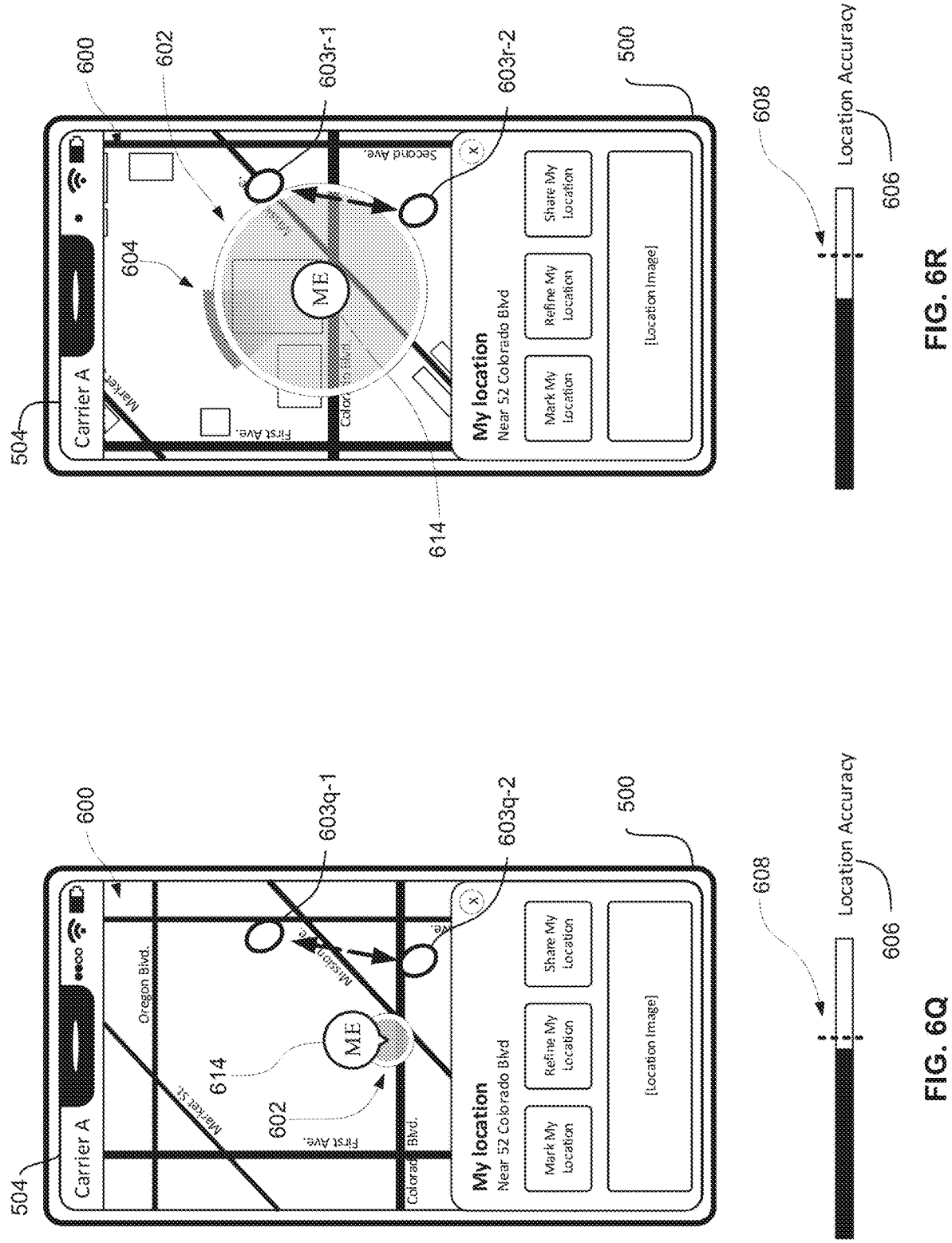

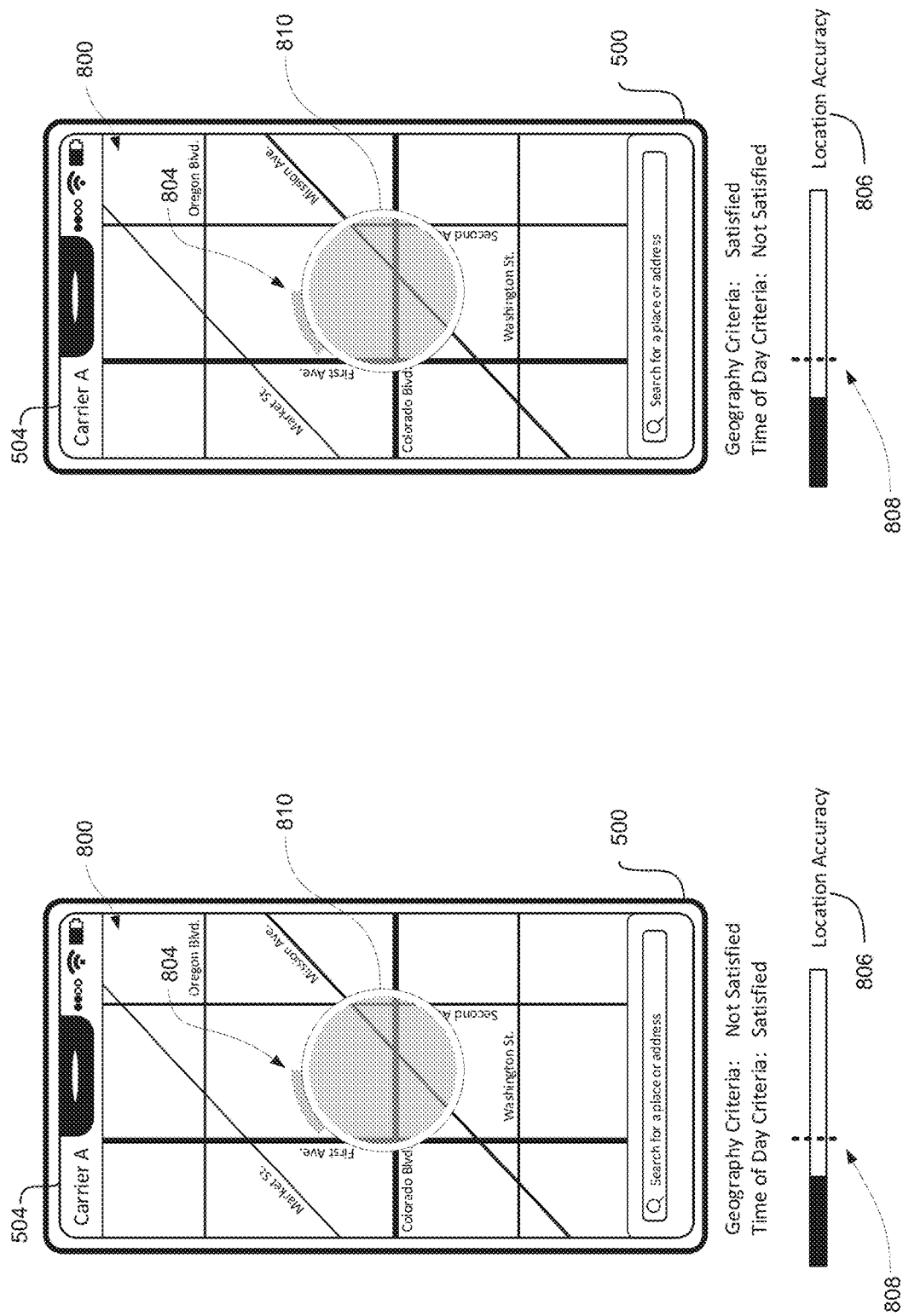

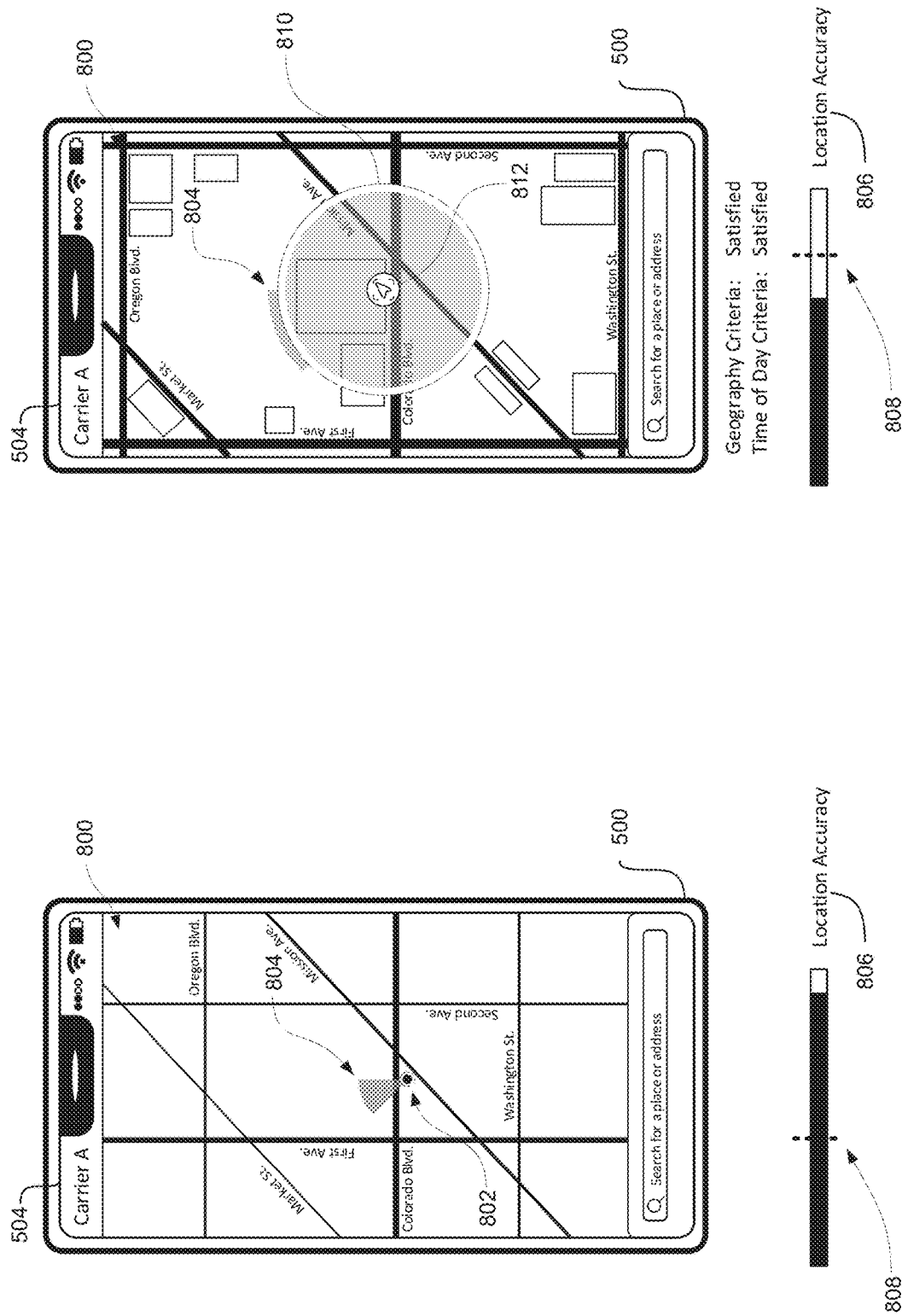

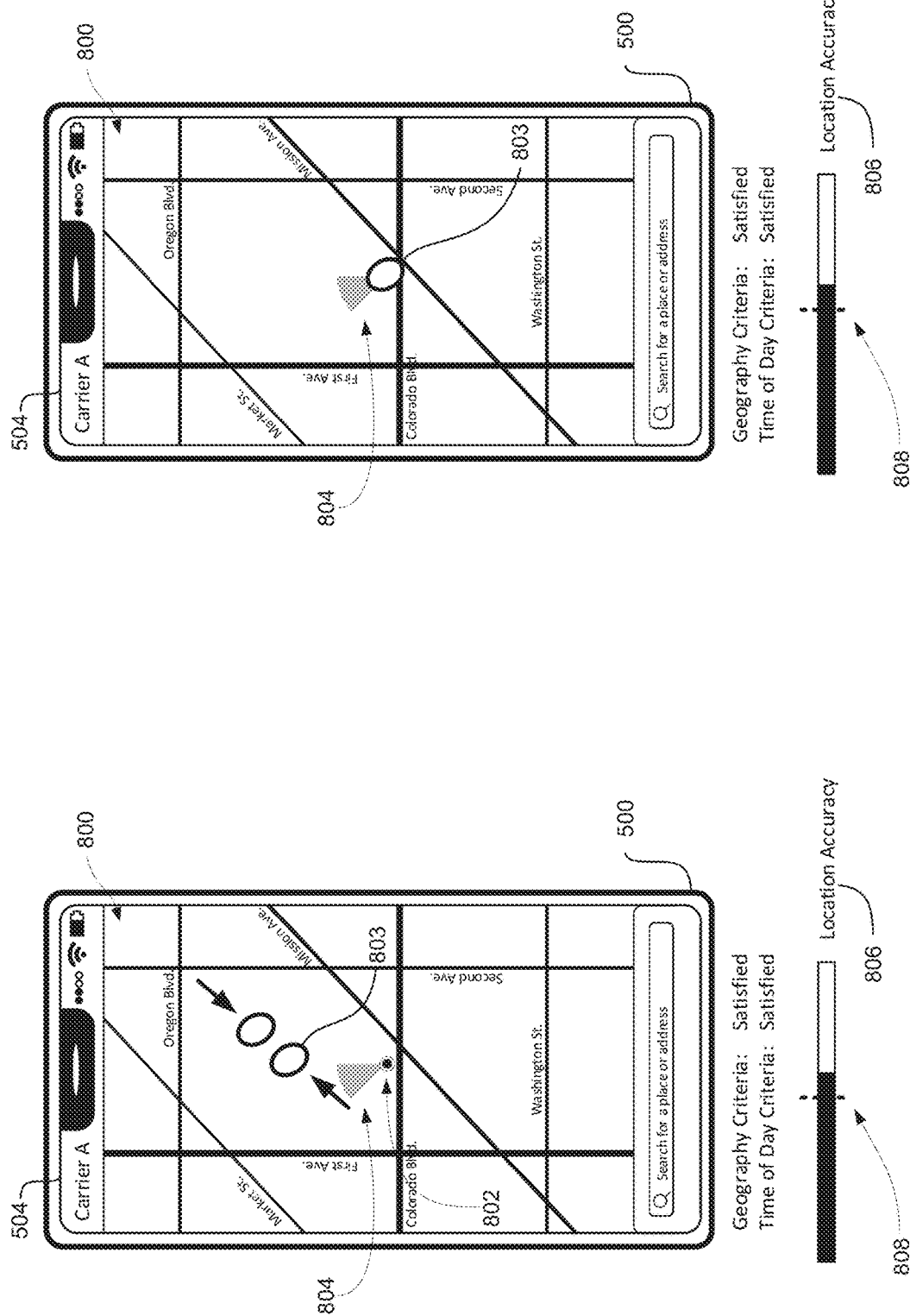

USER INTERFACES FOR VIEWING AND REFINING THE CURRENT LOCATION OF AN ELECTRONIC DEVICE

CROSS-REFERENCE TO RELATED APPLICATIONS

This application claims benefit of U.S. Provisional Application No. 63/026,275, filed May 18, 2020, and U.S. Provisional Application No. 63/041,984, filed Jun. 21, 2020, the contents of which are hereby incorporated by reference in their entireties for all purposes.

FIELD OF THE DISCLOSURE

This related generally to user interfaces that enable a user to view and/or refine the current location of an electronic device.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, such a device displays map user interfaces. In some circumstances, map user interfaces display an indication of the device's current location.

SUMMARY OF THE DISCLOSURE

Some embodiments described in this disclosure are directed to displaying an indication of the current location of the electronic device. Some embodiments described in this disclosure are directed to improving the accuracy of the determined location of the electronic device.

The embodiments described in this disclosure enhance the user's ability to view and refine the device's current location. Enhancing the user's ability to view and refine the device's current location enhances the user's interactions with the device. Enhancing the user's interactions with the device improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
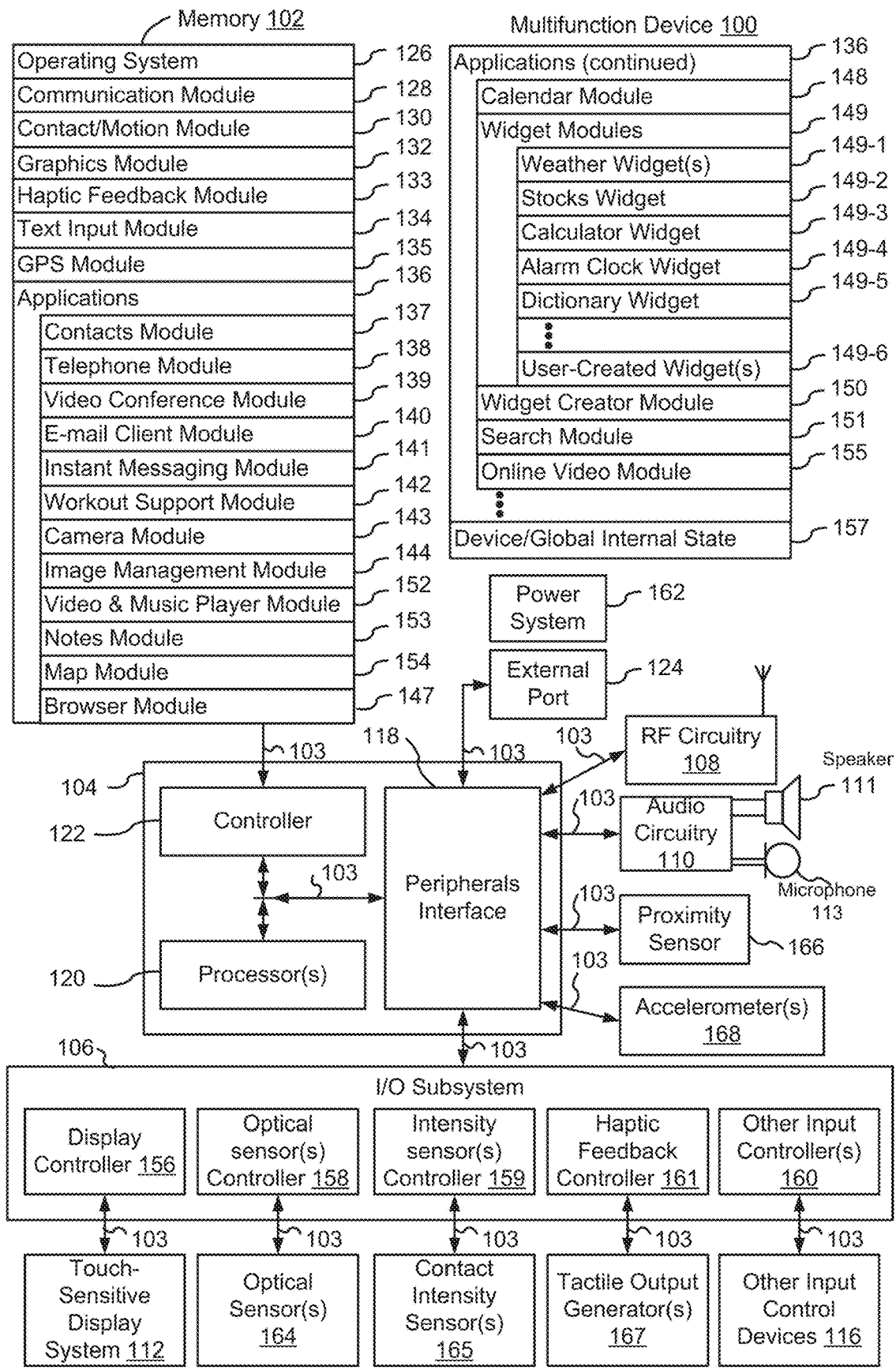
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, device 100 is a portable computing system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system (e.g., an integrated display, touch screen 112, etc.). In some embodiments, the display generation component is separate from the computer system (e.g., an external monitor, a projection system, etc.). As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
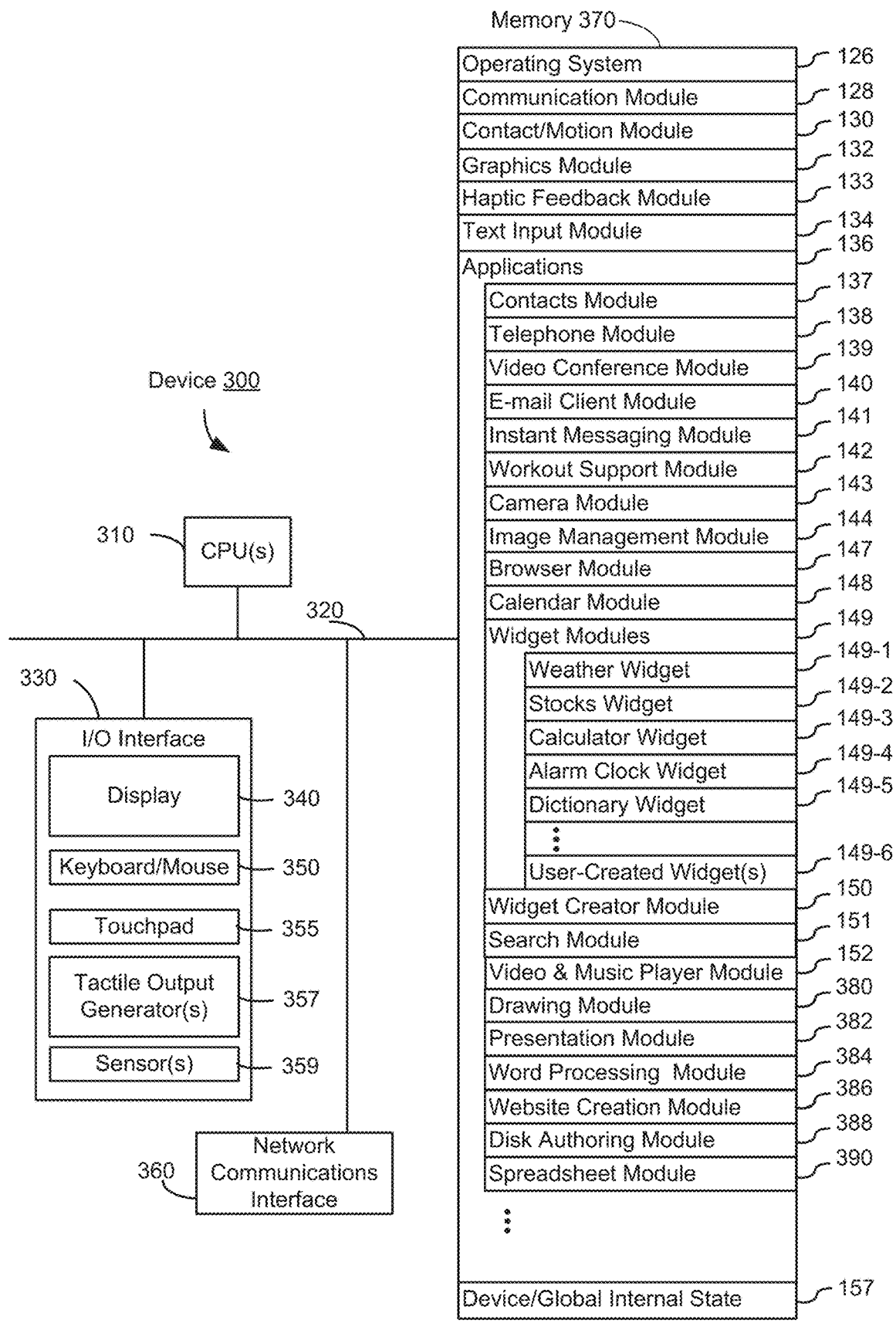
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
video player module;
music player module;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which merges video player module and music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are, optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
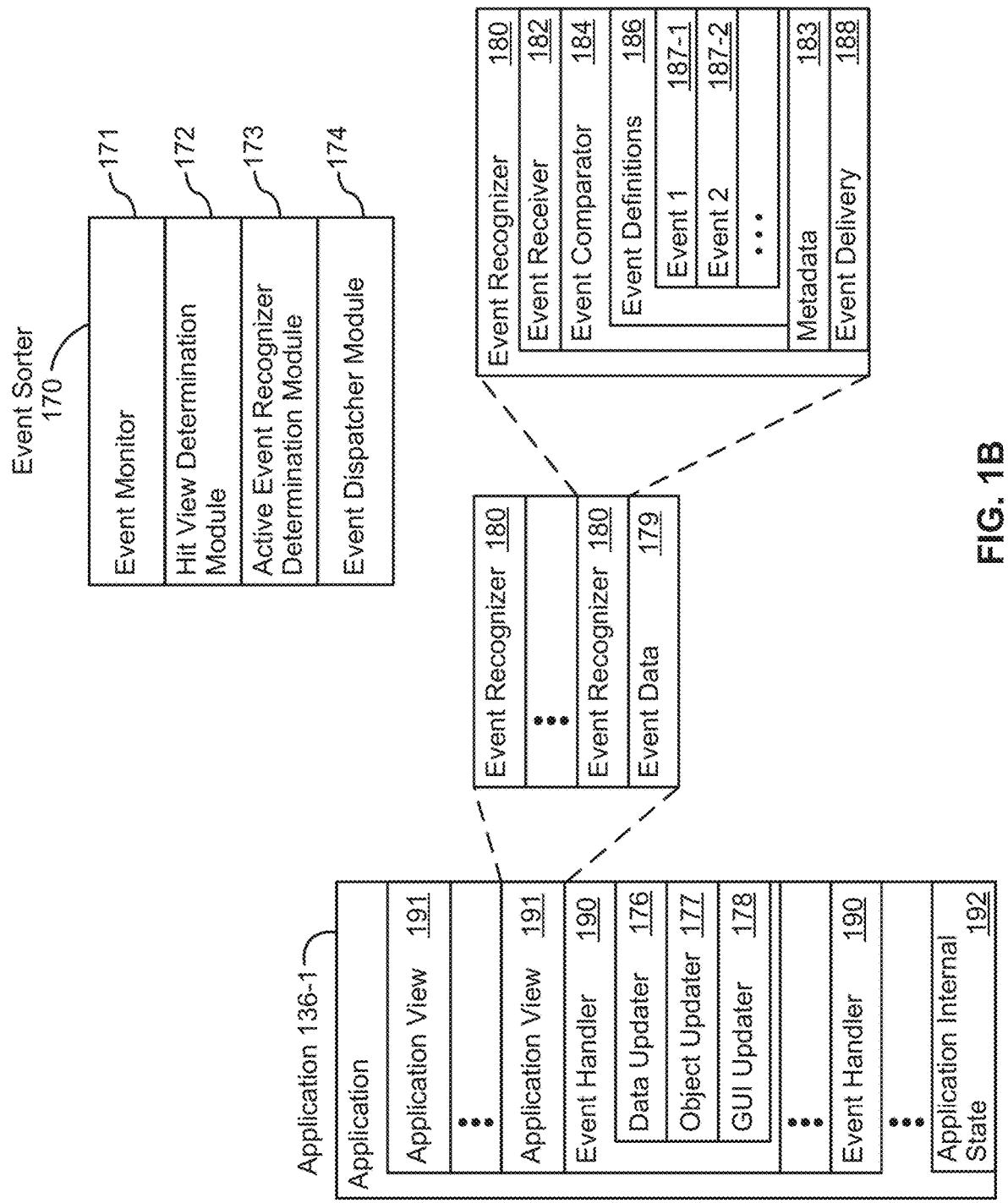
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
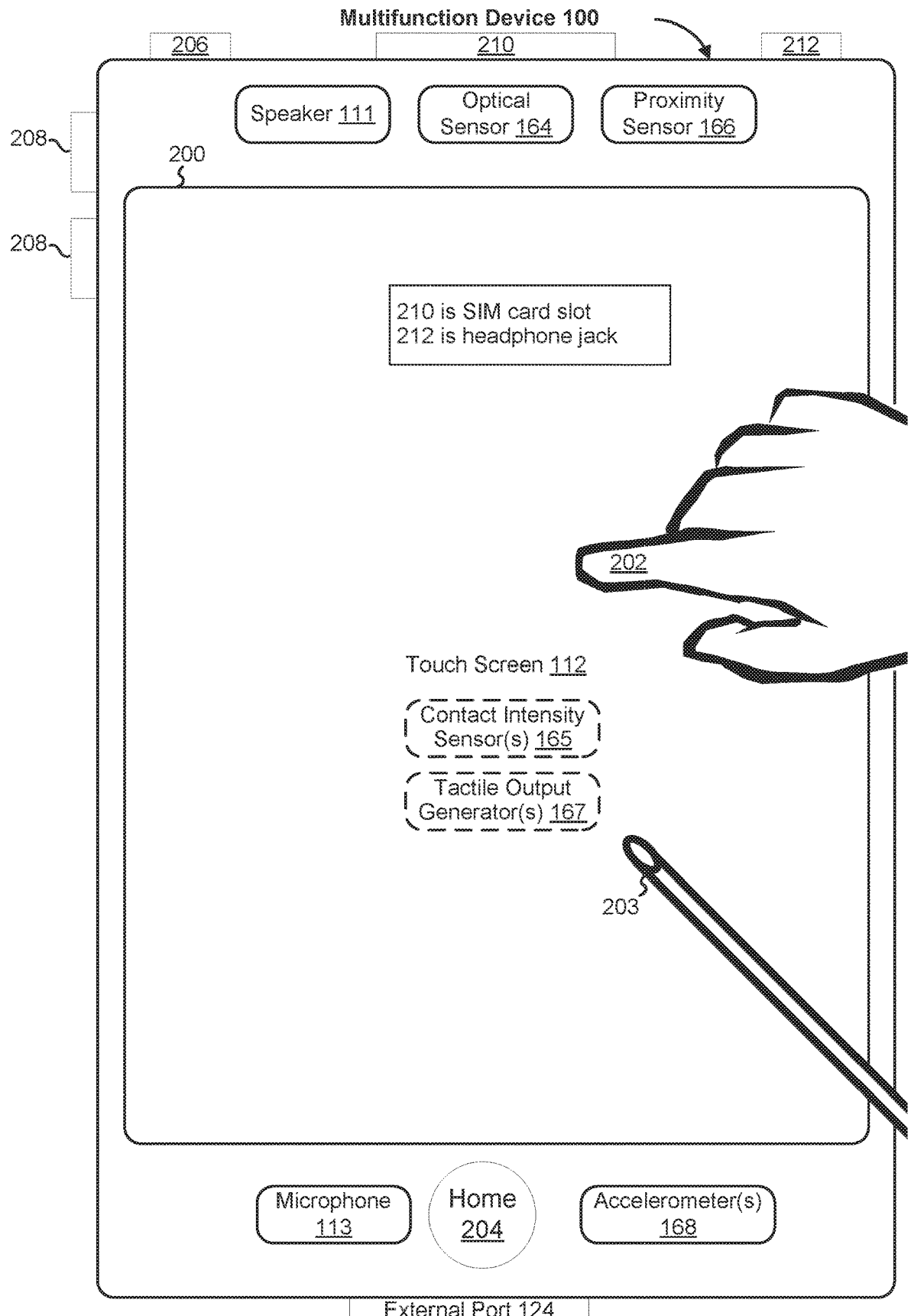
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
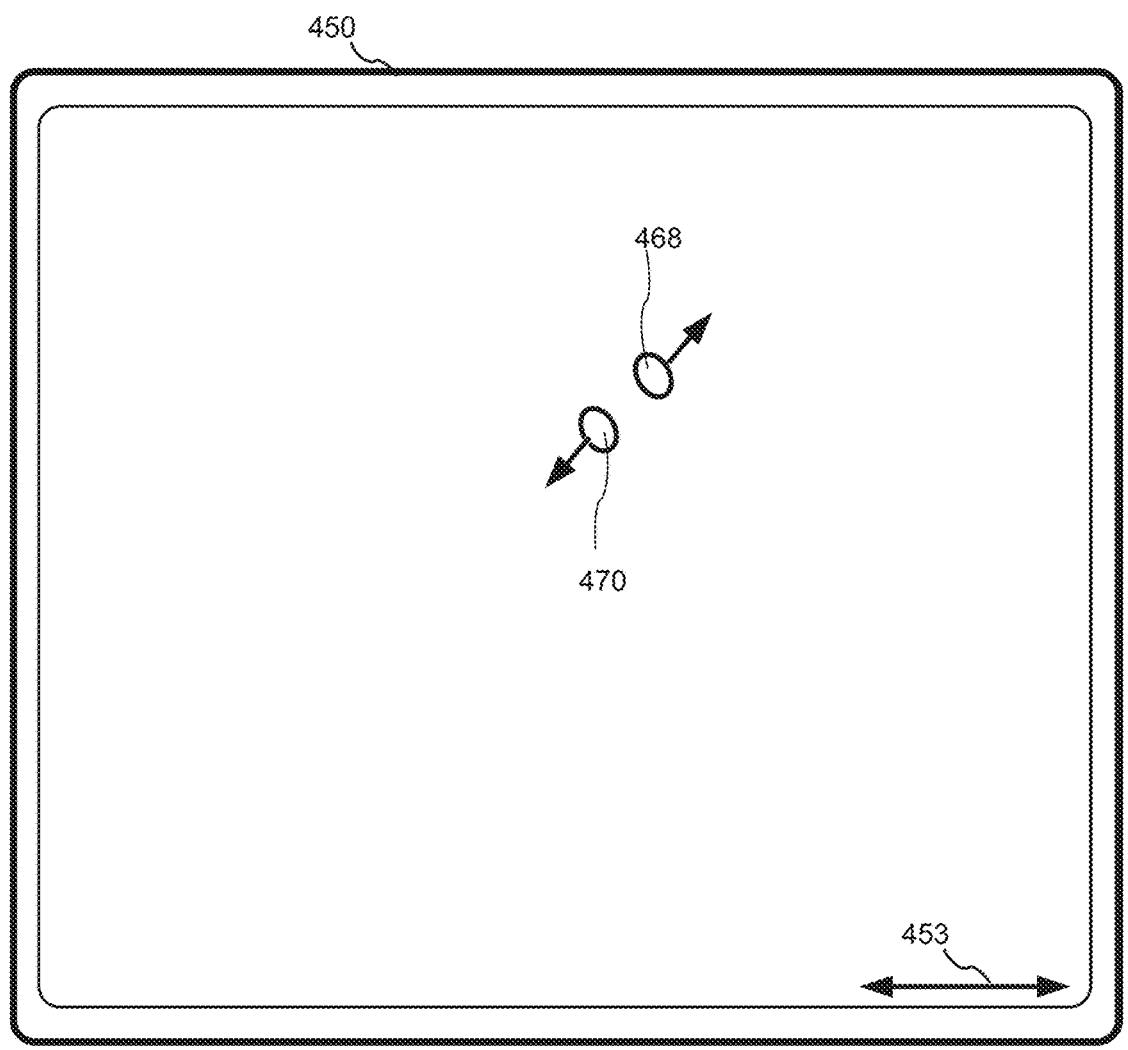
FIG. 4 illustrates an exemplary user interface for a multifunction device with a touch-sensitive surface that is separate from the display in accordance with some embodiments of the disclosure.
Figure 4:
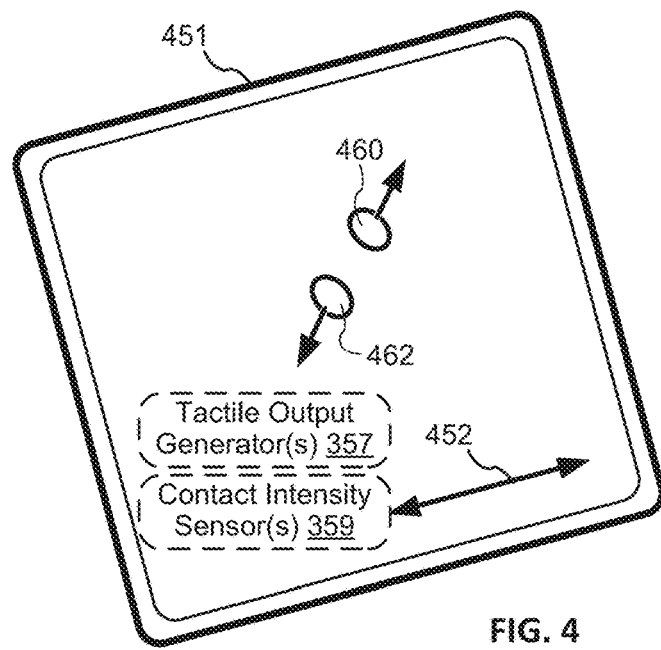

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples that follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
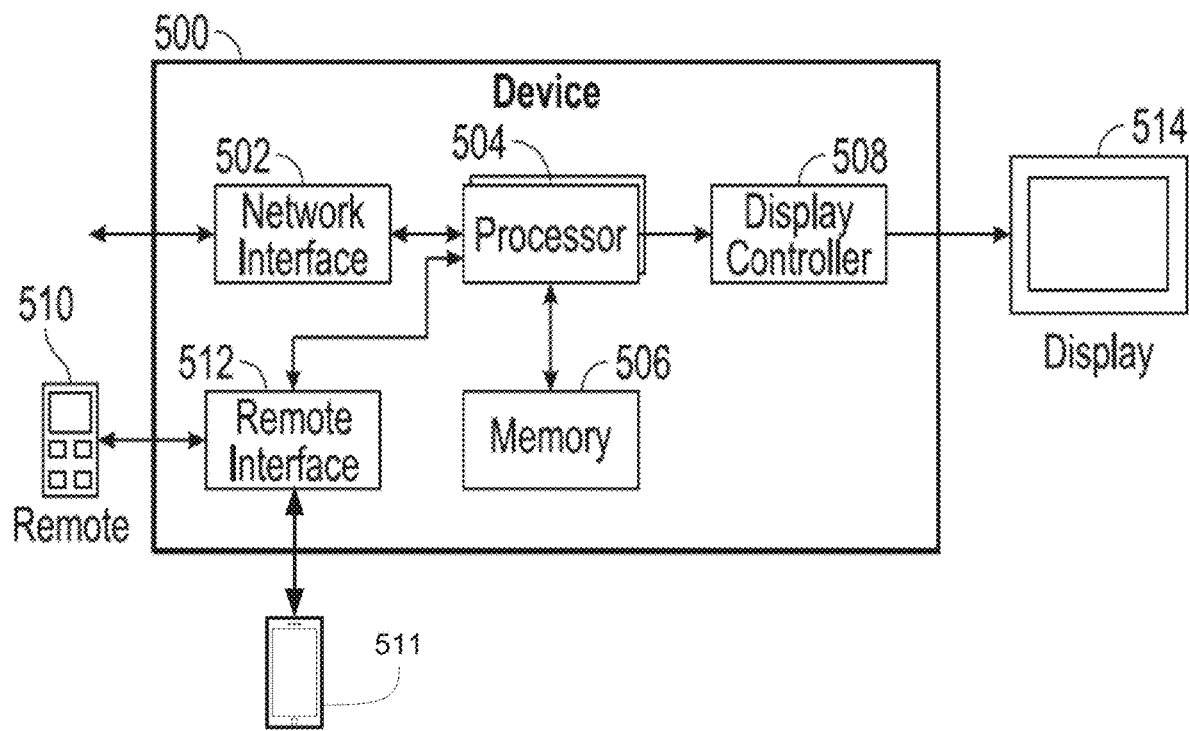
FIGS. 5A-5B illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., methods 700 and 900).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
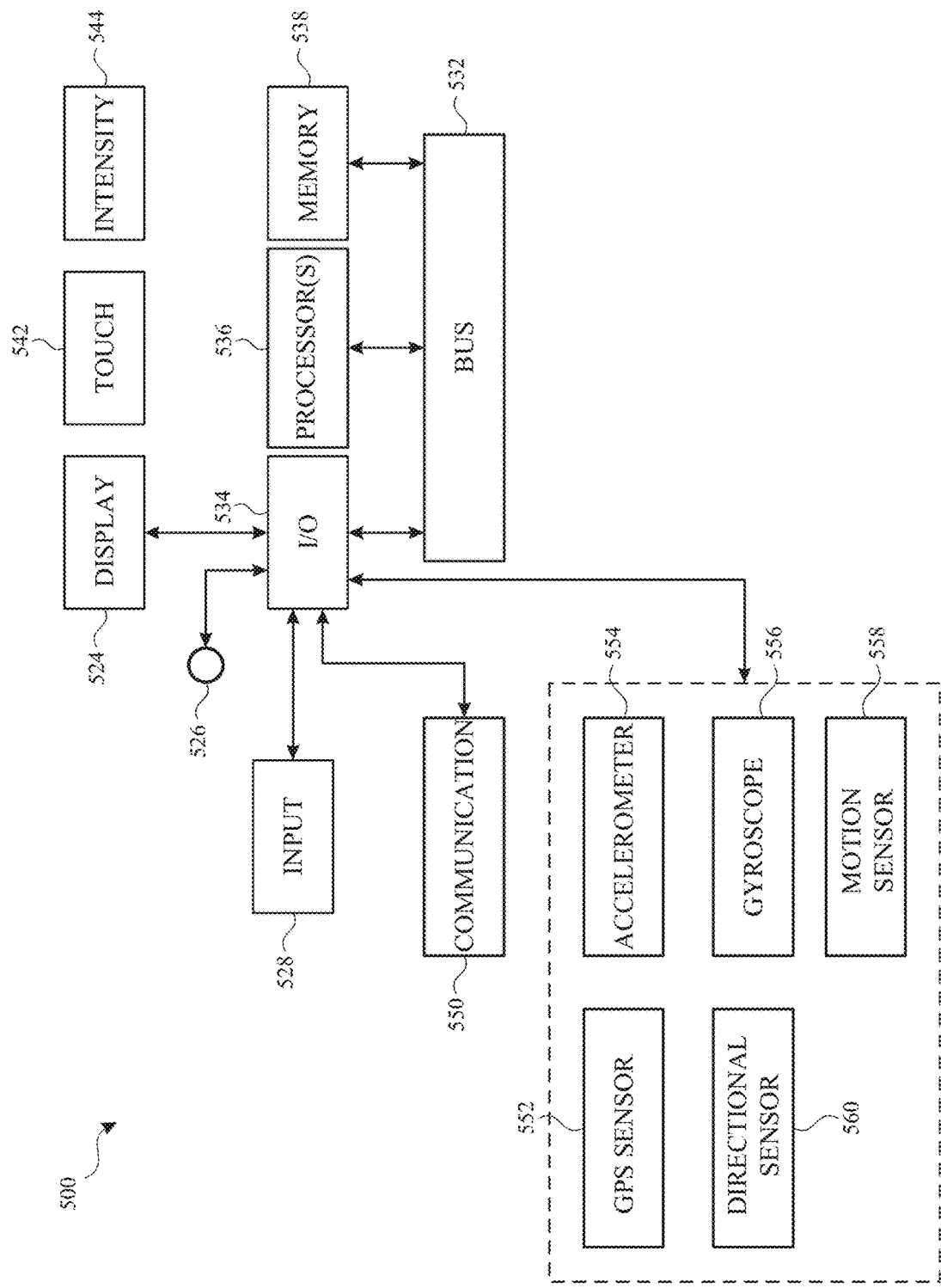

FIG. 5B depicts exemplary personal electronic device 500. In some embodiments, device 500 can include some or all of the components described with respect to FIGS. 1A, 1B, and 3. Device 500 has bus 532 that operatively couples I/O section 534 with one or more computer processors 536 and memory 538. I/O section 534 can be connected to display 524, which can have touch-sensitive component 522 and, optionally, intensity sensor 544 (e.g., contact intensity sensor). In addition, I/O section 534 can be connected with communication unit 50 for receiving application and operating system data, using Wi-Fi, Bluetooth, near field communication (NFC), cellular, and/or other wireless communication techniques. Device 500 can include input mechanisms 526 and/or 528. Input mechanism 526 is, optionally, a rotatable input device or a depressible and rotatable input device, for example. Input mechanism 528 is, optionally, a button, in some examples.

Input mechanism 528 is, optionally, a microphone, in some examples. Personal electronic device 500 optionally includes various sensors, such as GPS sensor 552, accelerometer 554, directional sensor 560 (e.g., compass), gyroscope 556, motion sensor 558, and/or a combination thereof, all of which can be operatively connected to I/O section 534.

Memory 538 of personal electronic device 500 can include one or more non-transitory computer-readable storage mediums, for storing computer-executable instructions, which, when executed by one or more computer processors 536, for example, can cause the computer processors to perform the techniques described below, including processes described with reference to FIGS. 6-9. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations, such as those described above with respect to FIGS. 1-3 and 5A.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, 500 and/or 511 (FIGS. 1A, 3, and 5A-5B). For example, an image (e.g., icon), a button, and text (e.g., hyperlink) each optionally constitute an affordance.

As used herein, "installed application" refers to a software application that has been downloaded onto an electronic device (e.g., devices 100, 300, 500, and/or 511) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, device 500, or device 511.

User Interfaces and Associated Processes

User Interfaces for Displaying a Current Location of an Electronic Device

Users interact with electronic devices in many different manners, including using an electronic device to view and find geographic locations on a map. In some embodiments, a user can view the electronic device's determined location on the map. The embodiments described below provide ways for displaying the electronic device's determined location on a map, thus enhancing the user's interactions with the electronic device. Enhancing interactions with a device reduces the amount of time needed by a user to perform operations, and thus reduces the power usage of the device and increases battery life for battery-powered devices.

Figure 6B:
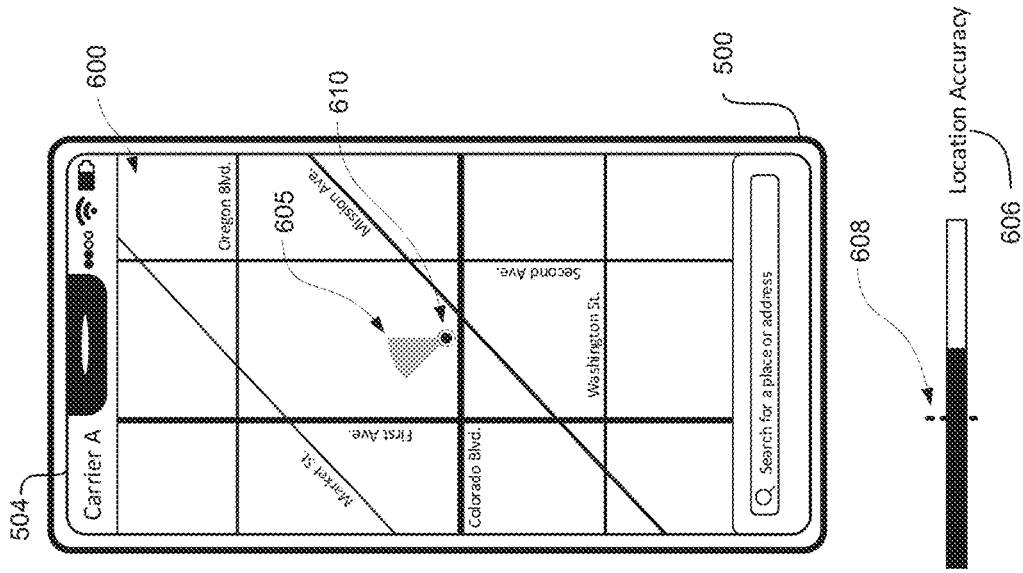
FIGS. 6A-6T illustrate exemplary ways in which an electronic device indicates the current location of the electronic device in accordance with some embodiments of the disclosure.
Figure 6A:
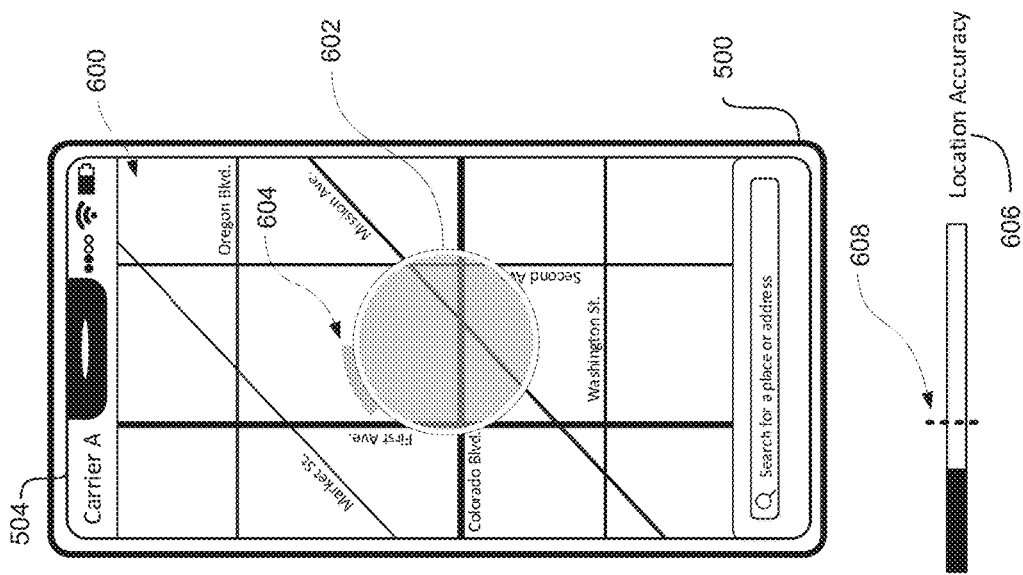
Figure 6D:
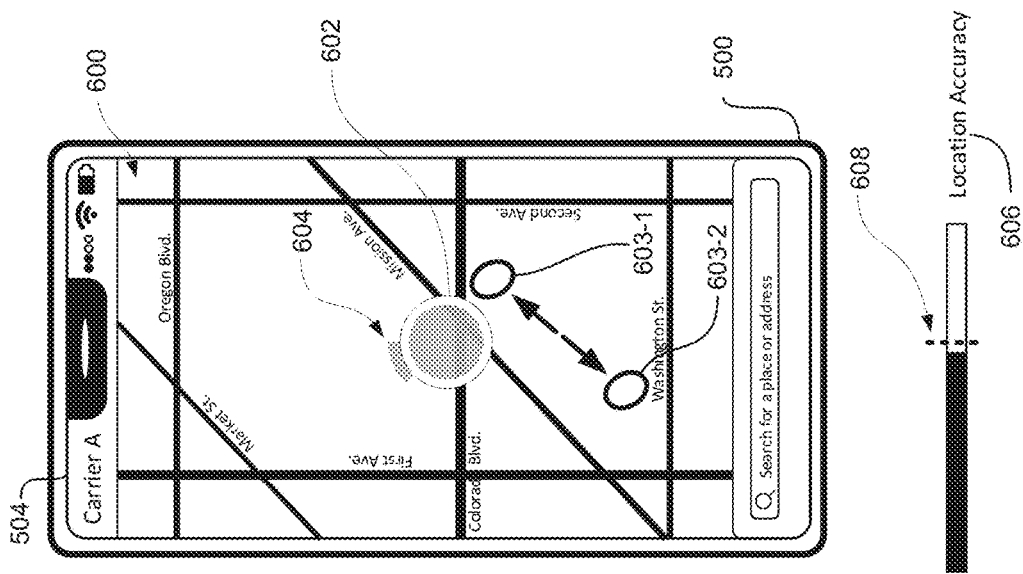
Figure 6C:
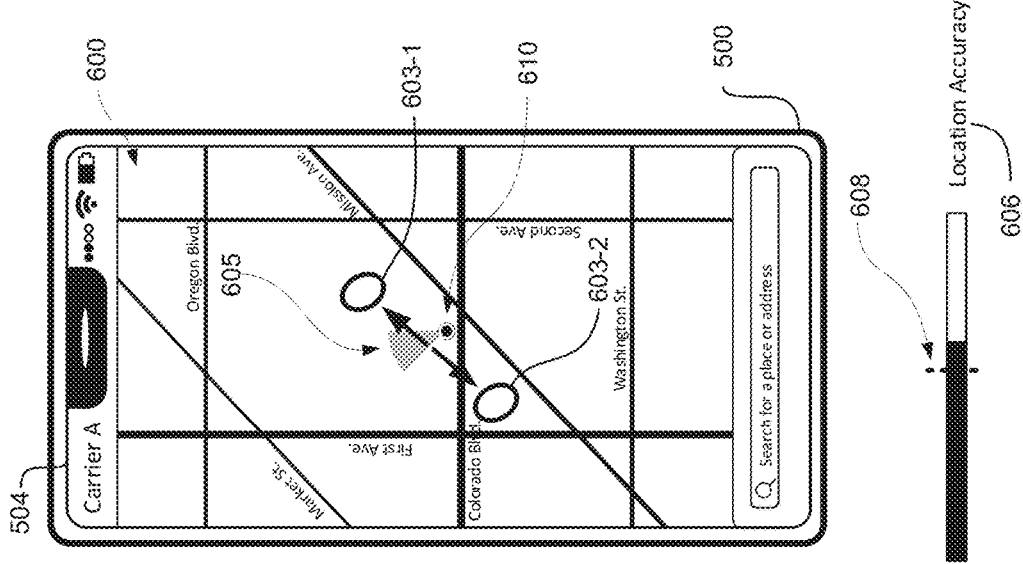
Figure 6H:
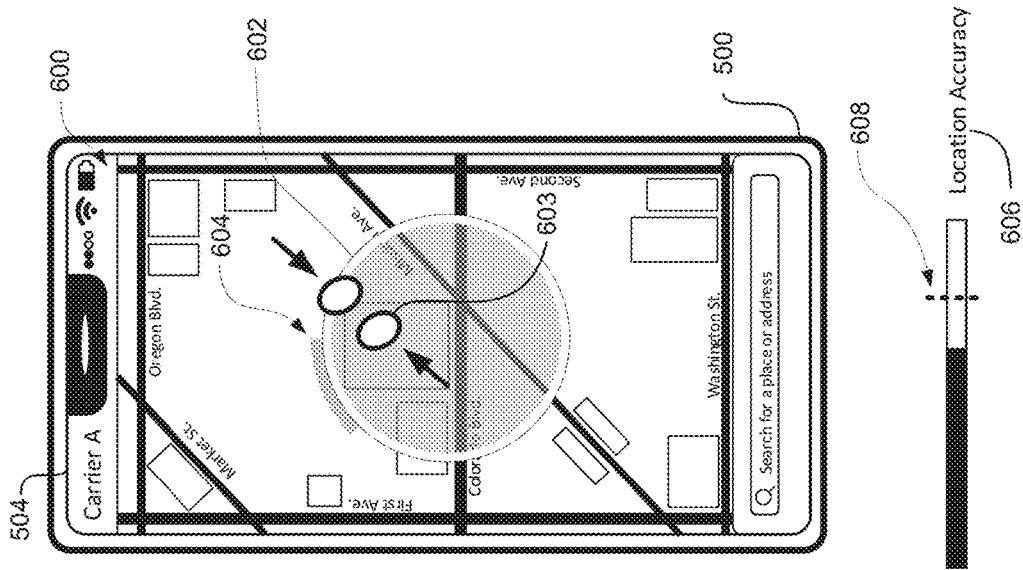
Figure 6G:
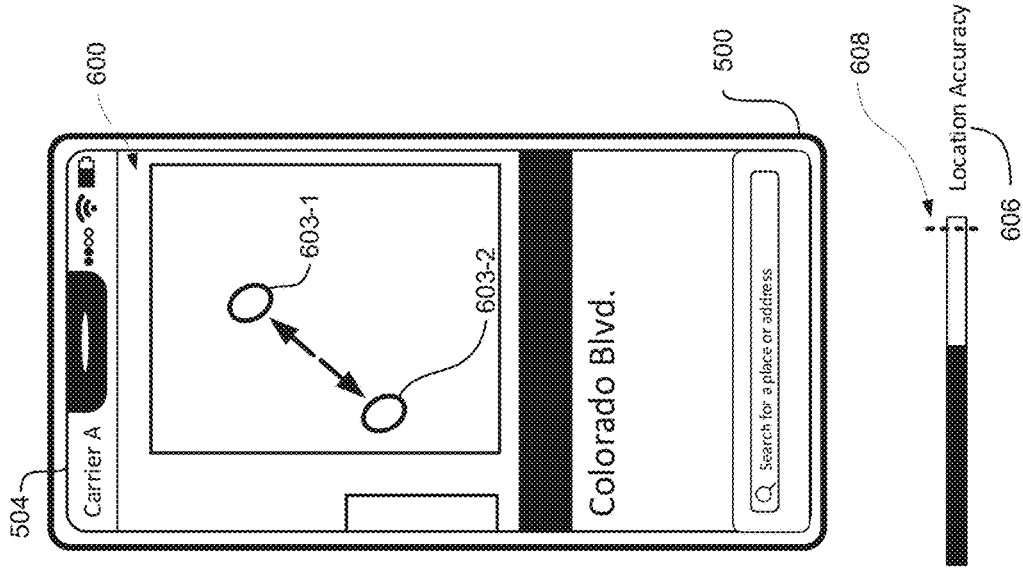
Figure 6L:
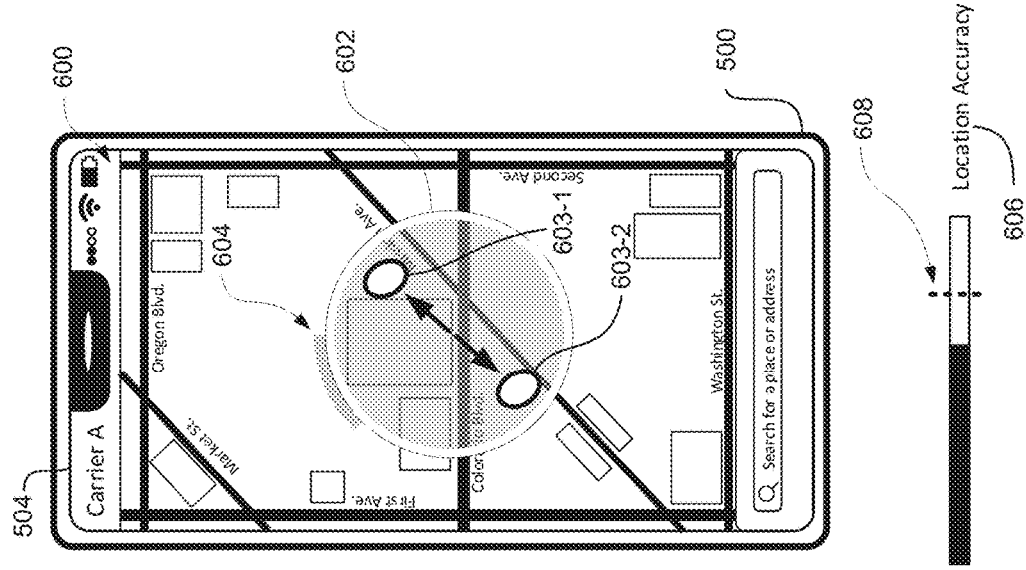
Figure 6K:
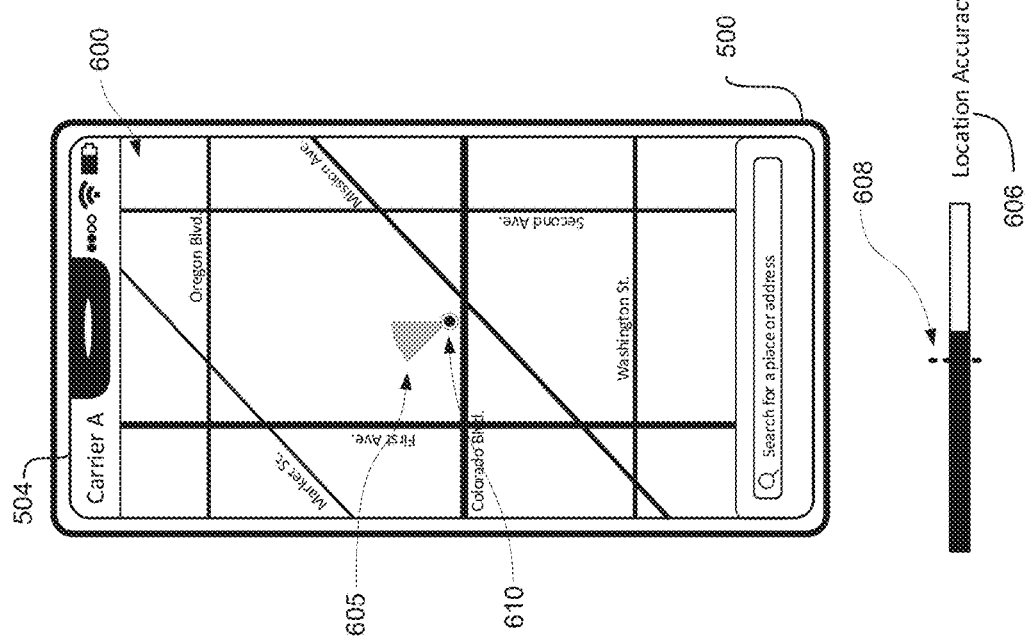
Figure 6N:
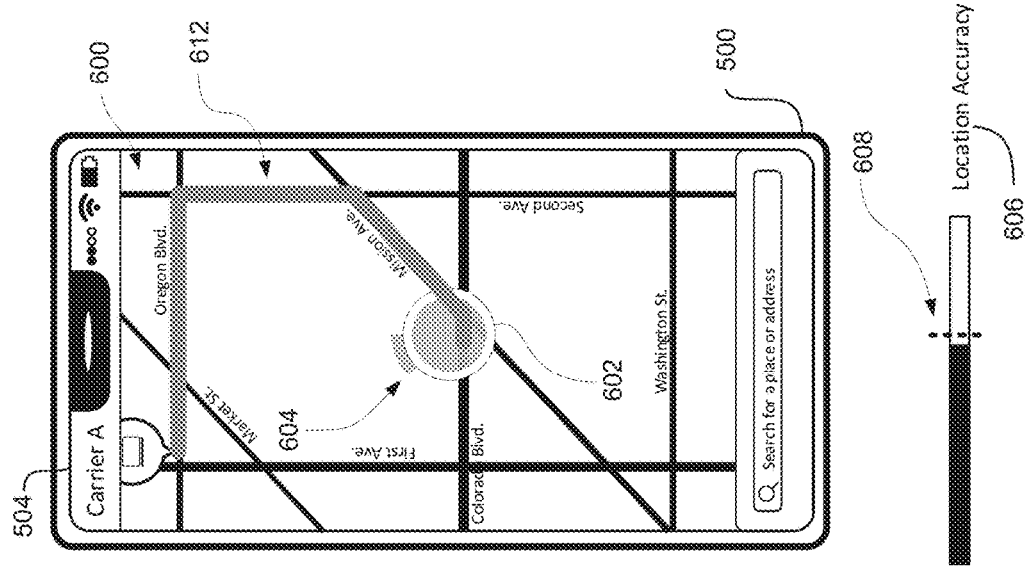
Figure 6M:
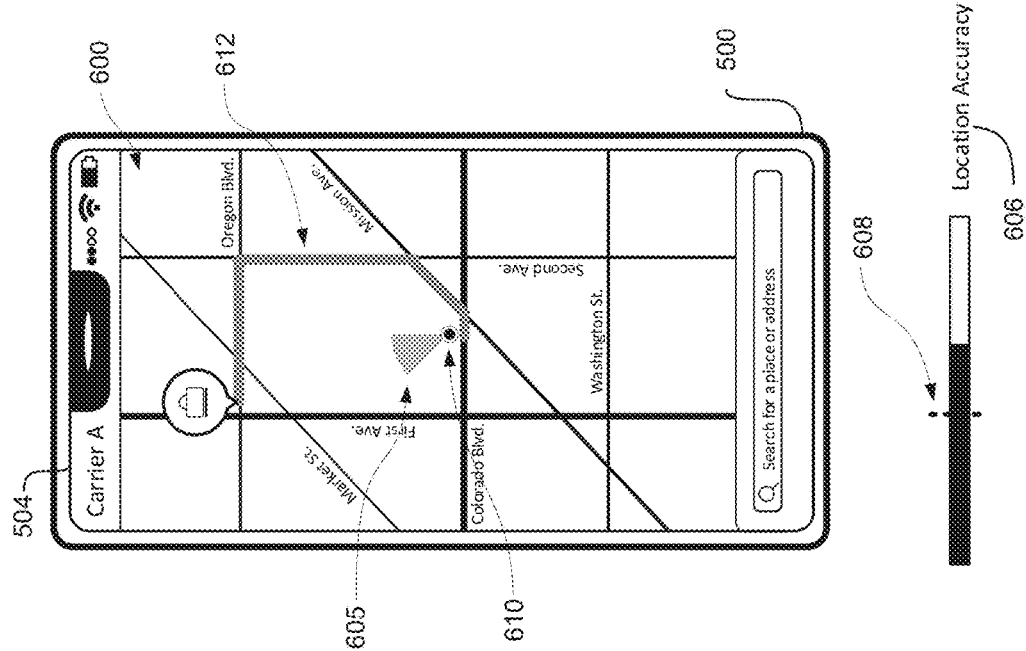
Figure 6P:
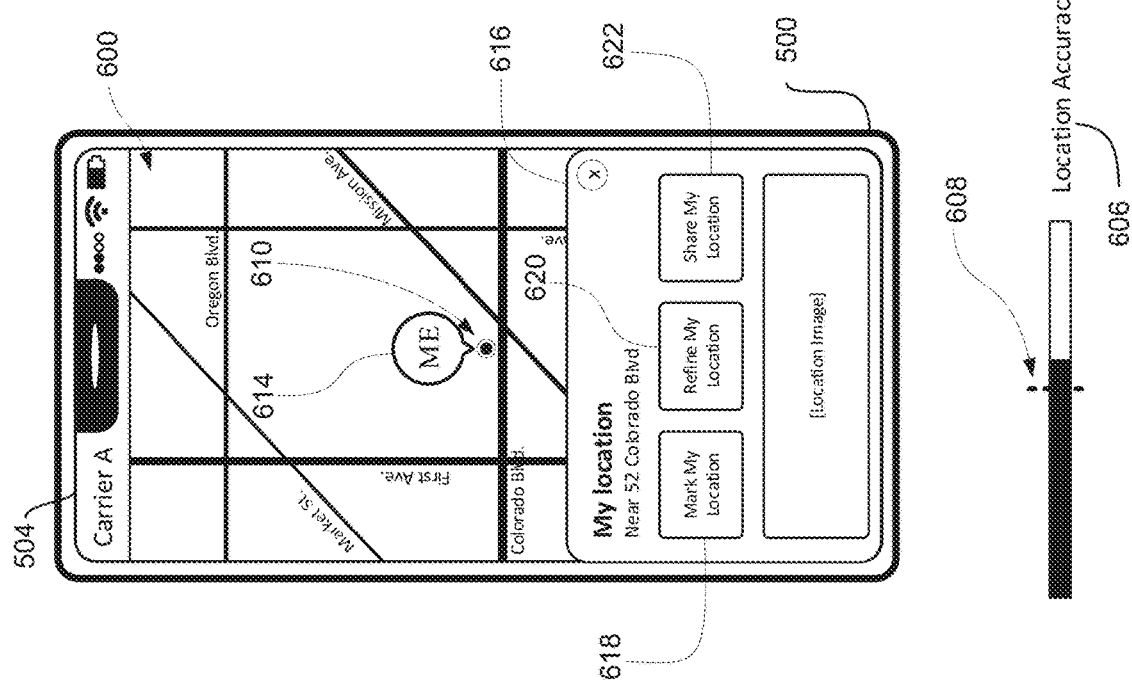
Figure 6O:
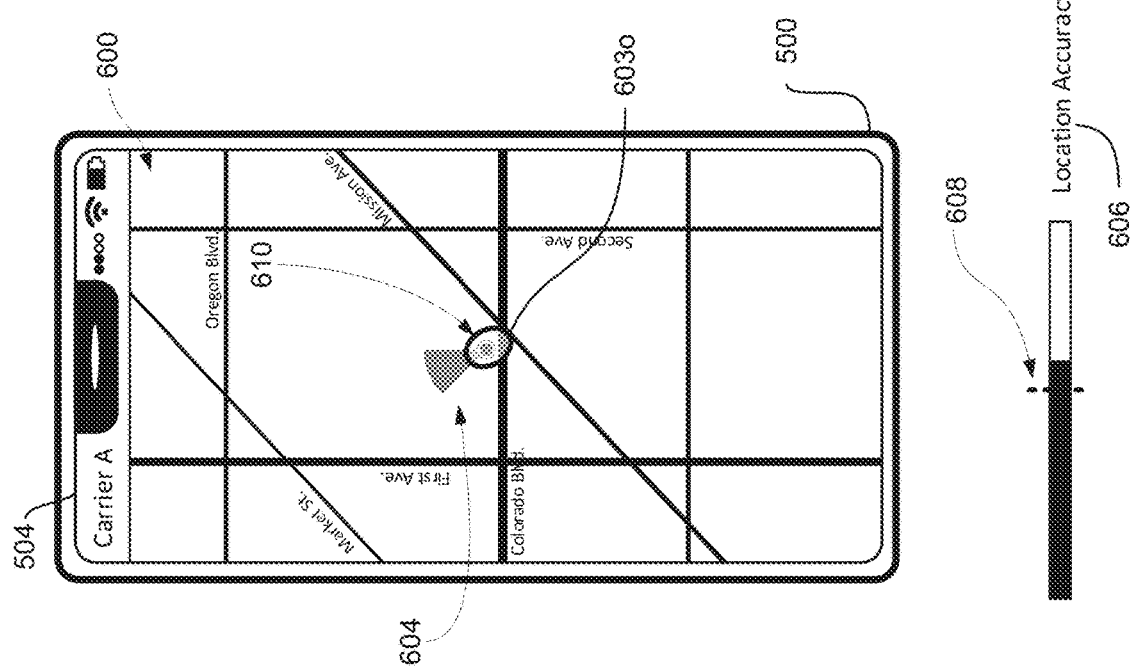
Figure 6T:
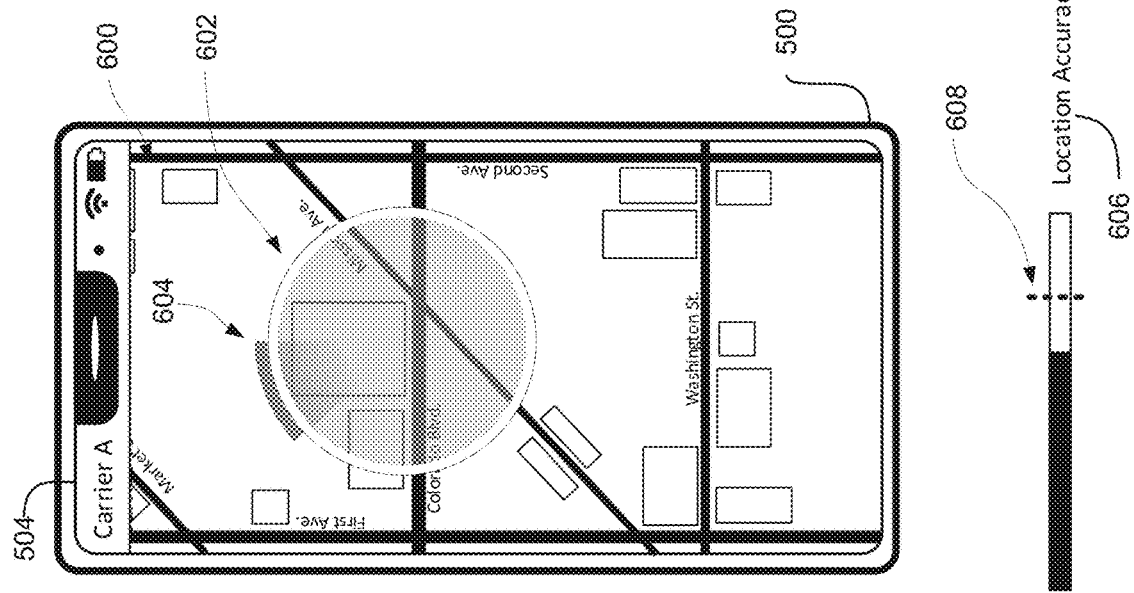

FIGS. 6A-6T illustrate exemplary ways in which an electronic device indicates the current location of the electronic device in accordance with some embodiments of the disclosure. The embodiments in these figures are used to illustrate the processes described below, including the processes described with reference to FIG. 7.

FIG. 6A illustrates electronic device 500 displaying user interface 600 (e.g., via a display device, via a display generation component, etc.). In some embodiments, user interface 600 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 600 is a user interface of a map application (e.g., an application in which a user is able to view geographic locations, search for locations, and/or request directions from one location to another). In some embodiments, the map application is an application installed on device 500.

In some embodiments, the map application can present maps, routes, location metadata, and/or imagery (e.g., captured photos) associated with various geographical locations, points of interest, etc. Map application can obtain map data that includes data defining maps, map objects, routes, points of interest, imagery, etc., from a navigation server. For example, the map data can be received as map tiles that include map data for geographical areas corresponding to the respective map tiles. The map data can include, among other things, data defining roads and/or road segments, metadata for points of interest and other locations, three-dimensional models of the buildings, infrastructure, and other objects found at the various locations, and/or images captured at the various locations. Map application can request from a navigation server through a network (e.g., local area network, cellular data network, wireless network, the Internet, wide area network, etc.) map data (e.g., map tiles) associated with locations that device 500 frequently visits. Map application can store the map data in a map database. Map application can use the map data stored in the map database and/or other map data received from device 500 to provide the navigation application features described herein (e.g., dynamic street scene overlay, compositing images to improve image quality, and/or introducing virtual parallax to create three-dimensional effects).

In some embodiments, the navigation server can be a software server configured to obtain, generate, and/or store map data. For example, the navigation server can obtain a lidar generated point cloud (e.g., points that define locations of surfaces of objects in the vicinity of an image capture location) for various locations included in the map data. The navigation server can generate a three-dimensional model (e.g., three-dimensional mesh) for each of the various locations using the respective point clouds for the locations. The navigation server can obtain images captured at the various locations (e.g., capture locations) and use the images to add texture to the three-dimensional model thereby generating a photorealistic three-dimensional image representing the corresponding location. For example, the captured images (e.g., photographs, panorama photographs, etc.) can be stretched over the surfaces of the three-dimensional model for a particular location to generate a photorealistic three-dimensional view of the particular location. The three-dimensional models and textures (e.g., captured images, stretched images, images applied to the three-dimensional model, etc.) can be stored in a map database on the navigation server and served to user devices (e.g., device 500) to provide the various features and functions described herein. The navigation server can be configured to obtain, generate, and/or store other map data in the map database.

In FIG. 6A, user interface 600 includes a representation of a map corresponding to the determined current location of the electronic device. For example, in FIG. 6A, user interface 600 displays a particular geographic location, including representations of roads, landmarks, businesses, and/or buildings, etc. In some embodiments, user interface 600 includes graphical representation of roads, buildings, points of interest, and/or other map data. In some embodiments, user interface 600 can include a text field for entering search criteria for finding a place or address. For example, a user can type the name of a place (e.g., business, landmark, etc.) or an address in a text entry box to cause map application to initiate a search for the user-specified place or address. For example, the map application can search through a map database for locations (e.g., places) that match the search criteria. The map application can send a request to a navigation server to cause the navigation server to search for locations that match the search criteria. After obtaining map data corresponding to the search criteria, the navigation application can present a list of places that match the search criteria and the user may select one of the places to cause the place (e.g., address, point of interest, landmark, etc.) to be presented on user interface 600.

In FIG. 6A, user interface 600 includes a location indicator that indicates the location of the electronic device as determined by the electronic device. In some embodiments, user interface 600 does not include a location indicator if location services are disabled and/or the device is unable to determine the current location of the device with enough accuracy (e.g., accuracy at or above a preset threshold).

In some embodiments, the electronic device includes one or more components for determining the location of the electronic device. In some embodiments, the electronic device includes a GPS receiver that is configured to receive signals from one or more GPS satellites and determine the device's location based on the signals received from the GPS satellites. In some embodiments, the electronic device is able to receive signals from a cellular or WiFi network and determine the device's location based on the signals received from the cellular or WiFi network. In some embodiments, other methods of determining the device's location are possible. In some embodiments, device 500 is able to use multiple methods to determine the device's current location (e.g., a combination of GPS satellites and cellular tower triangulation, etc.).

In some embodiments, based on the one or more methods of determining the device's location, the device is able to determine the device's location to a certain level of accuracy. For example, if the device is receiving signals from only one GPS satellite, then the device's location that can be derived from the signal from the one satellite is not very accurate and is only able to narrow down the device's location to a large geographic area. Similarly, if the device is receiving signals from many satellites, then the device's location, derived from the multiple signals, is more accurate and the device is able to narrow down the device's location to a smaller geographic area. For example, receiving signals from multiple GPS satellites allows the device to triangulate the device's location to a certain level of accuracy. Thus, based on the number of GPS satellites from which the device is receiving signals, the device is able to determine the geographic area in which the device is within. In some embodiments, margin of errors exists inherently in the location determination based on the number of GPS satellites the device is receiving signals from (e.g., a margin of error of 2 miles with two GPS satellite, a margin of error of 1000 feet with two GPS satellites, a margin of error of 200 feet for four GPS satellites, etc.). In some embodiments, a minimum number of satellites are required to be able to determine the location's position to any level of certainty (e.g., three satellites, four satellites).

In some embodiments, the same margin of error can exist in other methods of determining location accuracy. For example, if the device is in communication with three cellular towers, the device (and optionally the cellular network) is able to triangulate the device's position to a certain degree of accuracy, whereas if the device is in communication with only one cellular tower, the margin of error for the device's location is larger.

In some embodiments, the accuracy of the determined location depends on the characteristics of the geographic location, e.g., if there are interferences such as tall buildings, if the location is a wide-open field, or if satellite signal strength is weak in the location. Other environment factors can have an impact on the margin of error (e.g., altitude, ambient temperature, humidity, and/or other electromagnetic signals can affect the signal characteristics of GPS satellites, cellular signals, and/or WiFi network signals, etc.). Thus, in some embodiments, environmental factors can affect whether a signal from a cellular, WiFi, or GPS satellite is useable to determine location. In some embodiments, a signal may be useable but location determinations using degraded signals have less accuracy.

In some embodiments, the type of location indicator displayed in user interface 600 depends on the current zoom level of the map and the accuracy of the determined location. In some embodiments, a map application has several zoom levels, each respective zoom level has a respective threshold accuracy level and showing a portion of the map corresponding to the zoom level. In some embodiments, if the accuracy of the determined location of the device is above the respective threshold accuracy level for the current zoom level, then the location indicator is displayed as a point, e.g., a pin point, indicator that indicates a single position on the map where the device is determined to be located. In some implementations, this location can be described with a single location, e.g., latitude and longitude, coordinate. In some embodiments, if the accuracy of the determined location is below the respective threshold accuracy level for the current zoom level, then the location indicator is displayed as an area indicator that indicates an area on the map within which the device is determined to be located, without displaying a point indicator corresponding to a precise determined location of the electronic device. In some embodiments, the area indicator indicates a coarse location and can be represented as a circle (e.g., location indicator 602) whose radius represents the accuracy and/or margin of error of the location determination (e.g., the radius of location indicator 602 is equal to the margin of error of the location determination).

In FIG. 6A, accuracy 606 of the determined location of the device is below threshold level 608 associated with the current zoom level. In some embodiments, because the accuracy 606 of the determined location of the device is below threshold level 608, user interface 600 includes an area indicator. Thus, in FIG. 6A, user interface 600 includes location indicator 602. In some embodiments, location indicator 602 is an area indicator and indicates a geographic area in which the device is located (e.g., based on the accuracy of the determined location of the device). In FIG. 6A, location indicator 602 is a circle that encompasses a geographic area corresponding to the geographic area in which the device is determined to be located. For example, if the location of device 500 is determined with an accuracy of 500 feet (e.g., the margin of error of the location determination is 500 feet), then the radius of location indicator 602 corresponds to 500 feet (e.g., device 500 may be located anywhere on the map inside of location indicator 602), but if the location of device 500 is determined an accuracy of 50 feet (e.g., the margin of error of the location determination is 50 feet), then the radius of location indicator 602 corresponds to 50 feet (e.g., the radius of location indicator 602 has a size that represents 50 feet based on the current scale of the map). In some embodiments, other shapes for location indicator 602 are possible (e.g., square, rectangle, polygon, etc.).

In some embodiments, as shown in FIG. 6A, location indicator 602 is overlaid on the objects in user interface 600 and is partially transparent, thus allowing at least a partial view of objects in the map at the location of location indicator 602. As will be described in more detail below, the transparency of location indicator 602 optionally depends on the size of the location indicator and/or accuracy 608 of the determined location of the device relative to threshold level 608. In some embodiments, location indicator 602 displays a pulsing animation (e.g., temporarily increases in size and/or temporarily reduces in size at a constant frequency, or an expanding circle within location indicator 602 similar to radar) thus indicating that the device's location is continuously being determined (optionally the device's location is periodically determined). In some embodiments, location indicator 602 displays an animation of the border of location indicator 602 becoming periodically becoming thicker and thinner indicating that the device's location is continuously being determined (optionally this animation is also displayed on location indicator 610, described in further detail below).

In FIG. 6A, user interface 600 includes orientation indicator 604 that indicates the orientation of the device. In some embodiments, device 500 includes one or more components to determine the orientation of the device. In some embodiments, device 500 includes a gyroscope and/or a compass and is able to determine the direction that the device is facing, e.g., the orientation of the device. In some embodiments, the orientation indicator is only displayed if orientation information is available. As shown in FIG. 6A, orientation indicator 604 is displayed as a halo along a portion of the outer boundary/perimeter of location indicator 602 (e.g., an arc of the circle). In some embodiments, the width of orientation indicator 604 (e.g., the dimension of orientation indicator 604 that is perpendicular to the center of location indicator 602) is less than the radius of location indicator 602. In some embodiments, the angular dimension of orientation indicator 604 (e.g., the length of orientation indicator 604 along the outer border of location indicator 602 relative to the total circumference of the location indicator 602) represents the accuracy of the determined orientation of the device. For example, if the device determines that the device is facing a particular direction with a 30 degree accuracy (e.g., a 30 degree margin of error), then location indicator 602 encompasses 30 degrees of the total 360 degrees of the outer border of location indicator 602, and is located on the portion of the location indicator 602 boundary that corresponds to the determined orientation of the device. Thus, the length (e.g., arc length) of orientation indicator 604 is optionally based on the radius of location indicator 602 (which is based on the accuracy of the device's location, as described above). In some embodiments, the length of orientation indicator 604 is the angle of the orientation accuracy multiplied by the radius of orientation indicator 604. Thus, the dimension of orientation indicator 604 is optionally based on the orientation accuracy (e.g., which dictates the angular dimension) and the location accuracy relative to the accuracy threshold for the current zoom level (e.g., which dictates the radius of location indicator 602). As will be described in more detail below, in some embodiments, the width of orientation indicator 604 (e.g., arc length) changes in response to a change in the zoom level and in other embodiments, the width of orientation indicator 604 does not change in response to a change in the zoom level (e.g., based on which location indicator is being displayed).

FIG. 6B illustrates an embodiment in which the accuracy 606 of the determined location of the device is above threshold 608 for the current zoom level (e.g., the same zoom as in FIG. 6A). In some embodiments, because the accuracy 606 of the determined location of the device is above threshold 608 for the current zoom level, user interface 600 includes location indicator 610 instead of location indicator 602. In some embodiments, location indicator 610 is a point indicator (e.g., a solid dot) and indicates a single geographic location (e.g., represented by a single location coordinate) at which the device is located. In some embodiments, location indicator 610 is displayed as point indicator because the geographic area within which the device is determined to encompass a small enough area of the map at the current zoom level (e.g., the current scale of the map) that displaying an area indicator provides the user with minimal information (e.g., because an area indicator would otherwise appear almost as a single location). In some embodiments, location indicator 602 displays an outward pulsing animation (e.g., temporarily increases in size and/or temporarily reduces in size at a constant frequency, or an expanding circle that expands outwardly from location indicator 610 similar to radar) thus indicating that the device's location is continuously being determined (optionally the device's location is periodically determined).

In FIG. 6B, user interface 600 includes orientation indicator 605 that indicates the orientation of the device. Similar to orientation indicator 604, orientation 605 has a respective angular dimension that represents the accuracy of the determined orientation of the device. In some embodiments, as shown in FIG. 6B, orientation indicator 605 extends outward from location indicator 610 in a cone shape. In some embodiments, the width of orientation indicator 605 (e.g., the dimension of orientation indicator 604 that is perpendicular to the center of location indicator 602) is more than the radius of location indicator 610. In some embodiments, orientation indicator 605 does not change in width based on the current zoom level of the map, optionally because location indicator 610 does not change in size based on the current zoom level of the map.

For example, in FIG. 6C, a user input corresponding to an outward pinch gesture of contact 603-1 and contact 603-2 is received. In some embodiments, the outward pinch gesture is a request to zoom the map inwards (e.g., to expand the size of the objects in the map). In some embodiments, other gestures or inputs correspond to a request to zoom the map inwards. In FIG. 6C, in response to the request to zoom the map in, the map zooms in and an accuracy threshold level, accuracy threshold level 608, increases (e.g., as compared to FIG. 6B). In some embodiments, because the scale of the map has changed, threshold level 608 in which the location indicator is displayed as a point indicator increases. Thus, a higher accuracy level is required for the location indicator to be displayed as a point indicator. In FIG. 6C, despite threshold level 608 increasing, accuracy 606 remains above threshold level 608. Thus, the accuracy of the location of the device is sufficiently high to maintain the location indicator as a point indicator. Thus, in FIG. 6C, location indicator 610 is shown. In some embodiments, even though the map has been zoomed in, location indicator 610 and orientation indicator 605 do not change in size (e.g., location indicator 610 maintains the same size so long as accuracy 606 remains above threshold level 608, as opposed to location indicator 602 which changes size in response to a user zooming in or out). In some embodiments, maintaining the size of location indicator 610 maintains the user's confidence in the determined location of the device (e.g., by maintaining location indicator 610 as a point indicator), which minimizes the time required for the user to see the device's location and reduces the number of inputs required for the user to verify the device's location.

In some embodiments, the threshold level 608 does not change in response to a change in the zoom level. For example, not all zoom levels have a corresponding unique threshold level. In some embodiments, some or all zoom levels have the same threshold level. Thus, in some embodiments, zooming in or zooming out does not cause the threshold level to change (e.g., increase or decrease). Thus, in some embodiments, the location indicator does not change from the point indicator (e.g., location indicator 610) to the area indicator (e.g., location indicator 602) in response to zooming in or zooming out, but rather based on the accuracy of the determined location increasing or decreasing (e.g., due to changing environmental factors that affect the accuracy and/or due to receiving signals from more or fewer GPS satellites, etc.).

In FIG. 6D, a user input corresponding to an outward pinch gesture of contact 603-1 and contact 603-2 is received (e.g., a request to zoom in) while accuracy 606 remains constant. In some embodiments, in response to the request to zoom the map in, threshold level 608 further increases (e.g., as compared to FIG. 6C), as shown in FIG. 6D. In FIG. 6D, threshold level 608 has increased beyond accuracy 606. As a result of accuracy 606 now being below threshold 608, the location indicator is displayed as an area indicator. Thus, in FIG. 6D, user interface 600 switches from including location indicator 610 (e.g., a point indicator) to including location indicator 602 (e.g., an area indicator). As shown in FIG. 6D, because accuracy 606 is only slightly less than threshold 608, the size of location indicator 602 is small (e.g., reflecting the geographic area within which the device is determined to be located, as described above with respect to FIG. 6A). As shown in FIG. 6D, location indicator 602 has a first transparency level. In some embodiments, the transparency of location indicator 602 is based on the size of location indicator 602. Thus, in FIG. 6D, because location indicator 602 is relatively small, location indicator 602 is relatively opaque (e.g., a low transparency level).

In FIG. 6E, a further user input corresponding to an outward pinch gesture of contact 603-1 and contact 603-2 is received (e.g., a request to zoom in) while accuracy 606 remains constant. In some embodiments, in response to the request to zoom the map in, threshold level 608 further increases (e.g., as compared to FIG. 6D), as shown in FIG. 6E. In FIG. 6E, accuracy 606 remains the same but threshold level 608 is now farther away from accuracy 606. In some embodiments, as a result of the accuracy 606 being farther away from threshold accuracy 606, location indicator 602 increases in size. In some embodiments, the increase in size of location indicator 602 reflects the change in the scale of the map with respect to the area within which the device is determined to be located (e.g., location indicator 602 in FIG. 6E represents the same geographic area as location indicator 602 in FIG. 6D). As shown in FIG. 6E, because location indicator 602 has increased in size, location indicator 602 is now more transparent than compared to FIG. 6D. In some embodiments, because location indicator 602 has increased in size, the width (e.g., arc length) of orientation indicator 604 has also increased (e.g., as compared to FIG. 6D, assuming the accuracy of the orientation has not changed), while the angular dimension of orientation indicator 604 has remained the same.

In FIG. 6F, a further user input corresponding to an outward pinch gesture of contact 603-1 and contact 603-2 is received (e.g., a request to zoom in) while accuracy 606 remains constant. In some embodiments, in response to the request to zoom the map in, threshold level 608 further increases (e.g., as compared to FIG. 6E), as shown in FIG. 6F. In FIG. 6F, accuracy 606 remains the same but threshold level 608 is now farther away from accuracy 606. In some embodiments, as a result of the accuracy 606 being farther away from threshold accuracy 606, location indicator 602 further increases in size. In some embodiments, the increase in size of location indicator 602 reflects the change in the scale of the map with respect to the area within which the device is determined to be located (e.g., location indicator 602 in FIG. 6F represents the same geographic area as location indicator 602 in FIG. 6E). As shown in FIG. 6F, because location indicator 602 has increased in size, location indicator 602 is now more transparent than compared to FIG. 6E. In some embodiments, because location indicator 602 has increased in size, the width (e.g., arc length) of orientation indicator 604 has also increased (e.g., as compared to FIG. 6E, assuming the accuracy of the orientation has not changed), while the angular dimension of orientation indicator 604 has remained the same.

In FIG. 6G, a further user input corresponding to an outward pinch gesture of contact 603-1 and contact 603-2 is received (e.g., a request to zoom in) while accuracy 606 remains constant. In some embodiments, in response to the request to zoom the map in, threshold level 608 further increases (e.g., as compared to FIG. 6F), as shown in FIG. 6G. In FIG. 6G, in response to threshold level 608 increasing, the size of location indicator 602 has increased beyond a threshold size such that the transparency level of location indicator 602 is now 100%. Thus, location indicator 602 is fully transparent and is no longer displayed in user interface 600 (optionally, in some embodiments, the border of location indicator 602 does not change transparency and continues to be displayed even if location indicator 602 is fully transparent). In some embodiments, the threshold size at which location indicator 602 becomes fully transparent (e.g., ceases to be displayed) is when location indicator 602 would otherwise encompass the entire display area of touch screen 504. In some embodiments, if location indicator 602 encompasses the entire display area of touch screen 504, then displaying location indicator 602 provides minimal value (e.g., because the entire display area would have the same tint, which is also achieved if location indicator 602 were not displayed at all). In some embodiments, the threshold size is 50% of the display area, 66% of the display area, 75% of the display area, 90% of the display area, 95% of the display area, etc. In some embodiments, the threshold size at which location indicator 602 becomes fully transparent (optionally except for the border) is when location indicator 602 reaches the size (e.g., the size becomes equal to or greater than) of the smaller dimension of the representation of the map (e.g., the width of the representation of the map or the height of the representation of the map, whichever is smaller). In some embodiments, the threshold size at which location indicator 602 becomes fully transparent (optionally except for the border) is when location indicator 602 reaches the size (e.g., the size becomes equal to or greater than) of the larger dimension of the representation of the map (e.g., the width of the representation of the map or the height of the representation of the map, whichever is larger).

In FIG. 6H, a user input corresponding to an inward pinch gesture of contact 603-1 and contact 603-2 is received (e.g., a request to zoom out) while accuracy 606 remains constant. In some embodiments, in response to the request to zoom the map out, threshold level 608 decreases (e.g., as compared to FIG. 6F). In some embodiments, in response to threshold level 608 decreasing while accuracy 606 remains the same, the size of location indicator 602 decreases and the transparency level decreases. In some embodiments, orientation indicator 604 decreases in width/arc length (e.g., as compared to FIG. 6F).

In FIG. 6I, device 500 detects that the orientation of device 500 has changed. For example, in FIG. 6I, device 500 changes from facing north-west to facing north-east. In some embodiments, in response to detecting the change in orientation, orientation indicator 604 moves along the outer boundary of location indicator 602 to face the respective orientation (e.g., facing north-east), for example while the accuracy of the determined orientation remains the same.

In FIG. 6J, a user input corresponding to an inward pinch gesture of contact 603-1 and contact 603-2 is received (e.g., a request to zoom out) while accuracy 606 remains constant. In some embodiments, in response to the request to zoom the map out, threshold level 608 decreases (e.g., as compared to FIG. 6I) to below accuracy 606. In some embodiments, other gestures or inputs correspond to a request to zoom the map outwards. In some embodiments, in response to accuracy 606 now being higher than threshold 608, device 600 switches from displaying location indicator 602 to displaying location indicator 610, as shown in FIG. 6J. In some embodiments, due to displaying location indicator 610, device 500 switches from displaying orientation indicator 604 to displaying orientation indicator 605. In some embodiments orientation indicator 605 is facing the same direction as orientation indicator 604 from FIG. 6I (e.g., assuming device 500 has not determined that the orientation has changed).

In FIG. 6J, device 500 detects that the orientation of device 500 has changed. For example, in FIG. 6K, device 500 changes from facing north-east to facing north-west. In some embodiments, in response to detecting the change in orientation, orientation indicator 605 rotates from facing north-east to face north-west.

In FIG. 6L, a user input corresponding to an outward pinch gesture of contact 603-1 and contact 603-2 is received (e.g., a request to zoom in) while the device's determined orientation remains constant. In some embodiments, in response to the request to zoom the map in, threshold level 608 increases to above accuracy 606. In some embodiments, in response to accuracy 606 now being lower than threshold 608, device 600 switches from displaying location indicator 610 to displaying location indicator 602, as shown in FIG. 6L. In some embodiments, due to displaying location indicator 602, device 500 switches from displaying orientation indicator 605 to displaying orientation indicator 604. In some embodiments orientation indicator 604 is facing the same direction as orientation indicator 605 from FIG. 6K (e.g., assuming device 500 has not determined that the orientation has changed).

FIG. 6M illustrates an embodiment in which location indicator 610 and orientation indicator 605 are displayed while user interface 600 is displaying directions from one location to another. In FIG. 6M, accuracy 606 is above threshold level 608 and thus user interface 600 includes the point indicator (e.g., location indicator 610). FIG. 6N illustrates an embodiment in which location indicator 602 and orientation indicator 604 are displayed while user interface 600 is displaying directions from one location to another. In FIG. 6N, accuracy 606 is below threshold level 608 and thus user interface 600 includes the area indicator (e.g., location indicator 602). Thus, as described above, device 500 is able to display location indicator 602 or location indicator 610 (as the case may be, as described above with respect to FIGS. 6A-6L) and/or orientation indicator 604 or orientation indicator 605 regardless of whether user interface 600 is displaying directions or not displaying directions.

In FIG. 6O, while displaying location indicator 610 (e.g., a point location indicator, because the location accuracy is greater than threshold 608) and orientation indicator 604 on location indicator 610, a user input 603o is received selecting location indicator 610. In some embodiments, selection of location indicator 610 corresponds to a request to view information about the current location of device 500. In some embodiments, in response to user input 603o, device 500 displays user interface 616, as shown in FIG. 6P. In some embodiments, user interface 616 is a user interface that includes information and/or options associated with the determined location of device 500. In FIG. 6P, user interface 616 includes option 618, option 620, and option 622 (optionally on the same row). In some embodiments, option 618 is selectable to mark the current location of device 500 (e.g., save the location for future access). In some embodiments, option 620 is selectable to initiate a process to improve the determined location of the device, as described below with respect to method 900. In some embodiments, option 622 is selectable to share the current location of device 500 with another use (e.g., transmit information about the current location of device 500 to another device).

In some embodiments, in response to user input 603o, device 500 displays user icon 614. In some embodiments, user icon 614 is a representation of the user and can include text, an image, a graphic, or any other suitable representation of the user. In some embodiments, the visual characteristic of user icon 614 (e.g., the image, the graphic, the text, etc.) is set by the user. In some embodiments, user icon 614 is similar to or the same as representations of the user displayed in other applications (e.g., applications other than the map application). For example, user icon 614 is optionally associated with an account of the user (e.g., a user profile) and the account can be used for a plurality of other applications (e.g., logged into). In some embodiments, user icon 614 includes an element that points towards location indicator 610 (e.g., an arrow, a triangle shape, an element that juts out from user icon 614, or any other suitable visual element that associates user icon 614 with location indicator 610), indicating that the user is determined to be at the location of location indicator 610. In some embodiments, orientation indicator 604 is ceased to be displayed on location indicator 610 when user icon 614 and/or user interface 616 is displayed, as shown in FIG. 6P. In some embodiments, display of orientation indicator 604 is maintained on location indicator 610.

In FIG. 6Q, a user input corresponding to an outward pinch gesture of contact 603q-1 and contact 603q-2 is received (e.g., a request to zoom in). In some embodiments, in response to the request to zoom the map in, the representation of the map zooms in and threshold level 608 increases to above the level of accuracy 606, as shown in FIG. 6Q. As described above, in response to zooming into the representation of the map (e.g., in accordance with a determination that accuracy 606 is below threshold level 608), device 500 switches from displaying location indicator 610 (e.g., the point indicator) to displaying location indicator 602 (e.g., an area indicator). As described above, the accuracy of the determined location of device 500 as compared to the threshold level optionally dictates the size of location indicator 602. Thus, in FIG. 6Q, location indicator 602 has a radius that is smaller than the size of user icon 614. In such embodiments, user icon 614 optionally overlays (e.g., overlaps) at least a portion of location indicator 602. For example, if the size of location indicator 602 is the same or smaller than the size of user icon 614, at least a portion of user icon 614 is displayed over at least a portion of location indicator 602 and at least a portion of user icon 614 is not displayed over location indicator 602. In some embodiments, user icon 614 continues to include the element that points towards the location indicator 602, but user icon 614 is optionally positioned such that the element points towards the center of location indicator 602 (or another predefined location within or on location indicator 602), as shown in FIG. 6Q.

In FIG. 6Q, in response to the request to zoom the map in, device 500 displays orientation indicator 604 on location indicator 604 (e.g., causes display of orientation indicator 604 or maintains display of orientation indicator 604 as the case may be) and changes the visual appearance of orientation indicator 604 based on being displayed on location indicator 604. In some embodiments, based on the relative size of orientation indicator 604 and user icon 614, orientation indicator 604 is at least partially obscured by user icon 614 (e.g., in FIG. 6Q, orientation indicator 604 is fully obscured by user icon 614). Further details of how the visual appearance of orientation indicator 604 is different when displayed on location indicator 602 as compared to when orientation indicator 604 displayed on location indicator 610 is discussed below with respect to FIG. 6R.

In FIG. 6R, a further user input corresponding to an outward pinch gesture of contact 603r-1 and contact 603r-2 is received (e.g., a request to zoom in). In some embodiments, in response to the request to zoom the map in, the representation of the map zooms in and threshold level 608 further increases, as shown in FIG. 6R. In some embodiments, in response to threshold level 608 becoming farther above accuracy 606, location indicator 602 increases in size accordingly (e.g., as discussed above with respect to FIGS. 6D-6G). In some embodiments, because location indicator 602 is larger than the size of user icon 614 (e.g., the radius of location indicator 602 is bigger than the radius of user icon 614, optionally by more a threshold amount, such as 0.5 mm, 1 mm, 3 mm, 5 mm, 1 cm, etc.), user icon 614 is updated to be located at the center of location indicator 602 and to no longer include the element that points towards the location indicator, as shown in FIG. 6R. Thus, in some embodiments, user icon 614 is circular and no longer includes any elements that jut out from the border of user icon 614. In some embodiments, the size of user icon 614 remains fixed and does not change in response to the representation of the map zooming in or out.

FIG. 6R further illustrates an embodiment of orientation indicator 604 that includes a portion outside of location indicator 602 and a portion inside location indicator 602. As discussed above, when orientation indicator 604 is displayed on location indicator 610 (e.g., a point indicator), orientation indicator 604 is optionally displayed with a cone shape extending outwards from the border of location indicator 610. Thus, orientation indicator 604 optionally does not include a portion that is displayed on the inside of location indicator 610. However, when device 500 is displaying location indicator 602 (e.g., the area indicator), orientation indicator 604 optionally includes an outer portion and an inner portion, as shown in FIG. 6R. In some embodiments, the outer portion of orientation indicator 604 has a shape similar to a halo along the border of location indicator 602, similar to the embodiments described above with respect to FIG. 6A. In some embodiments, the inner portion of orientation indicator 604 is displayed having a cone shape extending outwards from the center of location indicator 602 to the border of location indicator 602, as shown in FIG. 6R.

Thus, in some embodiments, orientation indicator 604 has the same shape or a similar shape when displayed on location indicator 602 as when orientation indicator 604 is displayed on location indicator 610, but is displayed at different places with respect to the location indicator and includes different portions of the shape. For example, orientation indicator 604 displays different portions of an orientation indicator object based on whether orientation indicator 604 is displayed on location indicator 602 or location indicator 610. For example, while displayed on location indicator 610, orientation indicator 604 reveals an inner portion of the orientation indicator object (e.g., the inner 1 mm length, 2 mm, 3 mm, 5 mm, 1 cm, etc.), albeit on the outside of location indicator 610. While displayed on locator indicator 602, orientation indicator 604 reveals the outer portion of the orientation indicator object (e.g., from the 1 mm, 2 mm, 3 mm, 5 mm, 1 cm position outwards to the 3 mm, 5 mm, 1 cm, 2 cm position, etc.). In some embodiments, as shown above, orientation indicator 604 straddles the border of location indicator 602 when displayed on location indicator 602 but is only displayed on the outside of location indicator 610 when displayed on location indicator 610. Thus, in some embodiments, the size and shape of orientation indicator 610 is determined by revealing and masking different portions of an orientation indicator object (e.g., the orientation indicator object having a cone shape extending outwards from the center of the respective location indicator) based on whether location indicator 602 is displayed or location indicator 610 is displayed. In some embodiments, the portion of the orientation indicator object that is displayed when the orientation indicator is displayed on location indicator 610 at least partially overlaps with the portion of the orientation indicator object that is displayed when the orientation indicator is displayed on location indicator 602 (optionally the portions do not overlap).

In some embodiments, certain portions of orientation indicator 604 can have different levels of transparency. For example, in FIG. 6R, the transparency of the inner portion of orientation indicator 604 increases the closer it is to the center of location indicator 602. In some embodiments, the transparency reaches 100% at or before the center of location indicator 602 (e.g., such that orientation indicator 604 does not appear to reach or make contact with the center of location indicator 602).

Figure 6S:
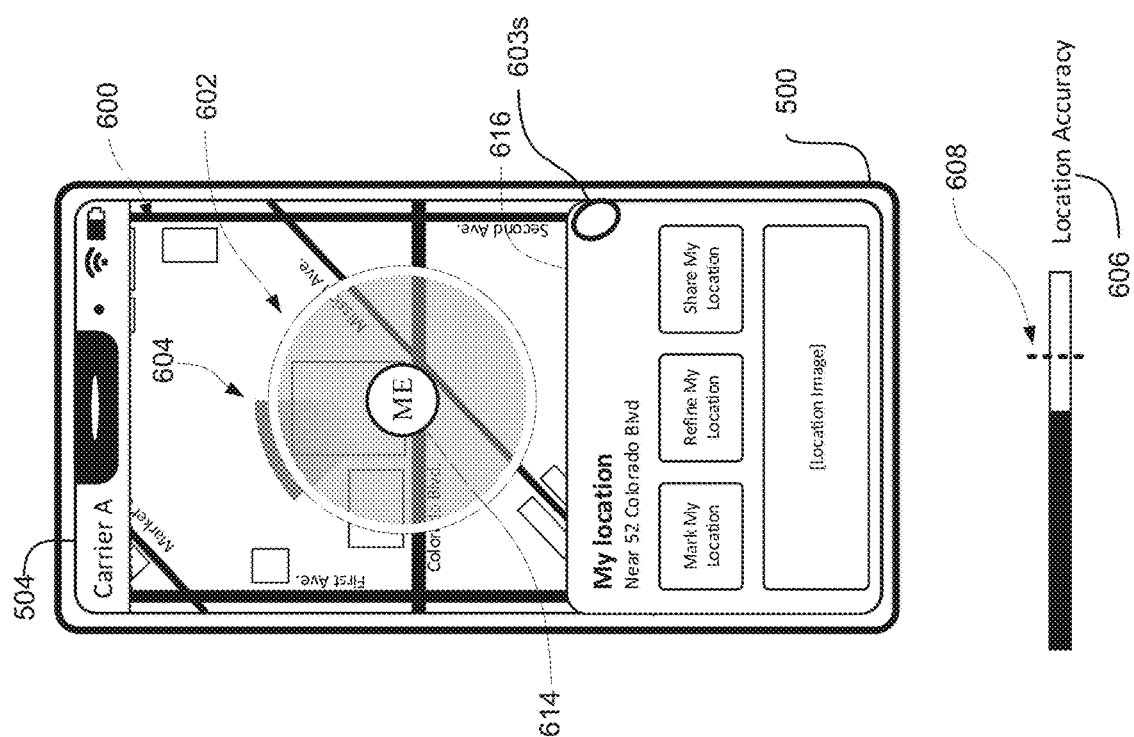

In FIG. 6S, a user input 603s is received corresponding to a request to dismiss user interface 616 (e.g., selection of a "close" or "x" affordance). In some embodiments, in response to user input 603s, device 500 ceases display of user interface 616, as shown in FIG. 6T. In some embodiments, in response to user interface 616 no longer being displayed, device 500 ceases display of user icon 614. Thus, in some embodiments, user icon 614 is displayed (e.g., only displayed) when user interface 616 is displayed (and optionally not displayed when user interface 616 is not displayed).

In some embodiments, receiving a user input selecting location indicator 602 does not cause display of user icon 614 and/or user interface 616 (e.g., only selection of location indicator 610 causes display of user icon 614 and/or user interface 616). In some embodiments, receiving a user input selecting location indicator 602 also causes display of user icon 614 and/or user interface 616. In some embodiments, user icon 614 and/or user interface 616 is displayed in response to selecting location indicator 602 if (e.g., only if) the size of location indicator 602 is below a threshold size (e.g., 25% of the display area, 50% of the display area, 60% of the display area, 90% of the display area). As described above, because location indicator 602 can have an increasing transparency as location indicator 602 becomes larger, if the transparency of location indicator 602 is above a threshold amount (e.g., 30% transparency, 50% transparency, 75% transparency, 90% transparency, 100% transparency, etc.), then selection of location indicator 602 does not cause display of user icon 614 and/or user interface 616.

In some embodiments, if user icon 614 and/or user interface 616 is currently displayed when location indicator 602 increases in size to above the threshold size (e.g., the threshold size above which selection of location indicator 602 does not cause display of user icon 614 and/or user interface 616), then device 500 optionally maintains display of user icon 614 and/or user interface 616. For example, if location indicator 602 is displayed with a size below the threshold size, then in response to a user input, user icon 614 and user interface 616 is displayed. Then, while displaying user icon 614 and user interface 616, if a user zooms the map in such that the size of location indicator 602 becomes larger than the threshold size, user icon 614 and user interface 616 optionally continues to be displayed in the user interface. However, at that point, if the user were to dismiss display of user icon 614 and/or user interface 616 (e.g., by selecting a "close" or "x" affordance, such as in FIG. 6S), then the user will optionally be unable to cause display of user icon 614 and/or user interface 616 via selection of location indicator 602 (e.g., without otherwise changing the size of location indicator 602 to less than the threshold size, such as by zooming the map out).

Figure 7:
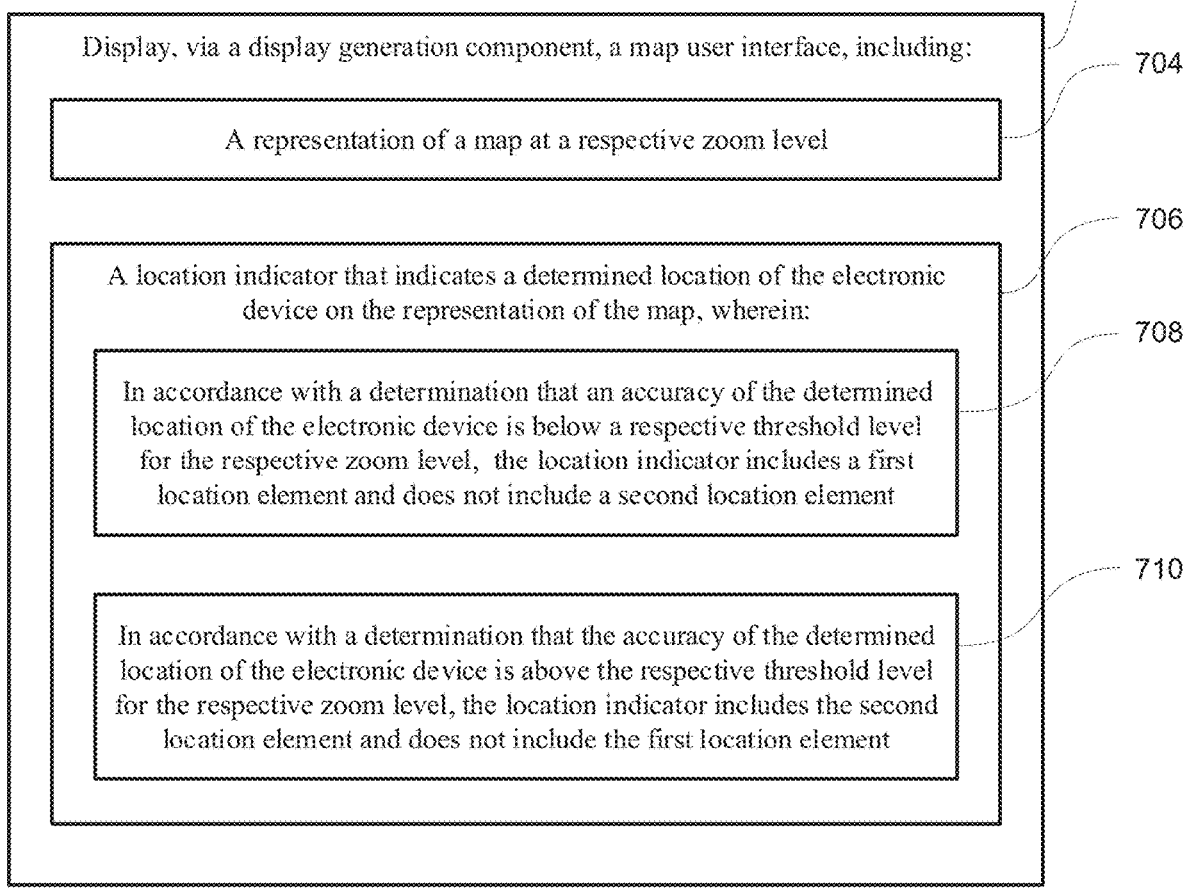
FIG. 7 is a flow diagram illustrating a method of indicating the current location of the electronic device in accordance with some embodiments of the disclosure.

FIG. 7 is a flow diagram illustrating a method 700 of indicating the current location of the electronic device in accordance with some embodiments of the disclosure. The method 700 is optionally performed at an electronic device such as device 100, device 300, device 500, and device 511 as described above with reference to FIGS. 1A-1B, 2-3, 4A-4B and 5A-5B. Some operations in method 700 are, optionally combined and/or the order of some operations is, optionally, changed.

As described below, the method 700 indicates the current location of the electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device 500 in communication with a display generation component (e.g., a mobile device (e.g., a tablet, a smartphone, a media player, or a wearable device), or a computer, optionally in communication with one or more input devices) displays (702), via the display generation component, a map user interface, such as user interface 600 in FIG. 6A (e.g., the map user interface is displayed in response to receiving a user input corresponding to a request to display a map user interface). For example, a user input selecting a map application from a home screen user interface or an application launching user interface.

In some embodiments, the one or more input devices includes one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the map user interface includes a representation of a map at a respective zoom level (704), such as in FIG. 6A (e.g., a map of a respective geographic location. In some embodiments, the map is displaying the geographic location of the user) and a location indicator that indicates a determined location of the electronic device on the representation of the map (706), such as location indicator 602 in FIG. 6A and location indicator 610 in FIG. 6B (e.g., the representation of the map includes an indicator that indicates the location of the electronic device in the map).

In some embodiments, the representation of the map is interactable by the user to view different geographic locations. In some embodiments, the representation of the map is interactable by the user to change a zoom level. In some embodiments, the representation of the map displays different levels of detail based on the zoom level. For example, at a first zoom level, the representation of the map includes representations of roads and highways, and at a second zoom level, closer than the first zoom level (e.g., zoomed in further than the first zoom level), the representation of the map includes representations of buildings, businesses, and/or landmarks. In some embodiments, the indicator is displayed only if location determination is enabled (e.g., GPS tracking is enabled). In some embodiments, the indicator indicates the estimated location of the electronic device based on the accuracy or the confidence level of the location of the electronic device. In some embodiments, the electronic device includes a GPS component that is able to determine the location of the electronic device. In some embodiments, based on the number of satellites that the GPS component is able to lock onto, the device is able to determine the location of the electronic device to a particular accuracy level (e.g., more satellites results in a higher accuracy level and fewer satellites results in a lower accuracy level). In some embodiments, the electronic device is in communication with a cellular provider and is able to determine, using data from the cellular provider, the location of the electronic device (e.g., based on the cell tower(s) with which the electronic device is in communication). In some embodiments, the electronic device is able to determine its location based on other mechanisms.

In some embodiments, in accordance with a determination that an accuracy of the determined location of the electronic device is below a respective threshold level for the respective zoom level (e.g., based on one or more location determination mechanisms, the accuracy of the electronic device's determined location is less than a threshold amount (e.g., the device's determined location is within a 5 foot radius, 10 foot radius, 30 foot radius, 50 foot radius, 100 foot radius, a quarter mile radius, a half mile radius, a one mile radius, or unable to determine any location, etc.)), the location indicator includes a first location element (e.g., a circular indicator of a first size at a respective location on the representation of the map) and does not include a second location element (708), such as location indicator 602 but not location indicator 610 in FIG. 6A (e.g., an indicator on the representation of the map that indicates a single location—as opposed to an area—of the electronic device within the map).

In some embodiments, the electronic device is not able to determine a precise location. In some embodiments, if the accuracy is below a threshold, the electronic device determines, instead, that the electronic device is likely located within a certain area. In some embodiments, the threshold for the accuracy of the determined location is based on the zoom level of the representation of the map. For example, if the map is zoomed in to a first level, then a first level of accuracy is required for the determined location to meet the threshold, whereas if the map is zoomed out to a second level, then a lower level of accuracy (e.g. lower than the first level) is required for the determined location to meet the threshold (e.g., the threshold for the second zoom level is lower than the threshold for the first zoom level).

In some embodiments, the circular indicator indicates the area within which the electronic device has determined is the likely location of the device. In some embodiments, the size of the circular indicator indicates the accuracy of the determination. For example, if the accuracy is low, then the indicator is a large size (e.g., encompassing a larger area) and if the accuracy is medium, then the indicator is medium sized (e.g., encompassing a smaller area).

In some embodiments, in accordance with a determination that the accuracy of the determined location of the electronic device is above the respective threshold level for the respective zoom level (e.g., the accuracy of the electronic device's determined location is greater than the threshold amount for the displayed zoom level), the location indicator includes the second location element and does not include the first location element (710), such as location indicator 610 but not location indicator 602 in FIG. 6B (e.g., a dot that indicates a single location on the map at which the electronic device is determined to be located).

In some embodiments, the determined location(s) of the electronic device is at a particular location on the map. In some embodiments, the electronic device is not able to determine a precise location, but because the map is zoomed out, the area within which the device is determined to likely be located is small due to the zoom level of the map. In such embodiments, the accuracy of the determined location is above the threshold level for the current zoom level.

In some embodiments, if the accuracy is above the threshold, the representation of the map does not include the circular indicator that indicates an area on the map. In some embodiments, only one of the first location element and the second location element is ever displayed at any one time (optionally no elements are displayed if location tracking is disabled or if the representation of the map does not include the determined location of the device). In some embodiments, as described above, whether the map user interface includes the first and second location element depends at least on the accuracy of the determination of the device's location and the zoom level of the representation of the map (e.g., the current view of the map). For example, if the accuracy is such that the device is able to determine that the device's location is somewhere within a city block, then if the map is zoomed in such that a large portion of the user interface is displaying the city block (e.g., the city block is greater than 20%, 30%, 50%, 60%, 75%, 90%, etc. of the size of the representation of the map) then the accuracy is below the threshold required for that zoom level and the first location element is displayed as a circular indicator encompassing the city block, thus indicating that the device is somewhere within the city block. In another example, if the device determines that the device's location is somewhere within a city block, but the map is zoomed out such that the user interface is displaying the entire county and the respective city block is only a small portion of the representation of the map (e.g., encompassing an area of less than 0.25 mm^2, 0.5 mm^2, 1 mm^2, 2 mm^2, or less than 1%, 3%, 5%, 10%, 15% of the size of the representation of the map), then the accuracy is above the threshold required for that zoom level and the first location element is not displayed and instead, the second location element is displayed, thus indicating that the device is at the location of the city block. Thus, in some embodiments, the first location element is an area indicator and the second location element is a point indicator and whether the user interface includes the first location element or the second location element is based on whether the determined potential location of the device should be represented by an area or a position based on the zoom level of the map.

The above-described manner of displaying an indication of the device's determined location (e.g., by displaying either an area indicator or a point indicator depending on the accuracy of the determined location and the zoom level of the map) quickly and efficiently provides the user with information about the device's determined location, which simplifies the interaction between the user and the electronic device and enhances the operability of the electronic device and makes the user-device interface more efficient (e.g., without displaying the point indicator when the area indicator is more appropriate and vice versa, thereby reducing potential confusion over the accuracy of the determined location), which additionally reduces power usage and improves battery life of the electronic device by enabling the user to use the electronic device more quickly and efficiency while reducing errors in the usage of the device.

In some embodiments, while displaying the first location element, in accordance with a determination that the first location element occupies a first display area (e.g., occupies a first display area of the display generation component, occupies a first display area of the total display area generated by the display generation component, etc.), the first location element has a first opacity value, such as in FIG. 6A (e.g., the opacity of the first location element is based on the size of the first location element).

In some embodiments, the size of the first location element is based on the accuracy of the determined location relative to the predetermined threshold for the current zoom level. For example, at a particular zoom level (e.g., at a constant threshold), if the accuracy decreases, then the size of the first location element increases. If the accuracy increases, then the size of the first location element decreases. Similarly, if the user changes the zoom level of the map, then at a constant accuracy level, if the predetermined threshold increases (e.g., as the user zooms in), then the size of the first location element increase, but if the predetermined threshold decreases (e.g., as the user zooms out), then the size of the first location element decreases. In some embodiments, the size of the first location element is the absolute size of the first location element. In some embodiments, the size of the first location element is the display area of the first location element relative to the total display area of the representation of the map (optionally based on the scale of the representation of the map or relative to the representation of other objects in the representation of the map).

In some embodiments, in accordance with a determination that the first location element occupies a second display area (e.g., occupies a second display area of the display generation component, occupies a second display area of the total display area generated by the display generation component, etc.) having a size different than the first display area, the first location element has a second opacity value, different from the first opacity value, such as in FIG. 6D and FIG. 6F (e.g., as the first location element decreases in size, the opacity increases (the element becomes less transparent)).

In some embodiments, as the first location element increases in size, the opacity decreases (the element becomes more transparent). For example, as the first location element occupies more of the display area, the first location element becomes more transparent to increase the visibility of elements of the map user interface that are overlaid by the first location element.

The above-described manner of varying the opacity of the location indicator (e.g., by decreasing the opacity of the location indicator as it increases in size and vice versa) quickly and efficiently provides the user with information about the device's determined location without obstructing view of objects on the map, which simplifies the interaction between the user and the electronic device and enhances the operability of the electronic device and makes the user-device interface more efficient (e.g., without requiring the user to disable display of the location indicator to prevent the location indicator from obscuring portions of the map), which additionally reduces power usage and improves battery life of the electronic device by enabling the user to use the electronic device more quickly and efficiently while reducing errors in the usage of the device.

In some embodiments, in accordance with a determination that the first location element would occupy a display area that is larger than a predetermined size (e.g., as the user zooms in or as the location accuracy decreases, if the size of the first location element increases to encompass greater than a threshold amount of the display area (e.g., 80% of the total display area, 85%, 90%, 95%, 99%, 100%, etc.)), the electronic device ceases to display the first location element, such as in FIG. 6G (e.g., the opacity of the first location element is decreased to have a zero opacity value).

For example, the opacity of the first location element decreases as the display area of the first location element increases such that when the display area of the first location element reaches the predetermined size, the opacity reaches zero (e.g., becomes completely transparent). In some embodiments, having a zero opacity level means that the first location element is not visible in the user interface. In some embodiments, decreasing the opacity level to zero (optionally while maintaining display of the first location element) is implemented by ceasing display of the first location element (and optionally ceasing display of the location indicator).

The above-described manner of varying the opacity of the location indicator (e.g., by ceasing display of the location indicator altogether when the size reaches a predetermined threshold) quickly and efficiently removes display of the location indicator when the size of the location indicator would provide minimal informational value (e.g., when the location indicator encompasses the entire display area, for example), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency while reducing errors in the usage of the device.

In some embodiments, while displaying the first location element, the electronic device receives, via one or more input devices, a user input corresponding to a request to decrease a zoom level of the representation of the map to a first zoom level, such as in FIG. 6J (e.g., while displaying the first location element, receiving a user input zooming out the representation of the map to display a larger geographic area). In some embodiments, the user input is an inward pinch gesture. In some embodiments, the user input is a selection of a zoom-out affordance. In some embodiments, the user input is a double tap followed by a downward swipe gesture.

In some embodiments, in response to receiving the user input, the electronic device decreases the zoom level of the representation of the map to the first zoom level (e.g., decreasing the zoom level in accordance with the user input) and in accordance with a determination that the accuracy of the determined location of the device is above a respective threshold level for the first zoom level, the electronic device updates the location indicator to include the second location element and not include the first location element, such as in FIG. 6J (e.g., if the accuracy is now above the threshold for the new zoom level of the map, then switching from the first location element to the second location element).

In some embodiments, as the user zooms in and out, the threshold accuracy level that determines display of the first element or the second element changes (e.g., increases or decreases). For example, as the representation of the map is zoomed in, the threshold increases thus requiring a higher accuracy for the second element to be displayed rather than the first element. Similarly, as the representation of the map is zoomed out, the threshold decreases thus requiring less accuracy for the second element to be displayed rather than the first element. In some embodiments, if the user in (e.g., such as by an outward pinch gesture) and the accuracy remains below the threshold (optionally as a result of the threshold increasing as the map zooms in), then the device maintains display of the first location element and does not display the second location element.

The above-described manner of updating the location indicator (e.g., by switching from displaying the first location element to displaying the second location element if zooming out caused the accuracy of the determined location to become above the threshold) quickly and efficiently provides the user with relevant location information as the user interacts with the map (e.g., by automatically switching to the second location element if the user zooms out enough, thus minimizing the amount of the map that's obscured when an area indicator is not required), which simplifies the interaction between the user and the electronic device and enhances the operability of the electronic device and makes the user-device interface more efficient (e.g., without requiring the user to perform additional inputs to switch from displaying one type to indicator to another type of indicator and without causing confusion over the accuracy of the determined location), which additionally reduces power usage and improves battery life of the electronic device by enabling the user to use the electronic device more quickly and efficiency, while reducing errors in the usage of the device.

In some embodiments, while displaying the first location element, the electronic device receives, via one or more input devices, a user input corresponding to a request to increase a zoom level of the representation of the map to a first zoom level, such as in FIG. 6E (e.g., while displaying the first location element a user input zooming in the representation of the map to display a smaller geographic area). In some embodiments, the user input is an outward pinch gesture. In some embodiments, the user input is a selection of a zoom-in affordance. In some embodiments, the user input is a double tap followed by an upward swipe gesture.

In some embodiments, in response to receiving the user input, the electronic device increases the zoom level of the representation of the map to the first zoom level (e.g., increasing the zoom level in accordance with the user input) and in accordance with a determination that the accuracy of the determined location of the device is below a respective threshold level for the first zoom level, the electronic device updates a size of a display area of the first location element on the display generation component in accordance with the accuracy of the determined location of the device while maintaining display of the first location element, such as in FIG. 6E (e.g., if the accuracy remains below the threshold after the zoom function (for example, because the threshold increased as a result of zooming in), then maintain display of the first location element (optionally the second location element remains not displayed)).

In some embodiments, because the zoom level and respective threshold level changed while displaying the first location element, the first location element changes size according to the change in the threshold level (e.g., becomes larger in proportion with the increased scale of the map). In some embodiments, if the user zooms out (such as via an inward pinch gesture), and the accuracy becomes above the threshold (optionally as a result of the threshold decreasing as the map zooms out), then the device replaces display of the first location element with the second location element.

The above-described manner of updating the location indicator (e.g., by maintaining the display of the first location indicator but updating the size of the first location indicator if the map is zoomed in or out while the accuracy of the determined location remains below the threshold) quickly and efficiently provides the user with information about the accuracy of the determined location (e.g., by automatically scaling the size of the first location indicator based on the scale of the map, thus providing the user with consistent information of the area in which the device is located), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in the usage of the device.

In some embodiments, while displaying the second location element, the electronic device receives, via one or more input devices, a user input corresponding to a request to increase a zoom level of the representation of the map to a first zoom level, such as in FIG. 6D (e.g., while displaying the second location element, receiving a user input zooming in the representation of the map to display a smaller geographic area). In some embodiments, the user input is an outward pinch gesture. In some embodiments, the user input is a selection of a zoom-in affordance. In some embodiments, the user input is a double tap followed by an upward swipe gesture.

In some embodiments, in response to receiving the user input, the electronic device increases the zoom level of the representation of the map to the first zoom level (e.g., increasing the zoom level in accordance with the user input), and in accordance with a determination that the accuracy of the determined location of the device is below a respective threshold level for the first zoom level, the electronic device updates the location indicator to include the first location element and not include the second location element, such as in FIG. 6D (e.g., if the accuracy is now below the threshold for the new zoom level of the map, then switching from displaying the second location element to displaying the first location element).

Thus, in some embodiments, changing a zoom level of the map causes the respective threshold level to change such that the accuracy of the determined location of the device changes from being above the respective threshold level to being below the respective threshold level. In such embodiments, as a result, the location indicator switches from including the second location element (which is displayed when the accuracy is above the threshold) to including the first location element (which is displayed when the accuracy is below the threshold). In some embodiments, if the user zooms out (such as via an inward pinch gesture), and the accuracy remains above the threshold (optionally as a result of the threshold decreasing as the map zooms out), then the device maintains display of the second location element and does not display the first location element.

The above-described manner of updating the location indicator (e.g., by switching from displaying the second location element to displaying the first location element if zooming in caused the accuracy of the determined location to become below the threshold) quickly and efficiently provides the user with location information as the user interacts with the map (e.g., by automatically switching to the first location element if the user zooms in enough, thus providing the user with information about the area in which the device is located only if the map is zoomed in to a certain amount), which simplifies the interaction between the user and the electronic device and enhances the operability of the electronic device and makes the user-device interface more efficient (e.g., without requiring the user to perform additional inputs to switch from displaying one type to indicator to another type of indicator), which additionally reduces power usage and improves battery life of the electronic device by enabling the user to use the electronic device more quickly and efficiency, while reducing errors in the usage of the device.

In some embodiments, while displaying the representation of the map at the respective zoom level and the first location element, the electronic device determines that the accuracy of the determined location of the electronic device has increased above the respective threshold level for the respective zoom level, such as in FIG. 6B (e.g., without changing the zoom level of the map, the accuracy of the determined location increased above the threshold level). In some embodiments, the accuracy increased as a result of the device locking onto more GPS satellites. In some embodiments, the accuracy increased as a result of a process for improving the accuracy of the determined location as described below with respect to method 900.

In some embodiments, in response to determining that the accuracy of the determined location of the electronic device has increased above the respective threshold level for the respective zoom level, the electronic device updates the location indicator to include the second location element and not include the first location element, such as in FIG. 6B (e.g., in response to the accuracy increasing above the threshold, replacing display of first location element with display of the second location element). In some embodiments, if the second location element is displayed (e.g., the accuracy is above the threshold) and the accuracy decrease to below the threshold, then display of the second location element is replaced with display of the first location element. Thus, in some embodiments, without changing the zoom level, the device updates the location indicator based on changes in the accuracy of the determined location.

The above-described manner of updating the location indicator (e.g., by switching from displaying the first location element to displaying the second location element if the accuracy of the determined location increased to being above the threshold level) quickly and efficiently provides the user with location information as the determined location of the device is updated (e.g., by automatically switching to the second location element if the location accuracy increased), which simplifies the interaction between the user and the electronic device and enhances the operability of the electronic device and makes the user-device interface more efficient (e.g., without requiring the user to perform additional inputs to update the location indicator based on updated data), which additionally reduces power usage and improves battery life of the electronic device by enabling the user to use the electronic device more quickly and efficiency, while reducing errors in the usage of the device.

In some embodiments, in accordance with a determination that a determined orientation of the electronic device is available, the location indicator includes an orientation indicator, such as orientation indicator 604 in FIG. 6A and orientation indicator 605 in FIG. 6B (e.g., if the device has orientation information, then display the orientation of the device on the location indicator).

For example, if the device has a sensor for determining the orientation of the device, such as a compass, then display an orientation indicator. In some embodiments, the orientation indicator points in the direction that the device is facing. In some embodiments, the orientation indicator is placed on the location indicator at a location corresponding to the direction that the device is facing. For example, if the device is facing north, then the orientation indicator is placed on the north side of the location indicator. In some embodiments, the size and/or shape of the orientation indicator changes based on the accuracy of the determined orientation. For example, if the determined orientation is more accurate, then the orientation indicator is narrower (e.g., narrower width, narrower angle), and if the determined orientation is less accurate, then the orientation indicator is wider (e.g., wider width, wider angle).

The above-described manner of displaying an orientation indicator (e.g., by displaying the orientation on the location indicator if orientation information is available) quickly and efficiently provides the user with orientation information, which simplifies the interaction between the user and the electronic device and enhances the operability of the electronic device and makes the user-device interface more efficient (e.g., without requiring the user to perform additional inputs to enable display of the orientation indicator), which additionally reduces power usage and improves battery life of the electronic device by enabling the user to use the electronic device more quickly and efficiency, while reducing errors in the usage of the device.

In some embodiments, while displaying the location indicator including the orientation indicator, in accordance with a determination that the location indicator includes the first location element and not the second location element, the orientation indicator is displayed on a border of the first location element, such as orientation indicator 604 in FIG. 6A (e.g., if the location indicator includes the first location element, the orientation indicator is displayed along the border of the first location element).

In some embodiments, displaying the orientation indicator on the first location element includes displaying an element (which optionally mimics a highlighting or halo effect) along the outside circumference of the first location element (e.g., border of the first location element). In some embodiments, the shape of the orientation indicator conforms to the shape of the circumference of the first location element. In some embodiments, the angular size of the orientation indicator is based on the accuracy of the determined orientation. In some embodiments, the absolute width of the orientation indicator is based on the size (e.g., radius) of the first location indicator. For example, the angle of the orientation indicator is based on the accuracy of the determined orientation and if the accuracy of the determined orientation remains constant, then in response to the first location element changing size (e.g., in response to zoom-in or zoom-out inputs), the width of the orientation indicator increases or decreases due to remaining displayed on the border of the first location element, while maintaining a constant angle.

In some embodiments, in accordance with a determination that the location indicator includes the second location element and not the first location element, the orientation indicator is displayed on a border of the second location element, such as orientation indicator 605 in FIG. 6B (e.g., if the location indicator includes the second location element, the orientation indicator is displayed on the border of the second location element).

In some embodiments, displaying the orientation indicator on the second location element includes displaying an element extending outwards from the circumference of the second location element (e.g., extending outwards from the border of the second location element). In some embodiments, while the orientation indicator is displayed on the second location element, the orientation indicator does not change size in response to a zoom-in or zoom-out input (optionally because the second location element does not change size in response to a zoom-in or zoom-out input). In some embodiments, the orientation indicator does change in size in response to a zoom-in or zoom-out input.

The above-described manner of displaying the orientation indicator (e.g., by displaying the orientation indicator on the second location element if the second location element is displayed or on the first location element if the first location element is displayed) quickly and efficiently provides the user with orientation information independent of location accuracy, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in the usage of the device.

In some embodiments, while displaying the orientation indicator on the first location element, the orientation indicator is a first orientation indicator having a first shape, such as in FIG. 6A (e.g., the orientation indicator has a first visual characteristic). In some embodiments, the orientation indicator on the first location element is shaped as a halo along the border of the first location element. In some embodiments, the height of the orientation indicator (the size of the orientation indicator in the dimension perpendicular to the center of the first location element) is smaller than the radius of the first location element.

In some embodiments, while displaying the orientation indicator on the second location element, the orientation indicator is a second orientation indicator having a second shape, different from the first shape, such as in FIG. 6B (e.g., the orientation indicator has a second visual characteristic, different from the first visual characteristic).

In some embodiments, the orientation indicator on the second location element is shaped as a cone extending outwards from the second location element. In some embodiments, the height of the orientation indicator is greater than the radius of the second location element. In some embodiments, the shape of the first orientation indicator is different from the shape of the second orientation indicator for a given zoom level. In some embodiments, the size/display area of the first orientation indicator is different from the size/display area of the second orientation indicator for a given zoom level.

The above-described manner of displaying the orientation indicator (e.g., by displaying the orientation indicator as a first orientation indicator when on the second location element or as a second orientation indicator when on the first location element) quickly and efficiently provides the user with orientation information independent of location accuracy, which simplifies the interaction between the user and the electronic device and enhances the operability of the electronic device and makes the user-device interface more efficient (e.g., without requiring the user to perform additional inputs to switch from the first orientation indicator to the second orientation indicator when the location indicator switches from displaying one type of location indicator to another), which additionally reduces power usage and improves battery life of the electronic device by enabling the user to use the electronic device more quickly and efficiently, while reducing errors in the usage of the device.

In some embodiments, while displaying the location indicator including the orientation indicator, the electronic device receives, via one or more input devices, a user input corresponding to a request to change a zoom level of the representation of the map to a first zoom level, such as in FIG. 6E (e.g., while displaying the first location element, receiving a user input zooming out or zooming in the representation of the map). In some embodiments, the user input is an inward or outward pinch gesture. In some embodiments, the user input is a selection of a zoom-out or zoom-in affordance. In some embodiments, the user input is a double tap followed by a downward or upward swipe gesture.

In some embodiments, in response to receiving the user input, the electronic device changes the zoom level of the representation of the map to the first zoom level, such as in FIG. 6E (e.g., decreasing or increasing the zoom level in accordance with the user input). In some embodiments, in accordance with a determination that the location indicator includes the first location element and does not include the second location element (e.g., in accordance with a determination that the orientation indicator is displayed on the first location element), the electronic device changes a size of the orientation indicator based on the changing zoom level of the representation of the map, such as in FIG. 6E (e.g., if the first location element is displayed and without switching to displaying the second location element, the width of the orientation indicator changes when the size of the first location element changes (optionally as a result of the zoom-in or zoom-out input)).

In some embodiments, the angular size of the orientation indicator is based on the accuracy of the determined orientation and remains constant in response to the zoom-in or zoom-out input. For example, if the orientation indicator has an angular width of 30 degrees (e.g., the device has determined that the device is facing a certain orientation within 30 degrees of accuracy), then in response to the zoom input, the angular width remains at 30 degrees (assuming the accuracy does not change during that time). On the other hand, the absolute width of the orientation indicator is based on the size (e.g., radius) of the first location indicator. For example, the angle of the orientation indicator is based on the accuracy of the determined orientation and if the accuracy of the determined orientation remains constant, then in response to the first location element changing size (e.g., in response to zoom-in or zoom-out inputs), the width of the orientation indicator increases or decreases due to remaining displayed on the border of the first location element, while maintaining a constant angle. For example, if the radius of the first location element increases by 25%, then the circumference of the first location element increases by 30% and thus the width of the orientation indicator increases by 25% (e.g., tracking the increase in the circumference).

In some embodiments, in accordance with a determination that the location indicator includes the second location element and does not include the first location element (e.g., in accordance with a determination that the orientation indicator is displayed on the second location element), the electronic device forgoes changing the size of the orientation indicator based on the changing zoom level of the representation of the map, such as in FIG. 6C (e.g., if the second location element is displayed and without switching to displaying the first location element, the width of the orientation indicator does not change in response to the zoom-in or zoom-out input). In some embodiments, the size of the second location element does not change in response to the zoom-in or zoom-out input and thus the size of the orientation indicator also does not change.

The above-described manner of displaying the orientation indicator (e.g., by changing the size of the orientation indicator if displayed on the first location element but not if displayed on the second location element) quickly and efficiently provides the user with appropriate orientation information independent of location accuracy, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in the usage of the device.

In some embodiments, while displaying the location indicator, the electronic device receives, via one or more input devices, a user input corresponding to a request to change a zoom level of the representation of the map to a first zoom level, such as in FIG. 6E (e.g., while displaying the first or second location element, receiving a user input zooming out or zooming in the representation of the map).

In some embodiments, the user input is an inward or outward pinch gesture. In some embodiments, the user input is a selection of a zoom-out or zoom-in affordance. In some embodiments, the user input is a double tap followed by a downward or upward swipe gesture.

In some embodiments, in response to receiving the user input, the electronic device changes the zoom level of the representation of the map to the first zoom level, such as in FIG. 6E (e.g., decreasing or increasing the zoom level in accordance with the user input). In some embodiments, in accordance with a determination that the location indicator includes the first location element and not the second location element, the electronic device changes a size of the first location element based on the changing zoom level of the representation of the map, such as in FIG. 6E (e.g., if the first location element is displayed and without switching to displaying the second location element, the radius of the first location element changes as the representation of the map is zoomed in or out).

In some embodiments, the radius of the orientation indicator is based on the accuracy of the determined location and remains constant in response to the zoom-in or zoom-out input. For example, if the accuracy of the determined location is such that the geographic radius of the determined location is 300 meters, then the radius of the first location element has a size representative of 300 meters (e.g., which is based on the scale and/or zoom level of the representation of the map). Thus, upon zooming in or out, the radius of the first location element changes to remain constantly encompassing a geographic radius of 300 meters.

In some embodiments, in accordance with a determination that the location indicator includes the second location element and not the first location element, the electronic device forgoes changing the size of the second location element based on the changing zoom level of the representation of the map, such as in FIG. 6C (e.g., the size of the second location element does not change in response to changing zoom levels). In some embodiments, because the first location element is not displayed when the second location element is displayed, when the second location element is displayed, no element of the location indicator changes size based on changing zoom levels.

The above-described manner of displaying a location indicator while zooming (e.g., by changing the size of the area indicator, but not changing the size of the point indicator) quickly and efficiently provides the user with relevant location information as the user interacts with the map (e.g., by automatically changing the size of the area indicator to encompass a constant area but not changing the size of the point indicator), which simplifies the interaction between the user and the electronic device and enhances the operability of the electronic device and makes the user-device interface more efficient (e.g., without causing confusion over the accuracy of the determined location when zooming in and out), which additionally reduces power usage and improves battery life of the electronic device by enabling the user to use the electronic device more quickly and efficiency, while reducing errors in the usage of the device.

In some embodiments, while displaying the orientation indicator, in accordance with a determination that the location indicator includes the first location element and does not include the second location element, the orientation indicator is a first portion of a first shape, such as in FIG. 6R (e.g., while the location indicator includes the first location element (e.g., an area indicator) and while the orientation indicator is displayed on the first location element, the orientation indicator includes an outer portion (e.g., a portion that is outside of the location indicator) and an inner portion (e.g., a portion that is inside the location indicator).

For example, the orientation indicator is optionally a cone shaped element that extends from the center of the location indicator outwards (e.g., optionally beyond a boundary of the location indicator). In some embodiments, one or more portions of the orientation indicator are not displayed or are faded out based on whether the location indicator includes the first location element or the second location element. Thus, the orientation indicator can have a different size and/or shape based on whether the location indicator includes the first location element or the second location element. For example, while displaying the first location element (e.g., the area indicator), the outer portion of the orientation indicator (e.g., the portion that is outside of the first location element) is displayed like a halo around a portion of the boundary of the first location element. In some embodiments, the depth of the outer portion of the orientation indicator (e.g., the size of the orientation indicator in the outwards direction) is small (e.g., smaller than the radius of the first location element). In some embodiments, the inner portion of the orientation indicator (e.g., the portion that is inside of the first location element) fades out (e.g., becomes more transparent) the closer it is to the center of the first location element). For example, at a particular location in the first location element (e.g., at the one-third point, one-half point, two-thirds point), the inner portion of the orientation indicator is completely transparent such that it is no longer displayed. In some embodiments, the inner portion of the orientation indicator gradually fades (e.g., gradually becomes more transparent) from the boundary of the first location indicator inwards until the particular location in the first location element.

In some embodiments, in accordance with a determination that the location indicator includes the second location element and does not include the first location element, the orientation indicator is a second portion of the first shape, different from the first portion of the first shape, such as in FIG. 6O (e.g., while the location indicator includes the second location element and not the first location element and the orientation indicator is displayed on the second location element, the orientation indicator includes an outer portion and does not include an inner portion).

Thus, in some embodiments, the orientation indicator appears as a cone shaped element extending outwards from the boundary of the second location element. In some embodiments, the shape of the orientation indicator is the same shape as if the location indicator includes the first location element, but different portions are displayed and different portions are not displayed (e.g., as compared to when the orientation indicator is displayed on the first location element). For example, the outer portion of the orientation indicator extends outwards from the boundary of the second location element in a similar way as how the inner portion of the orientation indicator extends outwards from the center of the first location element. In some embodiments, the orientation indicator does not fade (e.g., become more transparent), the closer it is to the boundary of the second location element. Thus, as discussed above, while the orientation indicator is displayed on the first location element, the portions of the orientation indicator that are closer to the center of the location indicator are faded out and the portions of the orientation indicator that are farther away from the center of the location indicator are displayed (e.g., based on the total radius of the first location element), but while the orientation indicator is displayed on the second location element, the portions of the orientation indicator that are closer to the center of the location indicator are displayed and the portions of the orientation indicator that are farther away from the center of the location indicator are optionally not displayed (e.g., the total displayed "length" of the orientation indicator is pre-determined and/or fixed and is not based on the radius of the second location element. Thus, different portions of the orientation indicator are displayed while other portions are not displayed (e.g., or optionally faded out) depending on whether the orientation indicator is displayed on the first or second location element (and optionally the size of the first location element).

The above-described manner of displaying the orientation indicator (e.g., by displaying the orientation indicator with a first portion displayed when displayed on the first location element or with a second portion displayed when displayed on the second location element) quickly and efficiently provides the user with orientation information independent of location accuracy (e.g., by automatically adjusting the visual characteristic of the orientation indicator to maintain visibility of the orientation indicator when the location indicator changes), which simplifies the interaction between the user and the electronic device and enhances the operability of the electronic device and makes the user-device interface more efficient (e.g., without requiring the user to perform additional inputs to switch from one style of displaying the orientation indicator to another style of displaying the orientation indicator whenever the locator indicator changes), which additionally reduces power usage and improves battery life of the electronic device by enabling the user to use the electronic device more quickly and efficiency, while reducing errors in the usage of the device.

In some embodiments, the electronic device displays, with the location indicator, a representation of a user of the electronic device, such as user icon 614 in FIG. 6P (e.g., an icon, graphic, or other suitable representation of the user on the representation of the map).

In some embodiments, the representation is displayed at or near the location indicator. In some embodiments, the representation of the user is a circular element. In some embodiments, the representation includes an indication that the representation is associated with the location indicator (e.g., an arrow, an element pointing at the location indicator). In some embodiments, the representation of the user is displayed in response to a user input selecting the location indicator. In some embodiments, in response to a user input selecting the location indicator, a user interface associated with the device's current location is displayed concurrently with the representation of the user. In some embodiments, the user interface associated with the device's current location provides information about the current determined location of the device, such as the address, the longitude and latitude values and/or a photo of the location. In some embodiments, the user interface associated with the device's current location includes one or more options associated with the current location of the device, such as an option that is selectable to mark the location (e.g., save the location for future access), an option to share the location with another user or device, and/or an option to refine the location of the electronic device (e.g., as described below with respect to method 900). In some embodiments, the representation of the user is displayed only if the location indicator satisfies one or more criteria. For example, if the location indicator includes the second location element and does not include the first location element, then selection of the location indicator causes display of the representation of the user (and optionally the user interface associated with the device's current location). If, however, the location indicator includes the first location element and does not include the second location element, then the size and/or transparency value of the first location element optionally determines whether selection of the location indicator cause display of the representation of the user (and optionally the user interface associated with the device's current location). For example, if the size of the first location indicator is above a threshold size and/or the transparency of the first location indicator is above a threshold transparency level (e.g., due to the size being above the threshold size), then selection of the first location indicator does not cause display of the representation of the user (and optionally does not cause display of the user interface associated with the device's current location). If, on the other hand, the size of the first location indicator is below the threshold size and/or the transparency of the first location indicator is below the threshold transparency level, then selection of the first location indicator (e.g., any portion of the first location indicator, the center of the first location indicator, etc.) causes display of the representation of the user (and optionally the user interface associated with the device's current location).

In some embodiments, in accordance with the determination that the accuracy of the determined location of the electronic device is above the respective threshold level for the respective zoom level (e.g., the location indicator includes the second location element, but not the first location element), the representation of the user of the electronic device is displayed with a respective user interface element connecting the representation of the user of the electronic device to a respective location on the representation of the map, such as the triangular element on user icon 614 pointing towards location indicator 602 in FIG. 6P (e.g., the representation of the user includes an element that associates the representation of the user with the location indicator).

For example, the representation of the user includes a portion extending outwards from the representation that points towards the location indicator (e.g., points towards the second location element). In some embodiments, the representation of the user is displayed near the location indicator (e.g., above, below, to the left, to the right of the location indicator).

In some embodiments, in accordance with the determination that the accuracy of the determined location of the electronic device is below the respective threshold level for the respective zoom level (e.g., the location indicator includes the first location element but not the second location element), the representation of the user of the electronic device is displayed without the respective user interface element, such as user icon 614 not including the triangular element in FIG. 6R (e.g., the representation of the user does not include an element extending outwards that points towards the location indicator).

In some embodiments, the representation of the user is displayed inside the first location element. For example, the representation of the user is displayed in the center of the first location element. In some embodiments, in response to the location indicator changing from including the first element to including the second element, the representation of the user transitions from not including the respective user interface element (e.g., that points towards the location indicator) to including the respective user interface element (and optionally moves from being displayed inside of the location indicator to being displayed outside of and/or visually separate from the location indicator). In some embodiments, in response to the locator indicator changing from including the second element to including the first element, the representation of the user transitions from including the respective user interface element to not including the respective user interface element (and optionally moves from being displayed outside of and/or visually separate from the location indicator to being displayed inside of the location indicator). As described above, the location indicator transitions from including the first location element to including the second location element (or vice versa) in response to a user zooming the representation of the map in or out. In some embodiments, if the representation of the user is displayed when the request to zoom the representation of the map in or out is received, then display of the representation of the user is maintained. In some embodiments, display of the representation of the user is maintained even if the representation of the map is zoomed to such an extent that the first location indicator is above a threshold size (e.g., in which selecting of the first location indicator does not cause display of the representation of the user). Thus, if the representation of the user is displayed, then zooming in or out maintains displayed of the representation of the user, even if selection of the location indicator at the respective zoom levels would not otherwise cause display of the representation of the user.

The above-described manner of displaying an a representation of a user (e.g., with the location indicator and with an element that connects the representation with the location indicator based on whether the location indicator includes the first location element or the second location element) quickly and efficiently indicates that the indicator represents current location of the user (e.g., by automatically transitioning to include an element that connects the representation of the user with the location indicator if the location indicator changes from either including the first location element or the second location element), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency while reducing errors in the usage of the device.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIG. 7. For example, the operation of the electronic device to indicate the current location of the electronic device described above with reference to method 700 optionally has one or more of the characteristics of improving the accuracy of the determined location of the electronic device, etc., described herein with reference to other methods described herein (e.g., method 900). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIG. 7 are, optionally, implemented by components depicted in FIGS. 1A-1B. For example, displaying operation 702 is, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Improving the Accuracy of a Device's Determined Location

Users interact with electronic devices in many different manners, including using an electronic device to view and find geographic locations on a map. In some embodiments, a user can view the electronic device's determined location on the map. The embodiments described below provide ways to improve the accuracy of the device's determined location, thus enhancing the user's interactions with the electronic device. Enhancing interactions with a device reduces the amount of time needed by a user to perform operations, and thus reduces the power usage of the device and increases battery life for battery-powered devices.

Figures 8A, 8B:
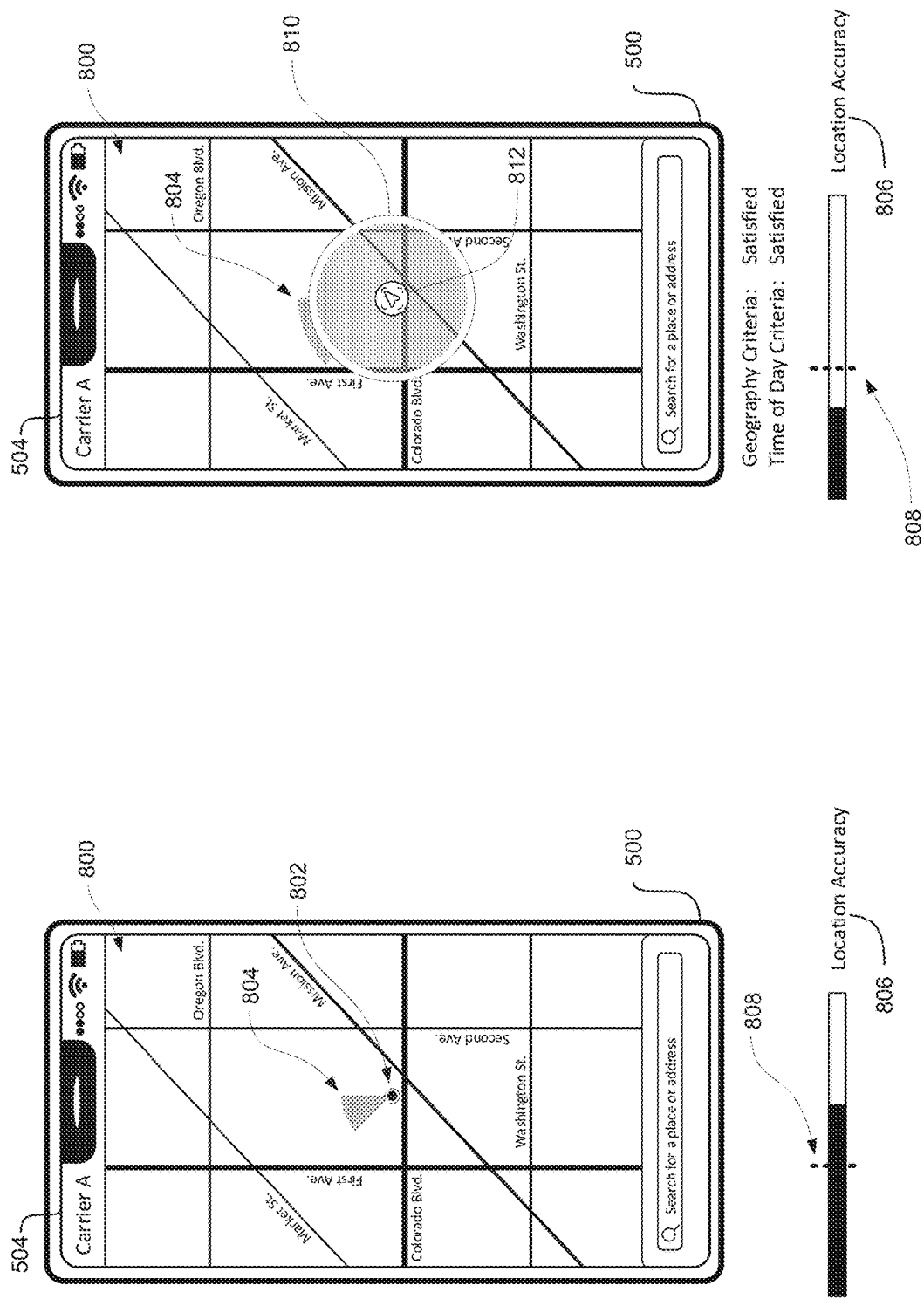
FIGS. 8A-8S illustrate exemplary ways in which an electronic device improves the accuracy of the determined location of the electronic device in accordance with some embodiments of the disclosure.
Figure 8F:
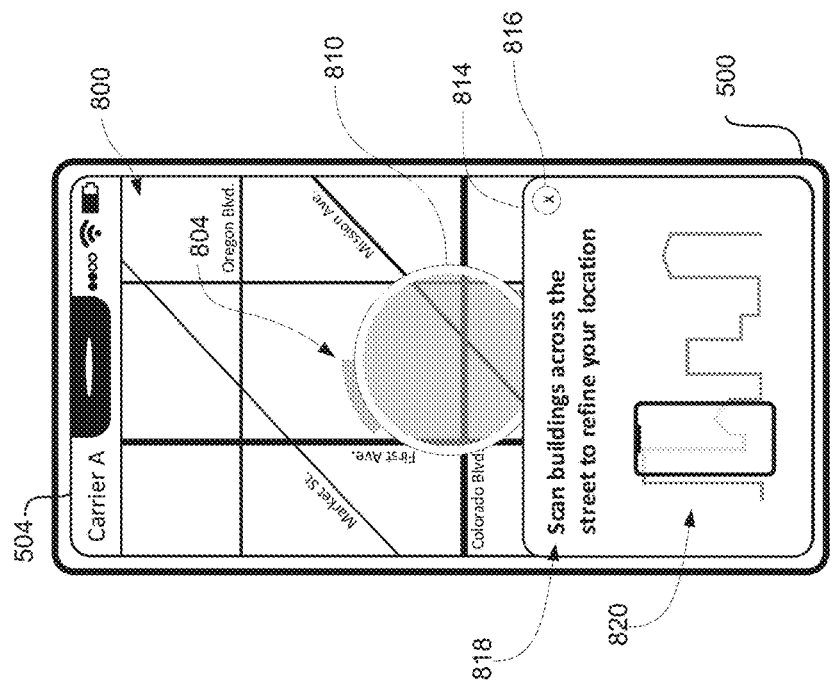
Figure 8E:
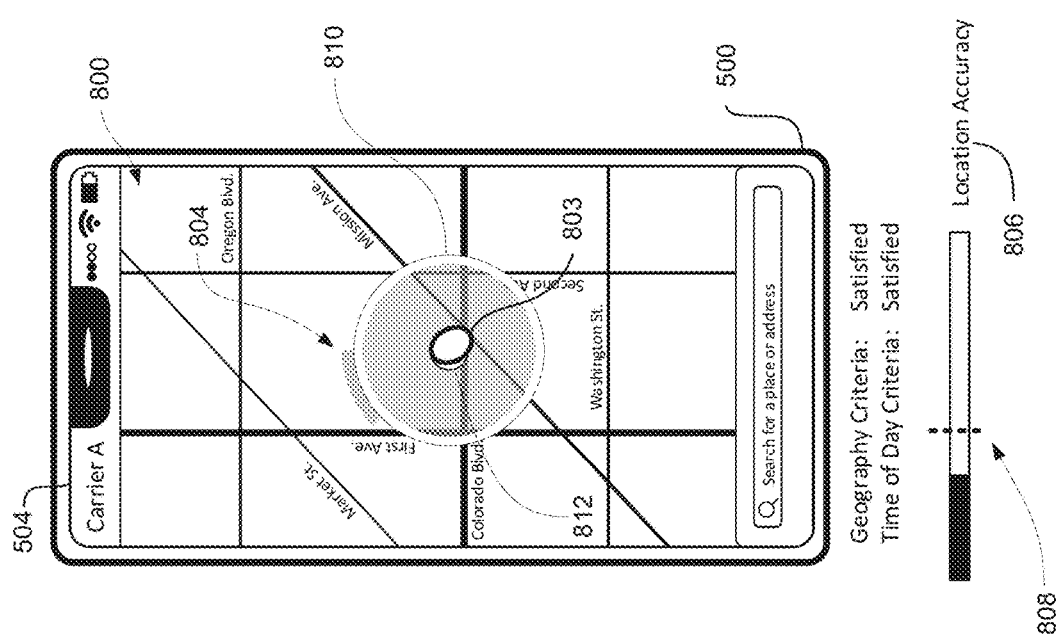
Figure 8H:
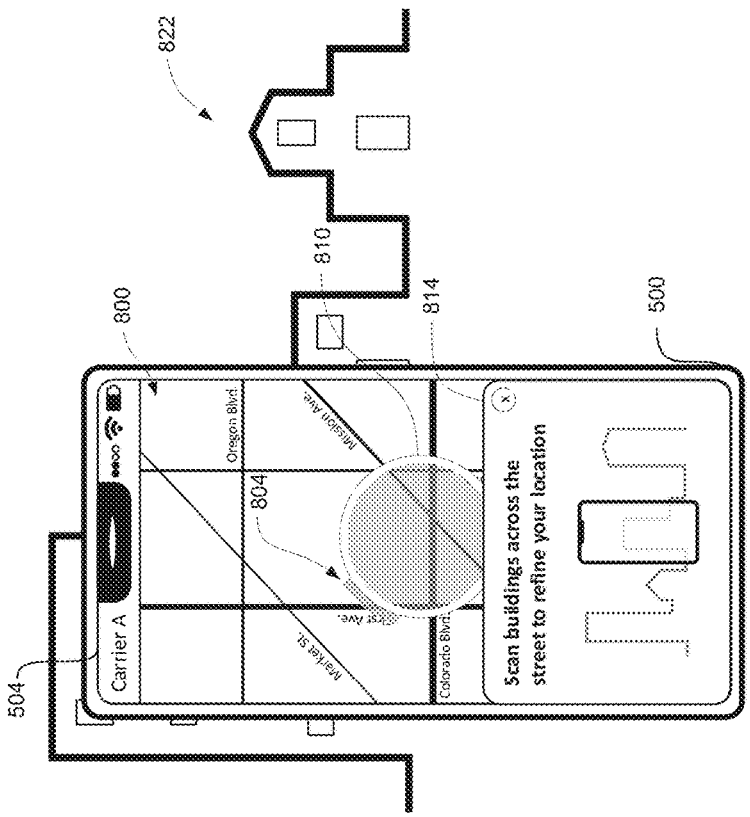
Figure 8G:
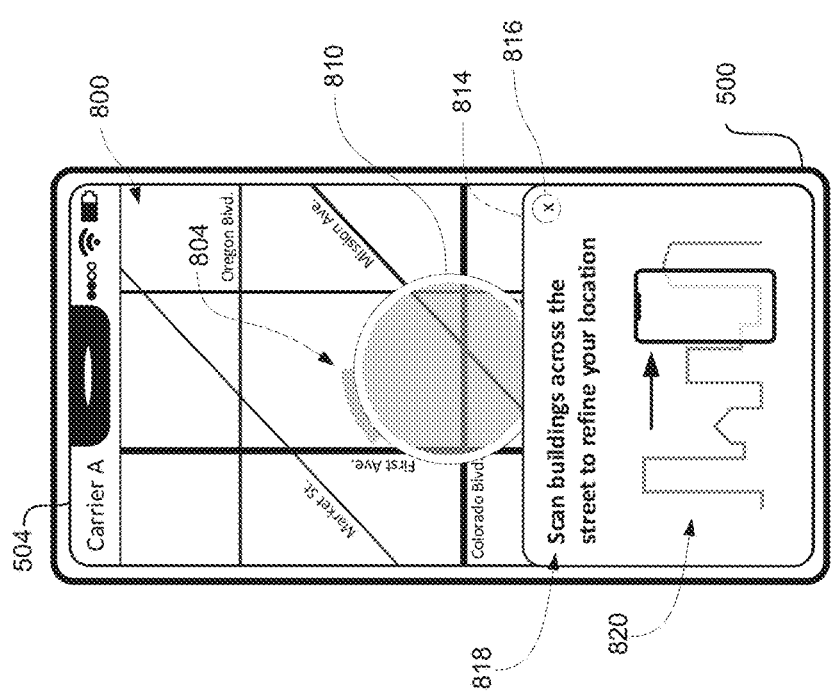
Figure 8J:
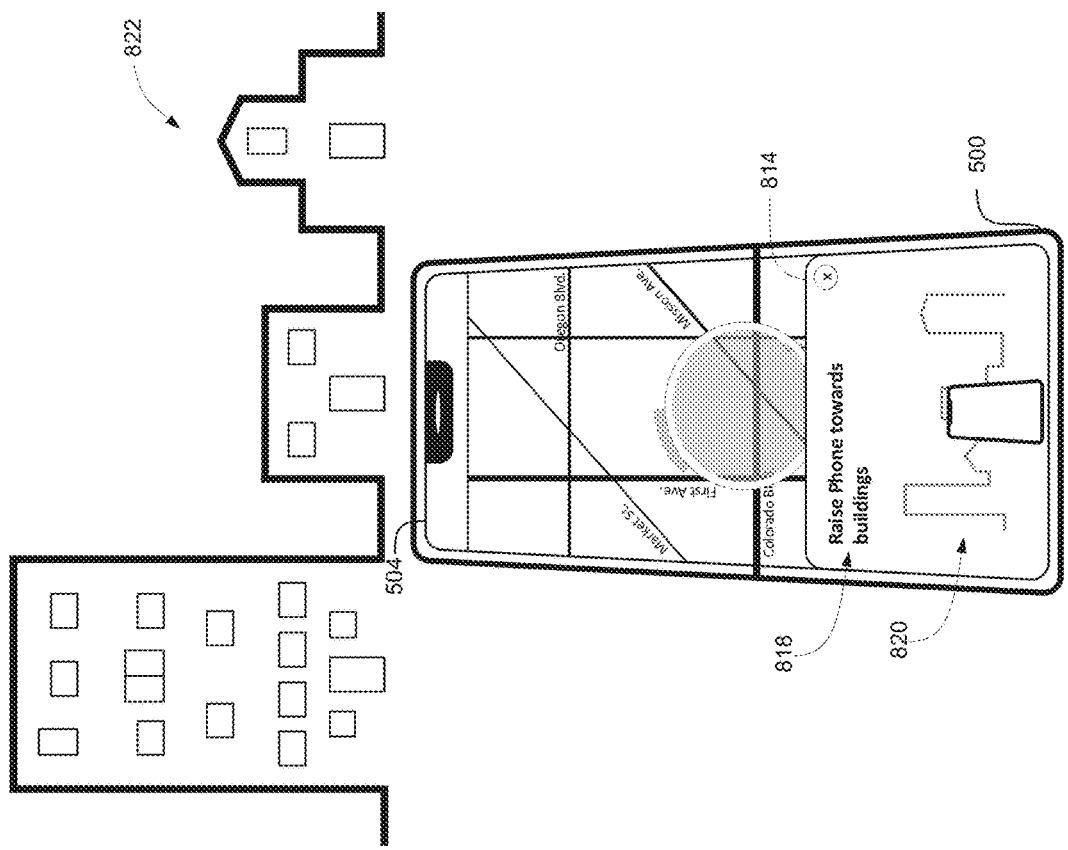
Figure 8I:
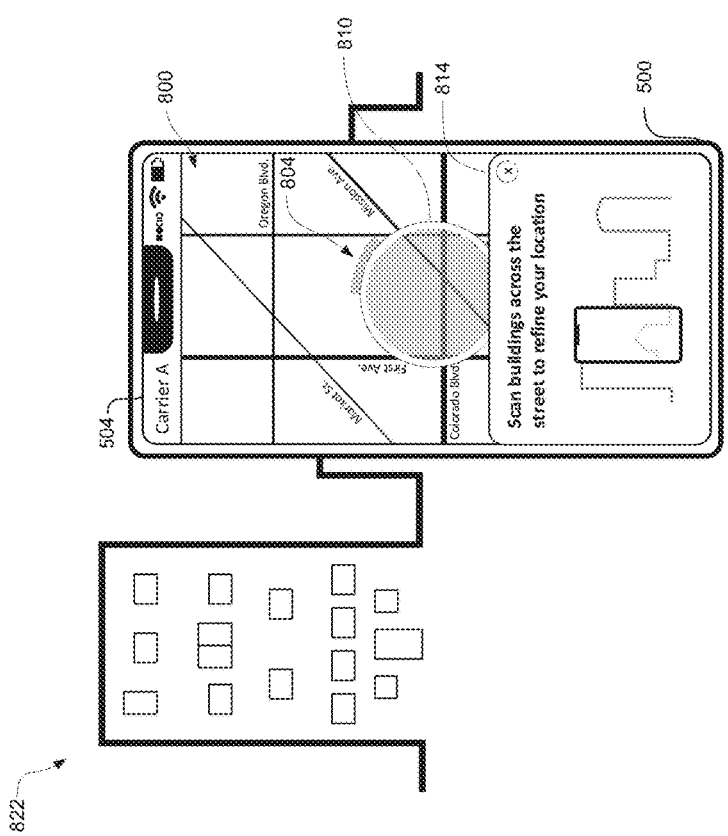
Figure 8L:
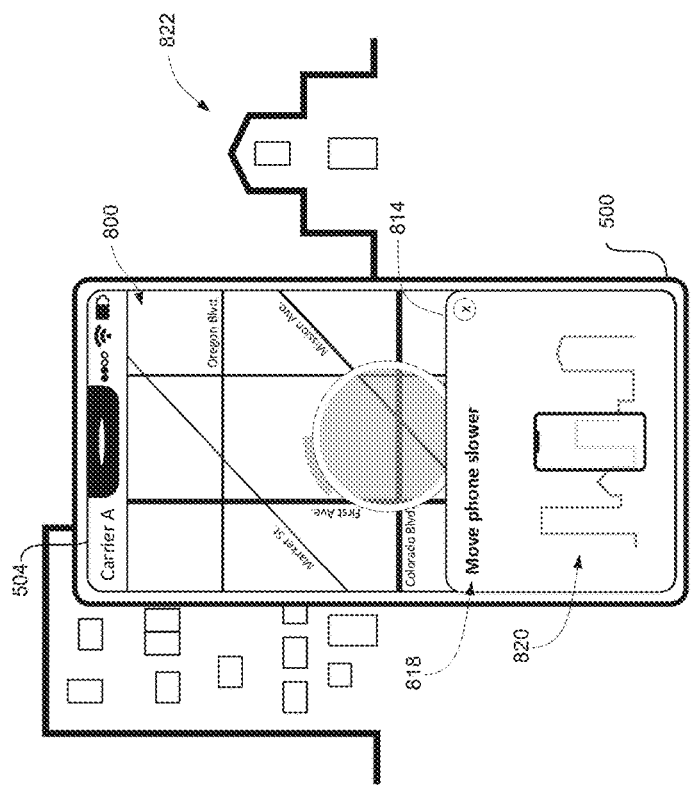
Figure 8K:
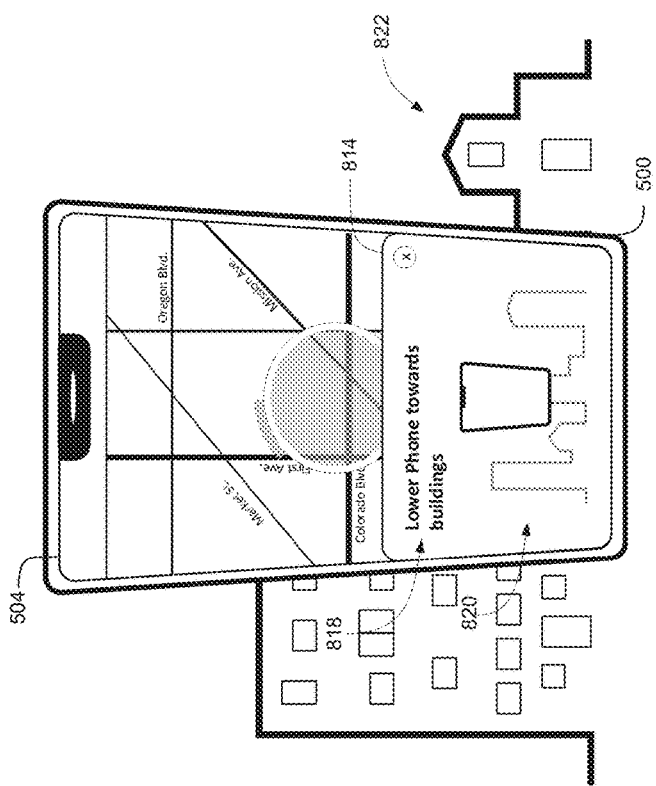
Figure 8N:
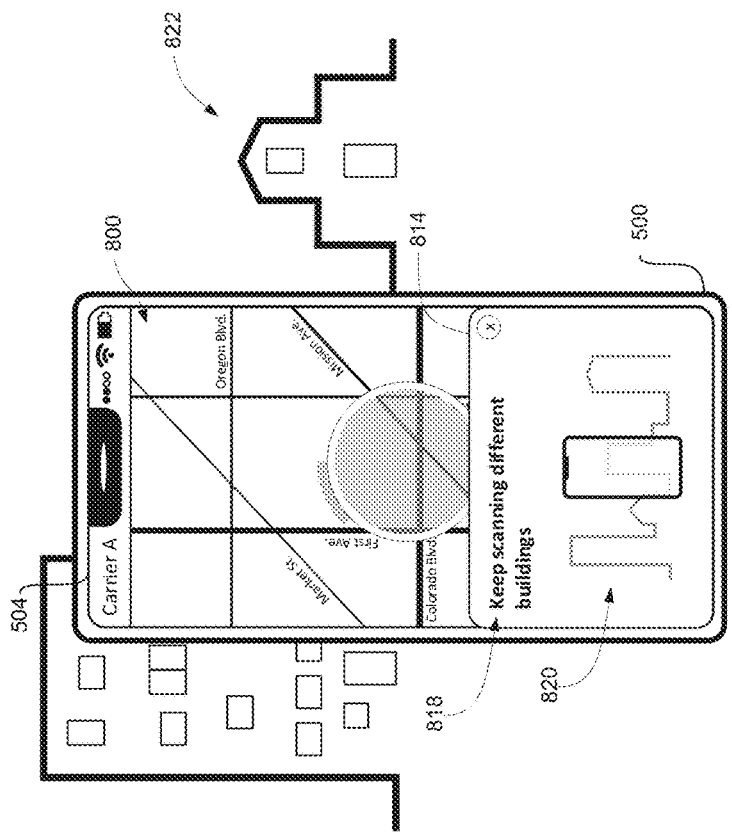
Figure 8M:
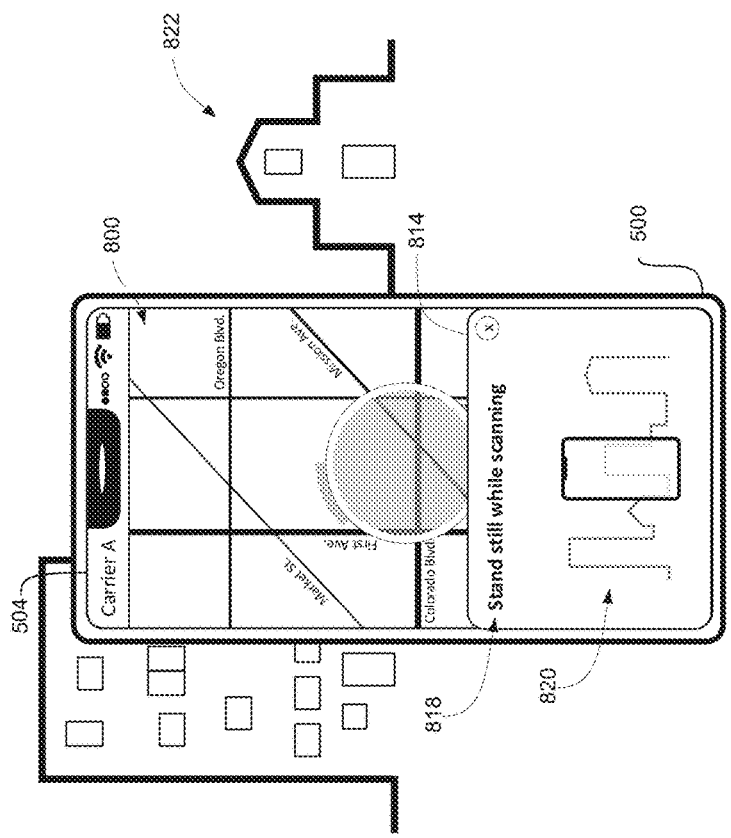
Figure 8S:
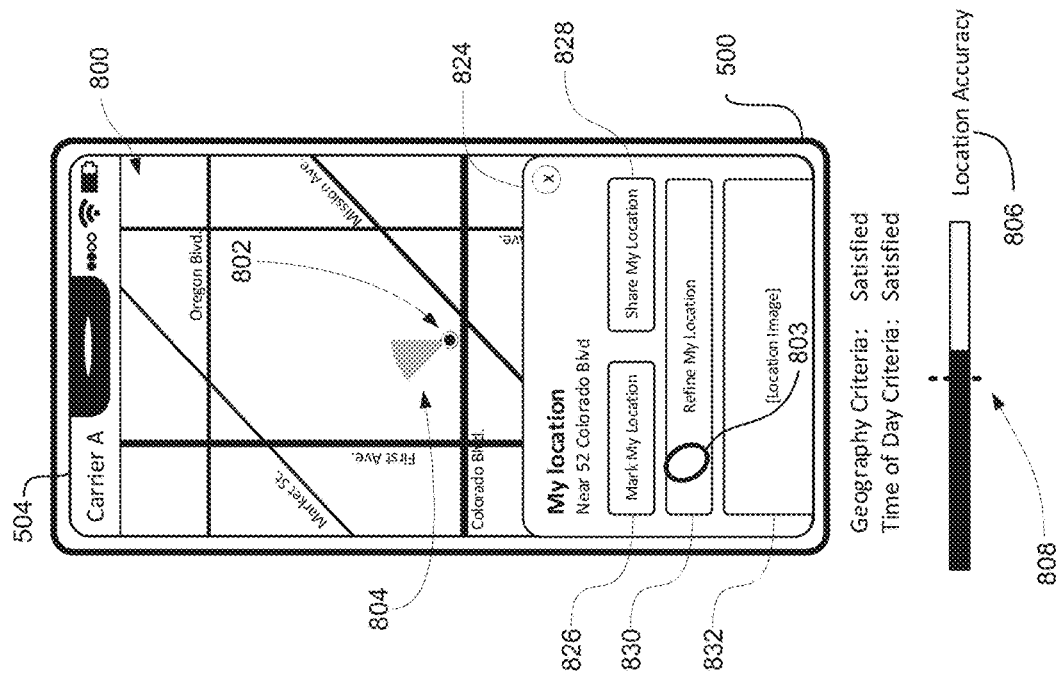

FIGS. 8A-8S illustrate exemplary ways in which an electronic device improves the accuracy of the determined location of the electronic device in accordance with some embodiments of the disclosure. The embodiments in these figures are used to illustrate the processes described below, including the processes described with reference to FIG. 9.

FIG. 8A illustrates electronic device 500 displaying user interface 800 (e.g., via a display device, via a display generation component, etc.). In some embodiments, user interface 800 is displayed via a display generation component. In some embodiments, the display generation component is a hardware component (e.g., including electrical components) capable of receiving display data and displaying a user interface. In some embodiments, examples of a display generation component include a touch screen display, a monitor, a television, a projector, an integrated, discrete, or external display device, or any other suitable display device that is in communication with device 500.

In some embodiments, user interface 800 is a user interface of a map application (e.g., an application in which a user is able to view geographic locations, search for locations, and/or request directions from one location to another, similar to the map application described above with respect to FIG. 6A). In some embodiments, the map application is an application installed on device 500.

In some embodiments, user interface 800 includes a representation of a map navigated to the determined current location of the electronic device. In FIG. 8A, accuracy 806 of the determined location of the device is above threshold 808 for the current zoom level and thus user interface 800 includes location indicator 802 (e.g., a point indicator, as described above with respect to method 700). As shown in FIG. 8A, because user interface 800 is displaying a point indicator (e.g., location indicator 802), device 500 does not display an affordance to improve the location accuracy of the device, as will be described in more detail below. In some embodiments, even though user interface 800 is not displaying an area indicator (e.g., location indicator 810), device 500 displays the affordance. For example, instead of displaying location indicator 802, device 500 displays the affordance (e.g., such as affordance 812 described below with respect to FIG. 8B) at the location where location indicator 802 would otherwise be displayed (e.g., the affordance is displayed as the location indicator and/or at the location of location indicator 802).

FIG. 8B illustrates an embodiment in which location accuracy 806 is below the threshold level 808 for the current zoom level of the map. In some embodiments, because location accuracy 806 is below the threshold level 808 for the current zoom level of the map, device 500 displays location indicator 810 corresponding to an area indicator (e.g., similar to location indicator 602 described above with respect to FIG. 6A). Thus, as shown in FIG. 8B, device 500 is unable to determine a precise (e.g., single) location of device 500, and based on the current accuracy of the determination, is only able to determine that the device is within a certain geographic area. Aspects of location indicator 810 and orientation indicator 804 are optionally as described above with reference to FIGS. 6A-6T and method 700.

In FIG. 8B, affordance 812 is displayed within (e.g., at the center of) location indicator 810. In some embodiments, affordance 812 is selectable to initiate a process to improve the determined location of the device, as will be described in further detail below. As shown in FIG. 8B, affordance 812 is an icon of an arrow or arrowhead. In some embodiments, affordance 812 is pointed towards the determined orientation of the device (e.g., in the embodiment shown in FIG. 8B, toward the north-west). In some embodiments, affordance 812 is a fixed graphic and does not dynamically change orientation.

In some embodiments, the process to improve the determined location of the device that is triggered in response to selection of affordance 812 is a process different than the process used to initially determine the location of the device that produced the location with accuracy 806. Thus, the process to improve the determined location of the device that is initiated in response to selection of affordance 812 is able to improve the accuracy of the determined location and narrow down the determined location more so than is currently displayed.

In some embodiments, as will be described in further detail below, the process to improve the determined location of the device includes analyzing one or more images captured by one or more cameras of device 500 and identifying one or more elements (e.g., objects, buildings, signs, businesses, landmarks, features (as known in the field of computer vision) and/or any other points of interest) and comparing the list of identified elements against a list of identified elements in one or more pre-captured images (e.g., the list of identified elements in one or more pre-captured images is pre-generated or is analyzed (before display of affordance 812) and determined by a device other than device 500 and sent to device 500 as part of the process to improve the determined location of device 500). In some embodiments, the process to improve the determined location of the device additionally or alternatively includes comparing one or more images captured by one or more cameras of device 500 with one or more pre-captured images and determining whether the captured images matches the pre-captured images. In some embodiments, the process for determining the location with accuracy 806 in the first place does not include such comparison of images or elements in the images (e.g., but rather includes GPS and/or cellular and/or Wi-Fi based location determination techniques).

In some embodiments, affordance 812 is displayed in FIG. 8B only if one or more criteria are satisfied. In some embodiments, the one or more criteria include a requirement that accuracy 806 is below the threshold level 808 for the current zoom level (e.g., as shown in FIG. 8B). In some embodiments, threshold level 808 is the same threshold level that determines whether the point indicator or area indicator is displayed (e.g., threshold level 608 described in FIGS. 6A-6N), such as described above with respect to method 700. For example, the requirement that accuracy 806 be below the threshold level 808 for the current zoom level is satisfied when the area indicator is displayed (e.g., when the accuracy is below the threshold) and not satisfied when the point indicator is displayed (e.g., when the accuracy is above the threshold). In some embodiments, the threshold level 808 is a different threshold level than the threshold level that determines whether a point indicator or area indicator is displayed. For example, the requirement that accuracy 806 be below the threshold level 808 for the current zoom level can be satisfied even if a point indicator is displayed and the requirement that accuracy 806 be below the threshold level 808 for the current zoom level can be not satisfied even if the area indicator is displayed.

In some embodiments, the one or more criteria includes a geography criteria that is satisfied when the device is determined to be located at or within certain predetermined geographic locations. For example, the predetermined geographic locations optionally include locations in which photographic information (e.g., a list of identified elements as described above) is available for the respective locations. In some embodiments, photographic information is available if the map application (or a map server) has access to one or more images or photographs that were previously captured by a camera. In some embodiments, the previously captured images are captured by a third party and maintained on a server (e.g., external to device 500). In some embodiments, the previously captured images are taken from a street or sidewalk level and include images of roads, signs, buildings, businesses, stores, or any other recognizable landmark.

In some embodiments, the one or more criteria includes a requirement that the camera clarity is above a predetermined level. For example, if one or more images captured by the one or more cameras of device 500 is above a predetermined level of clarity (e.g., ability to capture sufficient detail or sufficient quality), then the camera clarity requirement is satisfied. In some embodiments, the camera clarity criteria includes a time of day requirement (e.g., that the current time of day is within a predetermined window of time). For example, the predetermined window of time includes the daylight hours and does not include nighttime hours (e.g., from sunset to sundown). In some embodiments, the predetermined window of time begins half an hour before sunset to half an hour after sundown. In some embodiments, other windows of time are possible.

In some embodiments, the camera clarity criteria includes a requirement that the amount of ambient light is above a threshold level. In some embodiments, requiring a threshold amount of ambient light ensures that that images captured by one or more cameras of device 500 include sufficient detail of the objects around device 500. In some embodiments, the amount of ambient light can be determined using an ambient light sensor and/or by analyzing the images taken by the one or more cameras of device 500 to determine whether there is sufficient brightness, contrast, detail and/or clarity.

In some embodiments, the camera clarity requirement includes a requirement that the current weather is conducive to clear camera captures. For example, if the current weather includes heavy fog or heavy cloud cover, then images captured by the one or more cameras of device 500 may not provide sufficient clarity and thus the camera clarity requirement are not satisfied. Conversely, if the current weather includes clear sunny skies, then the camera clarity requirement is optionally satisfied.

In some embodiments, the camera clarity criteria includes any one of the time of day requirement, ambient light requirement, and weather requirement, or any combination of the above (e.g., only one requirement, such as the time of day requirement; two of the three requirements; or all three requirements).

In some embodiments, the one or more criteria are satisfied if all three of the above-described criteria are satisfied (e.g., geography requirement, camera clarity requirement, and accuracy requirement). In some embodiments, the one or more criteria are not satisfied if any of the three above-described criteria are not satisfied. In some embodiments, the one or more criteria can include more or fewer requirements than those described herein.

As shown in FIG. 8B, the requirement that accuracy 806 is below threshold level 808 is satisfied, the geography criteria is satisfied, and the time of day criteria (e.g., or an ambient light criteria, or a camera clarity requirement, as will be described in more detail below) is satisfied. Thus, in response to the one or more criteria being satisfied, user interface 800 includes affordance 812 at the center of location indicator 810. It is understood that the position of affordance 812 illustrated in FIG. 8B is merely exemplary and affordance 812 can be placed anywhere in user interface 800 (e.g., an affordance that is displayed concurrently with position indicator).

FIG. 8C illustrates an embodiment in which the geography criteria is not satisfied (e.g., because device 500 is determined to be at a location for which photographic information for use in the process to improve the determined location of the device is not available, such as the list of identified elements and/or pre-captured images of the respective location) while the time of day criteria is satisfied and the requirement that accuracy 806 is below threshold level 808 is satisfied. In some embodiments, because the geography criteria is not satisfied, affordance 812 is not displayed in user interface 800 despite the geography criteria and the requirement that accuracy 806 be below a threshold level 808 are satisfied.

FIG. 8D illustrates an embodiment in which the time of day criteria is not satisfied (e.g., because the current time of day at device 500 is after sunset, or before sunrise) while the geography criteria is satisfied and the requirement that accuracy 806 is below threshold level 808 is satisfied. In some embodiments, because the time of day criteria is not satisfied, affordance 812 is not displayed in user interface 800 despite the geography criteria and the requirement that accuracy 806 be below a threshold level 808 are satisfied. Although FIG. 8D illustrates the time of day criteria not being satisfied causing affordance 812 to not be displayed, in some embodiments, the camera clarity criteria (which optionally includes the time of day criteria in some embodiments) can be used instead of the time of day criteria. For example, if the camera clarity criteria is not satisfied while the geography criteria and requirement that accuracy 806 be below threshold level 808 is satisfied, then affordance 812 is not displayed (and if the camera clarity criteria, geography criteria, and requirement that accuracy 806 be below threshold level 808 are all satisfied, then affordance 812 is displayed). Thus, in the embodiments illustrated in FIG. 8C and FIG. 8D, user interface 800 includes location indicator 810 without including affordance 812.

In FIG. 8E, while displaying location indicator 810 and affordance 812 (e.g., the one or more criteria are satisfied, such as in FIG. 8B), a user input 803 is received selecting affordance 812 (e.g., a tap input on touch screen 504 at the location of affordance 812). In some embodiments, in response to receiving user input 803, device 500 initiates the process to improve the determined location of device 500, as shown in FIG. 8F.

In FIG. 8F, device 500 displays user interface 814. In some embodiments, user interface 814 is overlaid over a portion of user interface 800 (e.g., a lower portion of user interface 800). In some embodiments, user interface 800, which still includes location indicator 810 and orientation indicator 804, will update during the below-described process of improving the location accuracy of device 500. In some embodiments, user interface 814 includes instructions to guide the user through the process of improving the location accuracy of the map application for the device. In some embodiments, user interface 814 includes exit affordance 816 that is selectable to dismiss user interface 814 and cancel the process of improving the location accuracy of the map application for the device. In some embodiments, user interface 814 includes textual instructions 818 and graphics 820. In some embodiments, graphic 820 is a still image or an animation representing the instructions explained by textual instructions 818. In FIG. 8F, textual instructions 818 instruct the user to scan the buildings in the surroundings of device 500 (e.g., across the street) and graphic 820 is an animation of the phone moving laterally across a cityscape. In some embodiments, the graphic 820 includes a pre-drawn representation of buildings or houses (e.g., a cityscape). In some embodiments, the displayed graphic, e.g., graphic 820, is not a representation of the actual environment being captured by the one or more cameras of device 500. For example, graphic 820 may not include a live camera view. Thus, while performing the process to improve the determined location of the device, in some embodiments device 500 does not display a representation or view of the images being captured by the one or more cameras of device 500.

As described above, the process to improve the determined location of the device includes capturing one or more images by the one or more cameras of device 500, analyzing the one or more images to identify elements (e.g., objects, buildings, signs, businesses, landmarks, and/or any other points of interest) and comparing the list of identified elements against a list of identified elements in the one or more pre-captured images. In some embodiments, the list of identified elements in the one or more pre-captured images is pre-generated (e.g., by a server, external to device 500). In some embodiments, the one or more pre-captured images is analyzed by device 500 (or optionally a server, external to device 500) as part of the process to improve the determined location of the device. In some embodiments, if a threshold number of elements in the list of identified elements (e.g., 30% of the objects match, 50%, 75%, 90%, 95%, 99%, etc.) match objects in the list of identified elements in the pre-captured images, device 500 is able to determine that device 500 is currently at the geographic location associated with the pre-captured images. Thus, in some embodiments, if the elements in the list of identified elements match a sufficient amount of objects in the list of identified elements in the pre-captured images, device 500 is able to determine that device 500 is at or near the location encoded in the respective pre-captured image(s). In some embodiments, as more elements match the elements in the pre-captured images, device 500 is able to narrow down the location of device 500. As will be described below, when device 500 is able to determine the device's location to less than a threshold area (e.g., less than 100 square feet, less than 2500 square feet, less than 10,000 square feet, less than 50,000 square feet, etc.) with more than a threshold amount of confidence (e.g., 80% confident, 90% confident, 95% confident, 99% confident, etc.), then the process to improve the determined location of the device finishes, and device 500 updates the location indicator (e.g., its type, its location, etc. on the map) to reflect the newly determined location.

In some embodiments, during the process, device 500 continuously captures images using the one or more cameras of device 500. In some embodiments, device 500 captures images at a predetermined frequency (e.g., every 0.5 seconds, every 1 second, every 3 seconds, every 5 seconds, etc.).

In some embodiments, the process additionally or alternatively includes capturing one or more images and comparing the images against the one or more previously captured images of the area around device 500. In some embodiments, device 500 analyzes the images and compares the images against pre-captured images to determine whether the captured images match all of or a portion of the pre-captured images. In some embodiments, the comparison is performed on device 500. In some embodiments, device 500 downloads one or more of the pre-captured images when the user initiates the process to improve the determined location of the device. In some embodiments, device 500 downloaded the pre-captured images before the user initiated the process. In some embodiments, the comparison is performed at a server or device external to device 500, and device 500 optionally transmits the one or more captured images to the server or external device.

In some embodiments, based on the results of the comparisons, device 500 is able to determine the location of device 500. For example, if the captured images match a threshold amount of pre-captured images (e.g., 2 images, 3 images, 5 images, etc.) that were taken from a respective geographic location, then device 500 determines that device 500 is currently at the respective geographic location. In some embodiments, the pre-captured image is encoded with the GPS coordinates (or optionally other types of location information). Thus, in some embodiments, if the images captured by the cameras of device 500 match a sufficient amount of a pre-captured image, device 500 is able to determine that device 500 is at or near the location encoded in the respective pre-captured image. In some embodiments, as multiple images match multiple pre-captured images, device 500 is able to narrow down the location of device 500. As will be described below, when device 500 is able to determine the device's location to less than a threshold area (e.g., less than 100 square feet, less than 2500 square feet, less than 10,000 square feet, less than 50,000 square feet, etc.) with more than a threshold amount of confidence (e.g., 80% confident, 90% confident, 95% confident, 99% confident, etc.), then the process to improve the determined location of the device finishes, and device 500 updates the location indicator (e.g., its type, its location, etc. on the map) to reflect the newly determined location.

As described herein, the process to improve the determined location of the device includes either the photo-comparison process described above, the element comparison process described above, or a combination of the two processes. In some embodiments, other methods for determining whether the one or more captures by the one or more cameras of device 500 correlate to one or more pre-captured images are possible (e.g., additionally or alternatively to the process described above). Similarly, any of the above-described processes can be performed by device 500, by a server external to device 500, or a combination.

FIG. 8G illustrates graphic 820 animating to show a representation of a mobile device moving across the graphic. In some embodiments, the animation of graphic 820 provides visual instructions to the user (e.g., in addition to textual description 818). Thus, in some embodiments, the user is instructed to move or rotate device 500 such that the one or more cameras of device 500 are able to perform a plurality of captures of the environment around device 500. In some embodiments, graphics 820 performs the animation of the device moving without regard to whether device 500 is actually moving or rotating.

FIG. 8H illustrates device 500 having been lifted up such that the one or more cameras of device 500 (e.g., optionally forward facing cameras) are facing towards environment 822 in the vicinity of (e.g., across the street from) device 500. In some embodiments, environment 822 includes one or more buildings, as shown in FIG. 8H. In FIG. 8H, user interface 800 includes orientation indicator 804 (e.g., similar to orientation indicator 604 described above with respect to FIG. 6A) that indicates the orientation of device 500. In FIG. 8H, orientation indicator 804 tracks the orientation of device 500 as the user moves device 500 to scan the buildings and/or environment. Thus, in FIG. 8H, orientation indicator 804 is facing towards the north-west. As shown in FIG. 8H, images of environment 822 are not displayed in user interface 800 or user interface 814.

FIG. 8I illustrates device 500 having been rotated to continue capturing the buildings or other landmarks in environment 822 (e.g., moved or rotated rightwards to capture the shorter buildings in environment 822). In some embodiments, in response to determining that device 500 has been rotated or in response to determining that device 500 has changed orientation, orientation indicator 804 is updated to reflect the change in orientation, as shown in FIG. 8I. For example, in FIG. 8I, orientation indicator 804 has been updated to indicate that device 500 is facing north-east.

As shown in FIG. 8I, images of environment 822 are not displayed in user interface 800 or user interface 814.

FIGS. 8J-8N illustrate user interface 814 updating textual description 818 and/or graphics 820 to provide additional instructions to the user (e.g., based on the determined orientation and/or movement of device 500 during the process to improve its location). In FIG. 8J, device 500 is facing downwards. In some embodiments, device 500 determines that device 500 is facing downwards (e.g., its orientation along y axis or pitch axis is below a horizontal level by greater than a threshold amount such as 10 degrees, 30 degrees, 45 degrees, etc.) and is unable to sufficiently capture, with its one or more cameras, landmarks in environment 822. In some embodiments, device 500 includes one or more sensors such as a gyroscope or compass to determine that device 500 is facing downwards. In some embodiments, device 500 analyzes the images captured by the one or more cameras of device 500 to determine that device 500 is facing downwards. In some embodiments, in response to determining that device 500 is facing downwards, textual instructions 818 are updated to instruct the user to raise device 500 to face the buildings in environment 822, as shown in FIG. 8J. In some embodiments, graphics 820 is updated to show an animation of the device being raised up towards the cityscape in graphics 820 (e.g., the device in graphics 820 facing downwards and animating upward to face the cityscape). As shown in FIG. 8J, images of environment 822 are not displayed in user interface 800 or user interface 814.

In FIG. 8K, device 500 is facing upwards and device 500 determines that it is facing upwards (e.g., its orientation along y axis or pitch axis is above a horizontal level by greater than a threshold amount such as 10 degrees, 30 degrees, 45 degrees, etc.). In some embodiments, in response to determining that device is facing upwards, textual instructions 818 are updated to instruct the user to lower device 500 to face the buildings in environment 822, as shown in FIG. 8K. In some embodiments, graphics 820 is updated to show an animation of the device being lowered down towards the cityscape in graphics 820 (e.g., the device in graphics 820 facing upwards and animating downwards to face the cityscape). As shown in FIG. 8K, images of environment 822 are not displayed in user interface 800 or user interface 814.

In FIG. 8L, device 500 determines that device 500 is being rotated or moved too quickly to properly capture images of environment 822 (e.g., the images being captured are blurry or the gyroscope in device 500 determines that device 500 is moving too quickly). In some embodiments, in response to determining that device 500 is being rotated or moved too quickly, textual description 818 is updated to instruct the user to move device 500 more slowly, as shown in FIG. 8L. In some embodiments, graphics 820 is updated such that the animation of device 500 is moved slowly across the screen, e.g., the displayed cityscape. As shown in FIG. 8L, images of environment 822 are not displayed in user interface 800 or user interface 814.

In FIG. 8M, device 500 determines that device 500 is changing locations (e.g., x,y location), thus preventing device 500 from pinpointing a single location. In some embodiments, device 500 is able to determine that device 500 is changing locations based on one or more motion sensors in device 500 (e.g., accelerometer, gyroscope, compass, etc.), location sensors in device 500 (e.g., GPS, cellular, Wi-Fi), and/or the results of the comparison providing changing location results. In some embodiments, in response to determining that device 500 is changing locations, textual description 818 is updated to instruct the user to stand still while performing the one or more captures, as shown in FIG. 8M. In some embodiments, graphics 820 is updated to animate device 500 remaining in one location and rotating leftwards and rightwards.

In some embodiments, textual description 818 is updated to instruct the user to stand still while performing the one or more captures, as shown in FIG. 8M, when device 500 determines that device 500 is not being held steady enough to allow for clear captures of environment 822 (e.g., based on one or more motion sensors). Thus, in some embodiments, textual description 818 and/or graphics 820 instructs the user to stand still while performing the captures in response to determining that the device is changing locations or moving erratically, etc. As shown in FIG. 8M, images of environment 822 are not displayed in user interface 800 or user interface 814.

In FIG. 8N, device 500 determines that not enough of environment 822 has been captured to allow device 500 to determine the location of device 500. In some embodiments, in response to determining that not enough of environment 822 has been captured, textual description 818 is updated to provide feedback to the user in order to determine the location of the device, e.g., instruct the user to scan different buildings in environment 822. In some embodiments, graphic 820 is updated in response to a new view of the camera. For example, the camera may include more buildings in its view therefore graphic 820 may include more buildings in the cityscape (and optionally decreasing the size of the cityscape) and show the device moving across the newly added buildings. In some embodiments, graphic 820 displays cityscape animating to include more buildings without regard to whether the camera is capturing more or fewer buildings or capturing a new view. As shown in FIG. 8N, images of environment 822 are not displayed in user interface 800 or user interface 814.

In some embodiments, instead of displaying the textual description 818 described in FIG. 8N in response to determining that not enough of environment 822 has been captured, the instructions to scan different buildings in environment 822 (e.g., as in FIG. 8N) is displayed after the instructions illustrated in FIG. 8I has been displayed to the user for a threshold amount of time (e.g., after displaying the instructions illustrated in FIG. 8I for 2 seconds, 3 seconds, 5 seconds, 8 seconds, 10 seconds, etc., replacing the instructions with those illustrated in FIG. 8N without regard to whether enough of environment 822 has been captured), optionally until or unless another instruction should be provided to the user (e.g., according to the criteria described above).

Thus, as described above, device 500 is able to update textual instructions 818 and/or graphics 820 to provide updated instructions based on the adjustments needed to successfully complete the process to improve the determined location of device 500. It is understood that textual instructions other than those described above are possible based on the status of the image capture and/or comparison process. It is also understood that some or all of the textual instructions described above are optionally and need not be displayed to the user. For example, the "stand still" textual instructions need not be shown to the user and even if device 500 determines that the user is changing locations, device 500 is optionally able to successfully perform the process to improve the accuracy of the determined location of device 500 (e.g., without requiring the user to stop moving or change scanning behavior). In some embodiments, in response to successfully completing the process to improve the determined location of device 500, user interface 814 is dismissed and the location indicator switches from location indicator 810 (e.g., the area indicator) to location indicator 804 (e.g., the point indicator). In some embodiments, in response to successfully completing the process to improve the determined location of device 500, the location indicator switches to a user interface element, different from location indicator 810 or location indicator 804, corresponding to a refined device location (e.g., optionally to indicate that the device's location has been determined using the above-described process). As shown in FIG. 8O, the position of location indicator 804 (e.g., more accurately determined due to the process described with reference to FIGS. 8E-8N) may not be at the center of where location indicator 810 was previously displayed (e.g., based on the location determined by the process described above). In FIG. 8O, as a result of the above-described process, accuracy 806 has increased to a high level (optionally above threshold level 808), which is optionally the reason device 500 has switched from displaying location indicator 810 to displaying location indicator 802 (e.g., as described with reference to method 700). In some embodiments, if accuracy 806 is not increased to above threshold level 808 (e.g., such as if the map is zoomed very far in), then device 500 optionally maintains display of location indicator 810 (e.g., optionally with a smaller size to reflect the increase in accuracy).

It is understood that the process described above for improving the determined location of the device is additionally or alternatively able to improve the determined orientation of the device. For example, based on the comparisons, device 500 is able to determine the orientation of the device and calibrate the one or more orientation sensors accordingly to improve the accuracy of the orientation of the device (e.g., and optionally reduce the angle of the orientation indicator accordingly).

FIGS. 8P-8S illustrate an embodiment of initiating the process to improve the determined location of device 500 even if the requirement that accuracy 806 be below the threshold level 808 for the current zoom level is not satisfied. In FIG. 8P, accuracy 806 is below threshold level 808 for the current zoom level. In some embodiments, in response to accuracy 806 being below threshold level 808 for the current zoom level, user interface includes indicator 810 (e.g., such as in FIG. 6E). Thus, the requirement that accuracy 806 be below the threshold level 808 for the current zoom level is satisfied. In FIG. 8P, the geography criteria and the time of day criteria are also satisfied. In some embodiments, because the requirement that accuracy 806 be below the threshold level 808 for the current zoom level is satisfied, the geography criteria is satisfied, and time of day criteria are satisfied, affordance 812 is displayed, as shown in FIG. 8P.

In FIG. 8Q, a user input 803 corresponding to an inward pinch gesture is received (e.g., a request to zoom out) while accuracy 806 remains constant. In some embodiments, in response to the request to zoom the map out, threshold level 808 decreases (e.g., as compared to FIG. 8P) to below accuracy 806. In some embodiments, in response to accuracy 806 becoming above threshold level 808, device 500 replaces location indicator 810 with location indicator 802. In some embodiments, due to zooming out the map, the requirement that accuracy 806 be below the threshold level 808 for the current zoom level is no longer satisfied. In response to the requirement that accuracy 806 be below the threshold level 808 for the current zoom level being no longer satisfied, affordance 812 is removed from display in user interface 800, as shown in FIG. 8Q.

In FIG. 8R, user input 803 is received selecting location indicator 802 (e.g., a tap on touch screen 504 at the location of location indicator 802). In some embodiments, in response to user input 803, device 500 displays user interface 824, as shown in FIG. 8S. In some embodiments, user interface 824 is overlaid or superimposed on user interface 800. In some embodiments, user interface 824 displays information about the device's current location. In some embodiments, user interface 824 includes an address corresponding to the device's current location. In some embodiments, user interface 824 includes affordance 826 for marking the device's current location and affordance 828 for sharing the device's current location with another user or device. In some embodiments, user interface 824 includes image 832 corresponding to a pre-captured image of the device's current location from the ground level or street level. In some embodiments, user interface 824 includes affordance 830 that is selectable (e.g., such as via user input 803) to initiate the process to improve the determined location of the device. Thus, even though the requirement that accuracy 806 be below the threshold level 808 for the current zoom level is not satisfied, the user is able to initiate the process to improve the determined location of the device via affordance 830 displayed on user interface 824 (e.g., as described with reference to FIGS. 8F-8N).

In some embodiments, other methods of initiating the process to improve the determined location of the device are possible even if not all criteria are satisfied. In some embodiments, certain criteria must be satisfied for the user to be able to initiate the process to improve the determined location of the device (e.g., via affordance 812, affordance 830, or otherwise). For example, if any of the geography criteria and time of day criteria are not satisfied, then the process to improve the determined location of the device is optionally not available via any means (affordance 830 is optionally not displayed in user interface 824).

Figure 9:
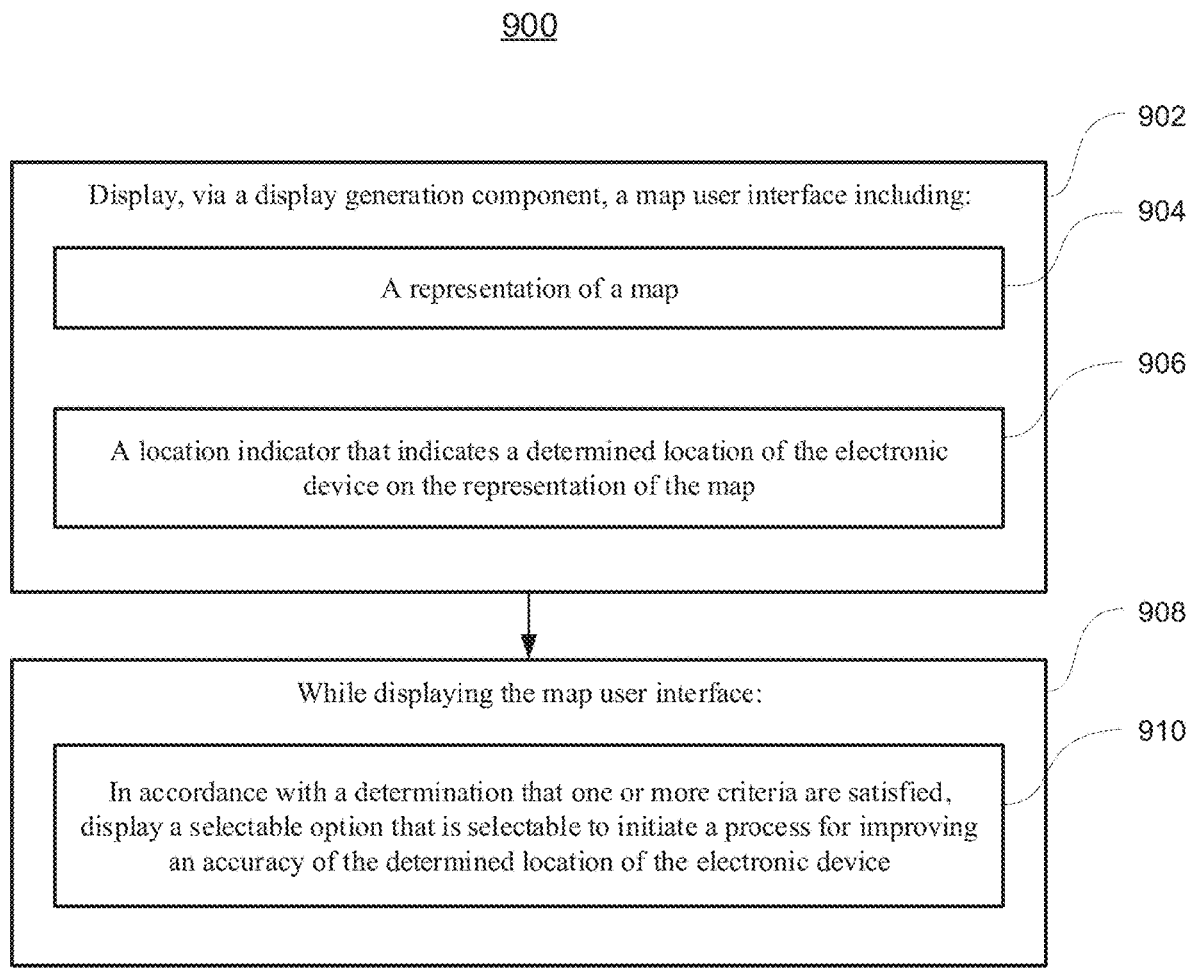
FIG. 9 is a flow diagram illustrating a method of improving the accuracy of the determined location of the electronic device in accordance with some embodiments of the disclosure.

FIG. 9 is a flow diagram illustrating a method 900 of improving the accuracy of the determined location of the electronic device in accordance with some embodiments of the disclosure. The method 900 is optionally performed at an electronic device such as device 100, device 300, device 500, and device 511 as described above with reference to FIGS. 1A-1B, 2-3, 4A-4B and 5A-5B. Some operations in method 900 are, optionally combined and/or the order of some operations is, optionally, changed.

As described below, the method 900 provides ways to improve the accuracy of the determined location of the electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device 500 in communication with a display generation component (e.g., a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.) displays (902), via the display generation component, a map user interface, such as user interface 800 in FIG. 8A.

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the map user interface includes a representation of a map (904) (e.g., a map of a respective geographic location, such as described above with respect to method 700), and a location indicator that indicates a determined location of the electronic device on the representation of the map (906), such as location indicator 802 in FIG. 8A (e.g., the representation of the map includes an indicator that indicates the location of the electronic device).

In some embodiments, the map is displaying the geographic location of the user. In some embodiments, the representation of the map is interactable by the user to view different geographic locations. In some embodiments, the representation of the map is interactable by the user to change a zoom level. In some embodiments, the representation of the map displays different levels of detail based on the zoom level. For example, at a first zoom level, the representation of the map includes representations of roads and highways, and at a second zoom level, closer than the first zoom level, the representation of the map includes representations of buildings, businesses, and/or landmarks.

In some embodiments, the indicator is displayed only if location determination is enabled (e.g., GPS tracking is enabled). In some embodiments, the indicator indicates the estimated location of the electronic device based on the accuracy or the confidence level of the location of the electronic device. In some embodiments, the electronic device includes a GPS component that is able to determine the location of the electronic device. In some embodiments, based on the number of satellites that the GPS component is able to lock onto, the device is able to determine the location of the electronic device to a particular accuracy level (e.g., more satellites results in a higher accuracy level and fewer satellites results in a lower accuracy level). In some embodiments, the electronic device is in communication with a cellular provider and is able to determine, using data from the cellular provider, the location of the electronic device (e.g., based on the cell tower(s) with which the electronic device is in communication). In some embodiments, the electronic device is able to determine its location based on other mechanisms. In some embodiments, if the accuracy of the determined location is below a threshold level for the current zoom level, then the location indicator includes an area indicator and if the accuracy is above the threshold level, then the location indicator includes a point indicator, as described above with respect to method 700.

In some embodiments, while displaying the map user interface (908), in accordance with a determination that one or more criteria are satisfied, the electronic device displays (910) a selectable option that is selectable to initiate a process for improving an accuracy of the determined location of the electronic device, such as affordance 812 in FIG. 8B (e.g., a button or icon on or within the location indicator that is selectable to initiate a process to improve the accuracy).

In some embodiments, the selectable option is displayed in the center of the location indicator. In some embodiments, the process to improve the accuracy of the determined location includes performing one or more visual captures using one or more visual light sensors (e.g., cameras) of the area and/or landmarks around the electronic device. In some embodiments, the one or more criteria include a requirement that the determined location of the electronic device is a location for which visual data exists for the landmarks at the location (e.g., for use in comparing against the one or more visual captures). In some embodiments, the one or more criteria include a requirement that the accuracy of the determined location is below a threshold (e.g., the device is not able to determine a sufficiently precise location and/or the map user interface includes an area indicator indicating the general area in which the device is potentially located, such as described with reference to method 700). In some embodiments, the one or more criteria include a requirement that the current time of day is within a window of time. For example, the time-of-day requirement is satisfied if the current time of day is after sunrise and before sunset. In some embodiments, the time-of-day requirement is satisfied if the current time of day is after an hour after sunrise and before an hour before sunset (optionally 30 minutes after sunset, 30 minutes before sunset, 2 hours after sunset, 2 hours before sunset, etc.). In some embodiments, the one or more criteria includes a requirement that the device's ambient light sensor determines that there is sufficient light (e.g., in addition to satisfying the time-of-day requirement, such that the camera captures are more likely to provide accurate and detailed captures).

The above-described manner of providing an option for improving the accuracy of the determined location of the device (e.g., by displaying the option on the maps user interface if one or more criteria is satisfied) provides the user with a quick and efficient manner of refining the determined location of the device, which simplifies the interaction between the user and the electronic device and enhances the operability of the electronic device and makes the user-device interface more efficient (e.g., without requiring the user to perform additional inputs, navigate to a different user interface to initiate the process to improve the device's location, or to physically move to a different location), which additionally reduces power usage and improves battery life of the electronic device by enabling the user to use the electronic device more quickly and efficiency while reducing errors in the usage of the device.

In some embodiments, in accordance with a determination that the one or more criteria are not satisfied, the electronic device forgoes displaying the selectable option that is selectable to initiate the process for improving the accuracy of the determined location of the electronic device, such as in FIGS. 8A and 8C-8D (e.g., do not display the button or icon).

In some embodiments, even without the button or icon, the device provides the user with a method to initiate the process to improve the accuracy. For example, if the map user interface is displaying the point indicator (e.g., indicating that the device is at a particular location on the map), then the user is able to select the point indicator or another selectable user interface element to cause display of a user interface with information about the device's location that includes a selectable option to initiate the process for improving the accuracy of the determined location of the device. In some embodiments, the user is able to select a selectable option to manually trigger a determination of the device's position, which optionally results in the accuracy to fall below the threshold and the selectable option to be displayed (optionally only if the other requirements in the one or more criteria are satisfied).

The above-described manner of not providing an option for improving the accuracy of the determined location of the device allows the device to quickly and efficiently avoid initiation of the location-refinement process when not appropriate, which simplifies the interaction between the user and the electronic device and enhances the operability of the electronic device and makes the user-device interface more efficient (e.g., by avoiding unnecessary inputs, such as inputs attempting to initiate the location-refinement process, to the device), which additionally reduces power usage and improves battery life of the electronic device by enabling the user to use the electronic device more quickly and efficiency while reducing errors in the usage of the device.

In some embodiments, the one or more criteria include one or more of a requirement that the electronic device is located at one or more predetermined locations, such as in FIG. 8C (e.g., the device is located at a geographic location where pre-captured images of the buildings and landmarks exist), a requirement that a current time of day is within a predetermined time window, such as in FIG. 8D (e.g., the current time of day is after sunrise and before sunset), or a requirement that the accuracy of the determined location of the electronic device is below a respective threshold level for a current zoom level of the representation of the map, such as in FIG. 8A (e.g., the accuracy of the determined location is below the threshold for the current zoom level such that the location indicator includes an area indicator, such as the first location element described above with respect to method 700).

In some embodiments, the pre-captured images are images of the buildings, streets, objects, and/or landmarks from the perspective of a pedestrian or vehicle. In some embodiments, the pre-captured images are from the same set of pre-captured images that a user is able to browse for and view. For example, if the determined location of the device is in a location in which there are no pre-captured images (e.g., a rural area, a forest, a narrow alley, etc.), then the device is unable to perform the process to improve the accuracy of the device and thus the device location criteria is not satisfied.

In some embodiments, the time-of-day requirement is satisfied if the current time of day is after an hour after sunrise and before an hour before sunset (optionally 30 minutes after sunset, 30 minutes before sunset, 2 hours after sunset, 2 hours before sunset, etc.). In some embodiments, if the current time of day is not within the predetermined time window, the time-of-day requirement is not satisfied. In some embodiments, the time-of-day requirement ensures that enough light exists for proper camera captures. In some embodiments, other requirements in addition or alternatively to the time-of-day requirement is used to ensure enough light exists for proper camera captures (e.g., ambient light sensors), weather data, etc.

In some embodiments, if the accuracy is above the threshold, then the location indicator includes a point locator, such as the second location element described above with respect to method 700, and the accuracy requirement is not satisfied.

The above-described manner of providing an option for improving the accuracy of the determined location of the device (e.g., when a location requirement, a time-of-day requirement, and/or a location accuracy requirement are satisfied) provides the user with a quick and efficient manner of refining the determined location of the device (e.g., only when the requirements are satisfied such that the process can be accurately performed), which simplifies the interaction between the user and the electronic device and enhances the operability of the electronic device and makes the user-device interface more efficient (e.g., without requiring the user to separately determine whether the process can be performed at the current time and without providing the user the option when the process cannot be properly performed with sufficient accuracy), which additionally reduces power usage and improves battery life of the electronic device by enabling the user to use the electronic device more quickly and efficiency while reducing errors in the usage of the device.

In some embodiments, while displaying the map user interface while the one or more criteria are not satisfied and while not displaying the selectable option, such as in FIG. 8A (e.g., while the selectable option is not displayed as a result of the criteria not being satisfied), the electronic device receives, via one or more input devices, a user input corresponding to a request to increase the current zoom level of the representation of the map to a first zoom level (e.g., a user input zooming the map in). In some embodiments, the user input is an outward pinch gesture. In some embodiments, the user input is a selection of a zoom-in affordance. In some embodiments, the user input is a double tap followed by an upward swipe gesture.

In some embodiments, in response to receiving the user input, the electronic device increases the current zoom level of the representation of the map to the first zoom level (e.g., increasing the zoom level in accordance with the user input). In some embodiments, in accordance with a determination that the accuracy of the determined location of the device is below a respective threshold level for the first zoom level, the electronic device displays the selectable option that is selectable to initiate the process for improving the accuracy of the determined location of the electronic device, such as in FIG. 8B (e.g., if zooming in causes the accuracy to become below the threshold, then display the selectable option).

In some embodiments, if zooming in causes the accuracy to become below the threshold, then the location indicator includes an area indicator, such as the first location element described above with respect to method 700. In some embodiments, if the accuracy remains above the respective threshold, then continue not displaying the selectable option. Thus, in some embodiments, the selectable option is only displayed when the accuracy is below the threshold for the current zoom level (e.g., only when the area indicator is displayed).

The above-described manner of providing an option for improving the accuracy of the determined location of the device (e.g., in response to the user zooming out the map user interface such that the accuracy is below the threshold) provides the user with a quick and efficient manner of refining the determined location of the device (e.g., by displaying the option when the user has zoomed the map user interface to reveal that the determined location of the device is within an area rather than a single position), which simplifies the interaction between the user and the electronic device and enhances the operability of the electronic device and makes the user-device interface more efficient (e.g., by not providing the option if increased location accuracy will not provide more helpful location information to the user due to the current zoom level), which additionally reduces power usage and improves battery life of the electronic device by enabling the user to use the electronic device more quickly and efficiency while reducing errors in the usage of the device.

In some embodiments, while displaying the selectable option, the electronic device receives, via one or more input devices, a user input selecting the selectable option, such as in FIG. 8E. In some embodiments, in response to receiving the user input, the electronic device initiates the process for improving the accuracy of the determined location of the electronic device using one or more images captured by the electronic device, such as in FIG. 8F (e.g., the process for improving the accuracy of the determined location of the electronic device includes performing a plurality of camera captures of the buildings, roads, objects, and landmarks around the electronic device and comparing the plurality of camera captures against the plurality of pre-captured captures of the buildings, roads, objects, and landmarks in the determined location of the device).

In some embodiments, the process for improving the accuracy of the determined location of the electronic devices includes performing a plurality of camera captures and identifying points of interests (e.g., signs, roads, buildings, stores, etc.) within the cameras and comparing the identified points of interests against points of interests that exist in pre-captured images. In some embodiments, the electronic device performs the comparison(s) (e.g., the pre-captured images are downloaded to the device from a server in response to detecting the selection of the selectable option and/or before detecting selection of the selectable option and in response to the one or more criteria being satisfied). In some embodiments, the electronic device uploads the captures to a server (external to the electronic device) and the server performs the comparison(s). In some embodiments, based on whether matches occur during the comparison(s) (e.g., if one or more objects in the vicinity of the electronic device matches the objects in the pre-captured images), the device is able to determine the current location of the electronic device. In some embodiments, the device is able to determine the location based on the objects in the vicinity of the device as well as the angle of the captures of the respective objects.

The above-described manner of improving the accuracy of the determined location of the device (e.g., by comparing one or more camera captures to one or more pre-captured images) provides the user with a quick and efficient manner of refining the determined location of the device, which simplifies the interaction between the user and the electronic device and enhances the operability of the electronic device and makes the user-device interface more efficient (e.g., without requiring the user to manually compare pre-captured images against the device's surroundings), which additionally reduces power usage and improves battery life of the electronic device by enabling the user to use the electronic device more quickly and efficiency while reducing errors in the usage of the device.

In some embodiments, the process for improving the accuracy of the determined location of the electronic device includes displaying, via the display generation component, a user interface with instructions for performing the process to improve the location accuracy of the determination location of the electronic device, wherein the instructions include instructions for orienting the electronic device, such as user interface 814 in FIG. 8F (e.g., while performing the one or more captures, the device displays a user interface that provides instructions for how to perform the captures).

For example, the user interface includes instructions to point the camera of the device toward the buildings in the vicinity, to raise the camera, to lower the camera, to stand still while capturing, to continue capturing or to capture more buildings, or to move the device more slowly while capturing (e.g., any of these are shown while the device is capturing images of the surroundings for use in the comparison, and are independently shown in response to detecting, via orientation/movement sensors in the electronic device, that movement/orientation of the device should change to properly complete the location-refinement process). In some embodiments, the user interface is a pop-up user interface that is displayed at a predetermined location in the display area (e.g., bottom, top, left, or right side). In some embodiments, the user interface is displayed overlaid over the representation of the map.

The above-described manner of providing instructions for how to improve the accuracy of the determined location of the device (e.g., by displaying instructions on how to orient the device) provides the user with a quick and efficient manner of instructing the user how to perform proper captures, which simplifies the interaction between the user and the electronic device and enhances the operability of the electronic device and makes the user-device interface more efficient (e.g., by providing the user feedback on how to capture the images), which additionally reduces power usage and improves battery life of the electronic device by enabling the user to use the electronic device more quickly and efficiency while reducing errors in the usage of the device.

In some embodiments, the process for improving the accuracy of the determined location of the electronic device does not include displaying, via the display generation component, representations of the one or more images captured by the electronic device, such as user interface 814 not displaying a representation of environment 822 in FIG. 8H (e.g., the camera captures and comparisons against the pre-captured images are performed without displaying the captures in the user interface). In some embodiments, the process to improve the location accuracy is not associated with a navigation mode or directions from one location to another location. Thus, in some embodiments, a user is able to initiate the process to improve the location accuracy while browsing in the map user interface or otherwise interacting with the map user interface. In some embodiments, a user need not first request directions or initiate navigation mode to be provided with the option to improve the device's location accuracy.

The above-described manner of improving the accuracy of the determined location of the device (e.g., by performing camera captures without displaying representations of the capture) provides the user with a quick and efficient manner of refining the determined location of the device (e.g., without navigating away from the map user interface that can be distracting or visually jarring), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency while reducing errors in the usage of the device.

In some embodiments, the process for improving the accuracy of the determined location of the electronic device includes detecting a change of an orientation of the electronic device to capture the one or more images, such as in FIGS. 8H-8I (e.g., while performing the captures, the orientation of the device is changed (e.g., as a result of the user rotating the device or otherwise changing the orientation of the device) to capture different angles and different objects in the vicinity of the device).

In some embodiments, the electronic device displays, via the display generation component, an orientation indicator for the electronic device on the representation of the map, wherein while detecting the change of the orientation of the electronic device, the electronic device changes an orientation of the orientation indicator based on the orientation of the electronic device, such as orientation indicator 804 changing orientations in FIGS. 8H-8I (e.g., the location indicator on the map includes an orientation indicator (optionally similarly to described above with respect to method 700), and the orientation indicator tracks the orientation of the device as the device is rotated to capture the different angles and objects).

The above-described manner of updating the orientation indicator while improving the accuracy of the determined location of the device (e.g., by displaying an orientation indicator on the location indicator that rotates in accordance with the rotation of the device) provides the user with visual feedback that captures in the respective direction are being properly performed, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency while reducing errors in the usage of the device.

In some embodiments, while the one or more criteria are not satisfied, the location indicator includes a first location element and not a second location element, such as location indicator 810 in FIG. 8B (e.g., the location indicator includes an area indicator and does not include a point indicator, such as described above with respect to method 700).

In some embodiments, after performing the process for improving the accuracy of the determined location of the electronic device, the electronic device updates the location indicator to include the second location element and not include the first location element, such as location indicator 802 in FIG. 8O (e.g., after performing the process to improve the accuracy of the determined location of the device, the accuracy of the determined location is above the threshold such that the point indicator is displayed in the user interface, such as the second location indicator described above with respect to method 700.), wherein the first location element indicates an area on the representation of the map in which the electronic device is determined to be located (e.g., the first location element is a circular element with a radius that indicates the area within which the electronic device is determined to be, such as the first location indicator described above with respect to method 700), and the second location element indicates a position on the representation of the map at which the electronic device is determined to be located (e.g., the second location element indicates a single location on the map where the device is determined to be located, such as the second location element described above with respect to method 700).

The above-described manner of improving the accuracy of the determined location of the device (e.g., by displaying the location indicator with a point indicator after successfully performing the process to improve the accuracy of the determined location) provides the user with a quick and efficient manner of refining the determined location of the device, which simplifies the interaction between the user and the electronic device and enhances the operability of the electronic device and makes the user-device interface more efficient (e.g., without requiring the user to perform additional inputs after performing the process to update the location indicator based on updated location data), which additionally reduces power usage and improves battery life of the electronic device by enabling the user to use the electronic device more quickly and efficiency while reducing errors in the usage of the device.

In some embodiments, the selectable option is displayed while not displaying, via the display generation component, one or more directions for traveling from a first location to a second location in the map user interface, such as in FIG. 8B (e.g., the selectable option is displayed and the process is performed without requesting directions from one location to another or starting navigation mode for navigating from the current location to a destination).

In some embodiments, the selectable option is displayed and the process is performed when the user interface is not displaying any directions. In some embodiments, the selectable option is displayed while displaying directions or while in navigation mode (optionally navigation is paused while performing the process to improve the accuracy and/or optionally navigation is updated if the process to improve the accuracy causes the determined location of the device to be different than the previously determined location of the device).

The above-described manner of improving the accuracy of the determined location of the device (e.g., without requiring the user to request directions or begin navigation) provides the user with a quick and efficient manner of refining the determined location of the device, which simplifies the interaction between the user and the electronic device and enhances the operability of the electronic device and makes the user-device interface more efficient (e.g., as a process separate from the process of obtaining directions or navigating to a destination, without requiring the user to perform additional inputs to request directions to trigger the process to improve location accuracy), which additionally reduces power usage and improves battery life of the electronic device by enabling the user to use the electronic device more quickly and efficiency while reducing errors in the usage of the device.

In some embodiments, while displaying the map user interface while the one or more criteria are not satisfied and while not displaying the selectable option (e.g., while the selectable option is not displayed as a result of the criteria not being satisfied. In some embodiments, when the criteria is not satisfied, the location indicator includes a point indicator, such as the second location indicator described above with respect to method 700), the electronic device receives, via one or more input devices, a first user input selecting the location indicator, such as in FIG. 8R (e.g., a user input tapping on the location indicator and/or point indicator).

In some embodiments, in response to receiving the user input, the electronic device displays, via the display generation component, a user interface including information about a current location of the electronic device, such as user interface 824 in FIG. 8S (e.g., displaying an address, an image, and/or one or more selectable options associated with the current location of the device) and a second selectable option that is selectable to initiate the process for improving the accuracy of the determined location of the electronic device, such as affordance 830 in FIG. 8S (e.g., the user interface element includes a selectable option that is selectable to perform the process of improving the accuracy of the determined location of the electronic device, even if one or more of the one or more criteria are not satisfied).

In some embodiments, the information is displayed on a user interface element that is overlaid over the map user interface. In some embodiments, even if the map user interface does not include the selectable option due to the accuracy of the determined location being above the threshold for the current zoom level, a user is able to select the second selectable option to begin the process to improve the accuracy of the determined location. In some embodiments, the user interface element does not include the selectable option (optionally the selectable option is disabled and/or greyed out) if the location or time-of-day requirement are not satisfied. Thus, in some embodiments, a user is able to initiate the process for improving the accuracy of the determined location even though the accuracy requirement is not satisfied, but is not able to initiate the process if the location or time-of-day requirement are not satisfied. In some embodiments, the process that is initiated in response to selection of the second selectable option is the same process that is initiated in response to selection of the selectable option described above.

The above-described manner of providing an option for improving the accuracy of the determined location of the device (e.g., on a user interface that is displayed in response to a user input selecting the location indicator) provides the user with a quick and efficient manner of refining the determined location of the device (e.g., even when the accuracy requirement is not satisfied and the selectable option is not displayed), which simplifies the interaction between the user and the electronic device and enhances the operability of the electronic device and makes the user-device interface more efficient (e.g., without requiring the user to perform additional inputs to zoom in so that the accuracy requirement is satisfied and the selectable option is displayed on the location indicator), which additionally reduces power usage and improves battery life of the electronic device by enabling the user to use the electronic device more quickly and efficiency while reducing errors in the usage of the device.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIG. 9. For example, the operation of the electronic device to improve the accuracy of the determined location of the electronic device described above with reference to method 900 optionally has one or more of the characteristics of indicating the current location of the electronic device, etc., described herein with reference to other methods described herein (e.g., methods 700). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIG. 9 are, optionally, implemented by components depicted in FIGS. 1A-1B. For example, displaying operations 902 and 910 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to improve the display of device location information to users. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to display the user's current location or display the location of a user's electronic device. Accordingly, use of such personal information data enables users to have more information about the user's or the device's location. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to enable the determination of the device's location. In yet another example, users can select to limit the sharing of the device's location information or entirely block the display of and/or sharing of location information. In addition to providing "opt in" and "opt out" options, the present disclosure contemplates providing notifications relating to the access or use of personal information. For instance, a user may be notified upon displaying the map application that their current location will be determined and then reminded again just before location information is generated.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, location information can be generated and delivered to users based on non-specific information data or a bare minimum amount of identifying information, such as the determination of a device location based on the cellular towers that the device is in communication with, as opposed to the use of GPS sensors.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method, comprising:
at an electronic device in communication with a display generation component:
   displaying, via the display generation component, a map user interface including:
      a representation of a map at a respective zoom level, and
      a location indicator that indicates a determined location of the electronic device on the representation of the map, wherein:
         in accordance with a determination that an accuracy of the determined location of the electronic device is below a respective threshold level for the respective zoom level, the location indicator includes a first location element and does not include a second location element; and
         in accordance with a determination that the accuracy of the determined location of the electronic device is above the respective threshold level for the respective zoom level, the location indicator includes the second location element and does not include the first location element;
      wherein in accordance with a determination that the respective zoom level is a first zoom level, the respective threshold level is a first threshold level, and in accordance with a determination that the respective zoom level is a second zoom level that is more zoomed-in than the first zoom level, the respective threshold level is a second threshold level greater than the first threshold level.

2. The method of claim 1, further comprising:
in accordance with a determination that the first location element would occupy a display area that is larger than a predetermined size, ceasing to display the first location element and forgoing displaying the second location element.

3. The method of claim 1, further comprising:
while displaying the first location element, receiving, via one or more input devices, a user input corresponding to a request to decrease a zoom level of the representation of the map to the first zoom level; and
in response to receiving the user input:
   decreasing the zoom level of the representation of the map to the first zoom level; and
   in accordance with a determination that the accuracy of the determined location of the electronic device is above the respective threshold level for the first zoom level, updating the location indicator to include the second location element and not include the first location element.

4. The method of claim 1, further comprising:
while displaying the first location element, receiving, via one or more input devices, a user input corresponding to a request to increase a zoom level of the representation of the map to the second zoom level; and
in response to receiving the user input:
   increasing the zoom level of the representation of the map to the second zoom level; and
   in accordance with a determination that the accuracy of the determined location of the electronic device is below the respective threshold level for the second zoom level, updating a size of a display area of the first location element on the display generation component in accordance with the accuracy of the determined location of the electronic device while maintaining display of the first location element.

5. The method of claim 1, further comprising:
while displaying the second location element, receiving, via one or more input devices, a user input corresponding to a request to increase a zoom level of the representation of the map to the second zoom level; and
in response to receiving the user input:
increasing the zoom level of the representation of the map to the second zoom level; and
in accordance with a determination that the accuracy of the determined location of the electronic device is below the respective threshold level for the first zoom level, updating the location indicator to include the first location element and not include the second location element.

6. The method of claim 1, further comprising:
while displaying the representation of the map at the respective zoom level and the first location element, determining that the accuracy of the determined location of the electronic device has increased above the respective threshold level for the respective zoom level; and
in response to determining that the accuracy of the determined location of the electronic device has increased above the respective threshold level for the respective zoom level, updating the location indicator to include the second location element and not include the first location element.

7. The method of claim 1, wherein:
in accordance with a determination that a determined orientation of the electronic device is available, the location indicator includes an orientation indicator.

8. The method of claim 7, further comprising:
while displaying the location indicator including the orientation indicator, receiving, via one or more input devices, a user input corresponding to a request to change a zoom level of the representation of the map to the first zoom level; and
in response to receiving the user input:
changing the zoom level of the representation of the map to the first zoom level;
in accordance with a determination that the location indicator includes the first location element and does not include the second location element, changing a size of the orientation indicator based on the changing zoom level of the representation of the map; and
in accordance with a determination that the location indicator includes the second location element and does not include the first location element, forgoing changing the size of the orientation indicator based on the changing zoom level of the representation of the map.

9. The method of claim 7, wherein:
while displaying the orientation indicator:
in accordance with a determination that the location indicator includes the first location element and does not include the second location element, the orientation indicator is a first portion of a first shape; and
in accordance with a determination that the location indicator includes the second location element and does not include the first location element, the orientation indicator is a second portion of the first shape, different from the first portion of the first shape.

10. The method of claim 1, further comprising:
while displaying the location indicator, receiving, via one or more input devices, a user input corresponding to a request to change a zoom level of the representation of the map to the first zoom level; and
in response to receiving the user input:
changing the zoom level of the representation of the map to the first zoom level;
in accordance with a determination that the location indicator includes the first location element and not the second location element, changing a size of the first location element based on the changing zoom level of the representation of the map; and
in accordance with a determination that the location indicator includes the second location element and not the first location element, forgoing changing the size of the second location element based on the changing zoom level of the representation of the map.

11. The method of claim 1, further comprising:
displaying, with the location indicator, a representation of a user of the electronic device,
wherein:
in accordance with the determination that the accuracy of the determined location of the electronic device is above the respective threshold level for the respective zoom level, the representation of the user of the electronic device is displayed with a respective user interface element connecting the representation of the user of the electronic device to a respective location on the representation of the map, and
in accordance with the determination that the accuracy of the determined location of the electronic device is below the respective threshold level for the respective zoom level, the representation of the user of the electronic device is displayed without the respective user interface element.

12. The method of claim 1, wherein while displaying the first location element:
in accordance with a determination that the first location element occupies a first display area, the first location element has a first opacity value; and
in accordance with a determination that the first location element occupies a second display area having a size different than the first display area, the first location element has a second opacity value, different from the first opacity value.

13. An electronic device, comprising:
one or more processors;
memory; and
one or more programs, wherein the one or more programs are stored in the memory and configured to be executed by the one or more processors, the one or more programs including instructions for:
displaying, via a display generation component, a map user interface including:
a representation of a map at a respective zoom level, and
a location indicator that indicates a determined location of the electronic device on the representation of the map, wherein:
in accordance with a determination that an accuracy of the determined location of the electronic device is below a respective threshold level for the respective zoom level, the location indicator includes a first location element and does not include a second location element; and in accordance with a determination that the accuracy of the determined location of the electronic device is above the respective threshold level for the respective zoom level, the location indicator includes the second location element and does not include the first location element;

wherein in accordance with a determination that the respective zoom level is a first zoom level, the respective threshold level is a first threshold level, and in accordance with a determination that the respective zoom level is a second zoom level that is more zoomed-in than the first zoom level, the respective threshold level is a second threshold level greater than the first threshold level.

14. The electronic device of claim 13, the one or more programs further comprising instructions for in accordance with a determination that the first location element would occupy a display area that is larger than a predetermined size, ceasing to display the first location element and forgoing displaying the second location element.

15. The electronic device of claim 13, the one or more programs further comprising instructions for:
while displaying the first location element, receiving, via one or more input devices, a user input corresponding to a request to decrease a zoom level of the representation of the map to the first zoom level; and
in response to receiving the user input:
decreasing the zoom level of the representation of the map to the first zoom level; and
in accordance with a determination that the accuracy of the determined location of the electronic device is above the respective threshold level for the first zoom level, updating the location indicator to include the second location element and not include the first location element.

16. The electronic device of claim 13, the one or more programs further comprising instructions for:
while displaying the first location element, receiving, via one or more input devices, a user input corresponding to a request to increase a zoom level of the representation of the map to the second zoom level; and
in response to receiving the user input:
increasing the zoom level of the representation of the map to the second zoom level; and
in accordance with a determination that the accuracy of the determined location of the electronic device is below the respective threshold level for the second zoom level, updating a size of a display area of the first location element on the display generation component in accordance with the accuracy of the determined location of the electronic device while maintaining display of the first location element.

17. The electronic device of claim 13, the one or more programs further comprising instructions for:
while displaying the second location element, receiving, via one or more input devices, a user input corresponding to a request to increase a zoom level of the representation of the map to the second zoom level; and
in response to receiving the user input:
increasing the zoom level of the representation of the map to the second zoom level; and
in accordance with a determination that the accuracy of the determined location of the electronic device is below the respective threshold level for the first zoom level, updating the location indicator to include the first location element and not include the second location element.

18. The electronic device of claim 13, the one or more programs further comprising instructions for:
while displaying the representation of the map at the respective zoom level and the first location element, determining that the accuracy of the determined location of the electronic device has increased above the respective threshold level for the respective zoom level; and
in response to determining that the accuracy of the determined location of the electronic device has increased above the respective threshold level for the respective zoom level, updating the location indicator to include the second location element and not include the first location element.

19. The electronic device of claim 13, wherein:
in accordance with a determination that a determined orientation of the electronic device is available, the location indicator includes an orientation indicator.

20. The electronic device of claim 19, the one or more programs further comprising instructions for:
while displaying the location indicator including the orientation indicator, receiving, via one or more input devices, a user input corresponding to a request to change a zoom level of the representation of the map to the first zoom level; and
in response to receiving the user input:
changing the zoom level of the representation of the map to the first zoom level;
in accordance with a determination that the location indicator includes the first location element and does not include the second location element, changing a size of the orientation indicator based on the changing zoom level of the representation of the map; and
in accordance with a determination that the location indicator includes the second location element and does not include the first location element, forgoing changing the size of the orientation indicator based on the changing zoom level of the representation of the map.

21. The electronic device of claim 19, wherein:
while displaying the orientation indicator:
in accordance with a determination that the location indicator includes the first location element and does not include the second location element, the orientation indicator is a first portion of a first shape; and
in accordance with a determination that the location indicator includes the second location element and does not include the first location element, the orientation indicator is a second portion of the first shape, different from the first portion of the first shape.

22. The electronic device of claim 13, the one or more programs further comprising instructions for:
while displaying the location indicator, receiving, via one or more input devices, a user input corresponding to a request to change a zoom level of the representation of the map to the first zoom level; and
in response to receiving the user input:
changing the zoom level of the representation of the map to the first zoom level;
in accordance with a determination that the location indicator includes the first location element and not the second location element, changing a size of the first location element based on the changing zoom level of the representation of the map; and
in accordance with a determination that the location indicator includes the second location element and not the first location element, forgoing changing the size of the second location element based on the changing zoom level of the representation of the map.

23. The electronic device of claim 13, the one or more programs further comprising instructions for:
displaying, with the location indicator, a representation of a user of the electronic device, wherein:
in accordance with the determination that the accuracy of the determined location of the electronic device is above the respective threshold level for the respective zoom level, the representation of the user of the electronic device is displayed with a respective user interface element connecting the representation of the user of the electronic device to a respective location on the representation of the map, and
in accordance with the determination that the accuracy of the determined location of the electronic device is below the respective threshold level for the respective zoom level, the representation of the user of the electronic device is displayed without the respective user interface element.

24. The electronic device of claim 13, wherein while displaying the first location element:
in accordance with a determination that the first location element occupies a first display area, the first location element has a first opacity value; and
in accordance with a determination that the first location element occupies a second display area having a size different than the first display area, the first location element has a second opacity value, different from the first opacity value.

25. A non-transitory computer readable storage medium storing one or more programs, the one or more programs comprising instructions, which when executed by one or more processors of an electronic device, cause the electronic device to perform a method comprising:
displaying, via a display generation component, a map user interface including:
a representation of a map at a respective zoom level, and
a location indicator that indicates a determined location of the electronic device on the representation of the map, wherein:
in accordance with a determination that an accuracy of the determined location of the electronic device is below a respective threshold level for the respective zoom level, the location indicator includes a first location element and does not include a second location element; and
in accordance with a determination that the accuracy of the determined location of the electronic device is above the respective threshold level for the respective zoom level, the location indicator includes the second location element and does not include the first location element;
wherein in accordance with a determination that the respective zoom level is a first zoom level, the respective threshold level is a first threshold level, and in accordance with a determination that the respective zoom level is a second zoom level that is more zoomed-in than the first zoom level, the respective threshold level is a second threshold level greater than the first threshold level.

26. The non-transitory computer readable storage medium of claim 25, the method further comprising in accordance with a determination that the first location element would occupy a display area that is larger than a predetermined size, ceasing to display the first location element and forgoing displaying the second location element.

27. The non-transitory computer readable storage medium of claim 25, the method further comprising:
while displaying the first location element, receiving, via one or more input devices, a user input corresponding to a request to decrease a zoom level of the representation of the map to the first zoom level; and
in response to receiving the user input:
decreasing the zoom level of the representation of the map to the first zoom level; and
in accordance with a determination that the accuracy of the determined location of the electronic device is above the respective threshold level for the first zoom level, updating the location indicator to include the second location element and not include the first location element.

28. The non-transitory computer readable storage medium of claim 25, the method further comprising:
while displaying the first location element, receiving, via one or more input devices, a user input corresponding to a request to increase a zoom level of the representation of the map to the second zoom level; and
in response to receiving the user input:
increasing the zoom level of the representation of the map to the second zoom level; and
in accordance with a determination that the accuracy of the determined location of the electronic device is below the respective threshold level for the second zoom level, updating a size of a display area of the first location element on the display generation component in accordance with the accuracy of the determined location of the electronic device while maintaining display of the first location element.

29. The non-transitory computer readable storage medium of claim 25, the method further comprising:
while displaying the second location element, receiving, via one or more input devices, a user input corresponding to a request to increase a zoom level of the representation of the map to the second zoom level; and
in response to receiving the user input:
increasing the zoom level of the representation of the map to the second zoom level; and
in accordance with a determination that the accuracy of the determined location of the electronic device is below the respective threshold level for the first zoom level, updating the location indicator to include the first location element and not include the second location element.

30. The non-transitory computer readable storage medium of claim 25, the method further comprising:
while displaying the representation of the map at the respective zoom level and the first location element, determining that the accuracy of the determined location of the electronic device has increased above the respective threshold level for the respective zoom level; and
in response to determining that the accuracy of the determined location of the electronic device has increased above the respective threshold level for the respective zoom level, updating the location indicator to include the second location element and not include the first location element.

31. The non-transitory computer readable storage medium of claim 25, wherein:
in accordance with a determination that a determined orientation of the electronic device is available, the location indicator includes an orientation indicator.

32. The non-transitory computer readable storage medium of claim 31, the method further comprising:
while displaying the location indicator including the orientation indicator, receiving, via one or more input devices, a user input corresponding to a request to change a zoom level of the representation of the map to the first zoom level; and
in response to receiving the user input:
changing the zoom level of the representation of the map to the first zoom level;
in accordance with a determination that the location indicator includes the first location element and does not include the second location element, changing a size of the orientation indicator based on the changing zoom level of the representation of the map; and
in accordance with a determination that the location indicator includes the second location element and does not include the first location element, forgoing changing the size of the orientation indicator based on the changing zoom level of the representation of the map.

33. The non-transitory computer readable storage medium of claim 31, wherein:
while displaying the orientation indicator:
in accordance with a determination that the location indicator includes the first location element and does not include the second location element, the orientation indicator is a first portion of a first shape; and
in accordance with a determination that the location indicator includes the second location element and does not include the first location element, the orientation indicator is a second portion of the first shape, different from the first portion of the first shape.

34. The non-transitory computer readable storage medium of claim 25, the method further comprising:
while displaying the location indicator, receiving, via one or more input devices, a user input corresponding to a request to change a zoom level of the representation of the map to the first zoom level; and
in response to receiving the user input:
changing the zoom level of the representation of the map to the first zoom level;
in accordance with a determination that the location indicator includes the first location element and not the second location element, changing a size of the first location element based on the changing zoom level of the representation of the map; and
in accordance with a determination that the location indicator includes the second location element and not the first location element, forgoing changing the size of the second location element based on the changing zoom level of the representation of the map.

35. The non-transitory computer readable storage medium of claim 25, the method further comprising:
displaying, with the location indicator, a representation of a user of the electronic device, wherein:
in accordance with the determination that the accuracy of the determined location of the electronic device is above the respective threshold level for the respective zoom level, the representation of the user of the electronic device is displayed with a respective user interface element connecting the representation of the user of the electronic device to a respective location on the representation of the map, and
in accordance with the determination that the accuracy of the determined location of the electronic device is below the respective threshold level for the respective zoom level, the representation of the user of the electronic device is displayed without the respective user interface element.

36. The non-transitory computer readable storage medium of claim 25, wherein while displaying the first location element:
in accordance with a determination that the first location element occupies a first display area, the first location element has a first opacity value; and
in accordance with a determination that the first location element occupies a second display area having a size different than the first display area, the first location element has a second opacity value, different from the first opacity value.

* * * * *